United States Patent [19]

Recks et al.

[11] 3,909,799

[45] Sept. 30, 1975

[54] MICROPROGRAMMABLE PERIPHERAL PROCESSING SYSTEM

[75] Inventors: John A. Recks, Chelmsford; Frank V. Cassarino, Jr., Weston; Edward F. Getson, Jr., Lynn; Karl F. Laubscher, Cambridge, all of Mass.; Albert T. McLaughlin, Hudson, N.H.; Edwin J. Pinheiro, Edina, Minn.

[73] Assignee: Honeywell Information Systems Inc., Waltham, Mass.

[22] Filed: Dec. 18, 1973

[21] Appl. No.: 425,760

[52] U.S. Cl. .............................................. 340/172.5

[51] Int. Cl.² ...................... G06F 3/00; G06F 15/20; G06F 13/00; G06F 9/16

[58] Field of Search .................................. 340/172.5

[56] References Cited

UNITED STATES PATENTS

| | | | |
|---|---|---|---|
| 3,559,187 | 1/1971 | Figueroa | 340/172.5 |
| 3,573,741 | 4/1971 | Gavril | 340/172.5 |
| 3,588,831 | 6/1971 | Figueroa | 340/172.5 |
| 3,654,617 | 4/1972 | Irwin | 340/172.5 |
| 3,673,575 | 6/1972 | Burton | 340/172.5 |
| 3,673,576 | 6/1972 | Donaldson | 340/172.5 |
| 3,675,209 | 7/1972 | Trost | 340/172.5 |
| 3,713,107 | 1/1973 | Barsamian | 340/172.5 |
| 3,713,108 | 1/1973 | Edstrom | 340/172.5 |
| 3,725,864 | 4/1973 | Clark | 340/172.5 |
| 3,740,728 | 6/1973 | Pullen | 340/172.5 |
| 3,742,457 | 6/1973 | Calle | 340/172.5 |
| 3,753,236 | 8/1973 | Flynn | 340/172.5 |
| 3,766,526 | 10/1973 | Buchanan | 340/172.5 |

OTHER PUBLICATIONS

IBM Technical Disclosure Bulletin, "Communication Line Microcontroller," J. W. Froemke, G. R. Mitchell and W. E. Hammer, Vol. 14, No. 6, November 1971, pp. 1879–1882.

*Primary Examiner*—Gareth D. Shaw
*Assistant Examiner*—James D. Thomas
*Attorney, Agent, or Firm*—Faith F. Driscoll; Ronald T. Reiling

[57] ABSTRACT

A microprogrammable peripheral processor is arranged to include a microprogram control store apparatus which provides the necessary control signals for interpreting commands forwarded to it by a data processing system. Additionally, the peripheral processor includes hardware control sequencing apparatus which is conditioned by the microprogrammed control store in accordance with the command to be performed. The hardware sequence control apparatus is conditioned to set up the various hardware paths for the particular operation to be performed. After the setup operation has been performed, the microprogrammable control store apparatus transfers control to the hardware sequencing apparatus which allows data transfers to proceed at maximum speed which is completely independent of the operating speed of the microprogram control store apparatus. During the data transfer operation, the control store apparatus idles or performs operations which do not affect the transfer until the hardware sequencing apparatus signals the completion of the operation.

33 Claims, 27 Drawing Figures

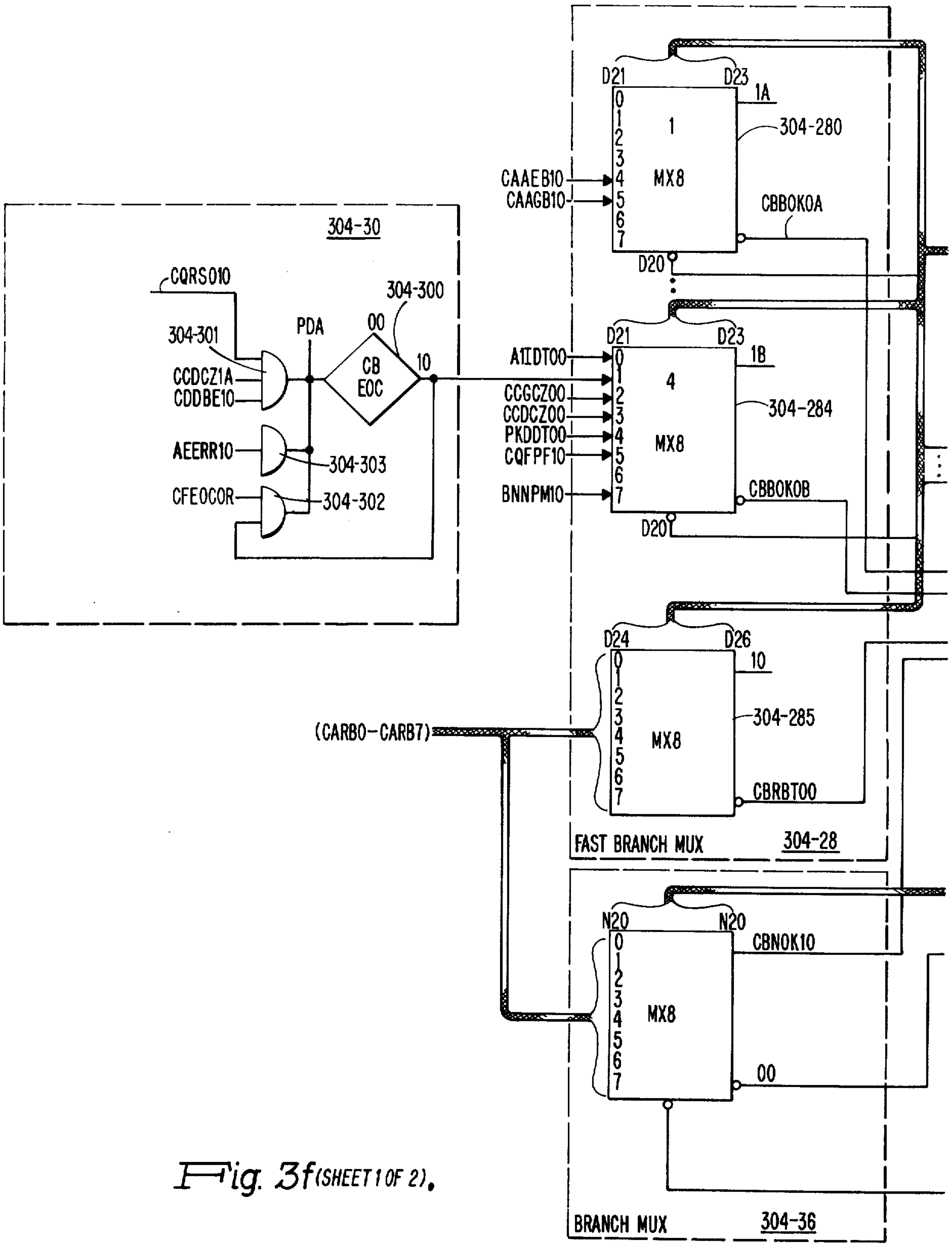
Fig. 3f (SHEET 1 OF 2).

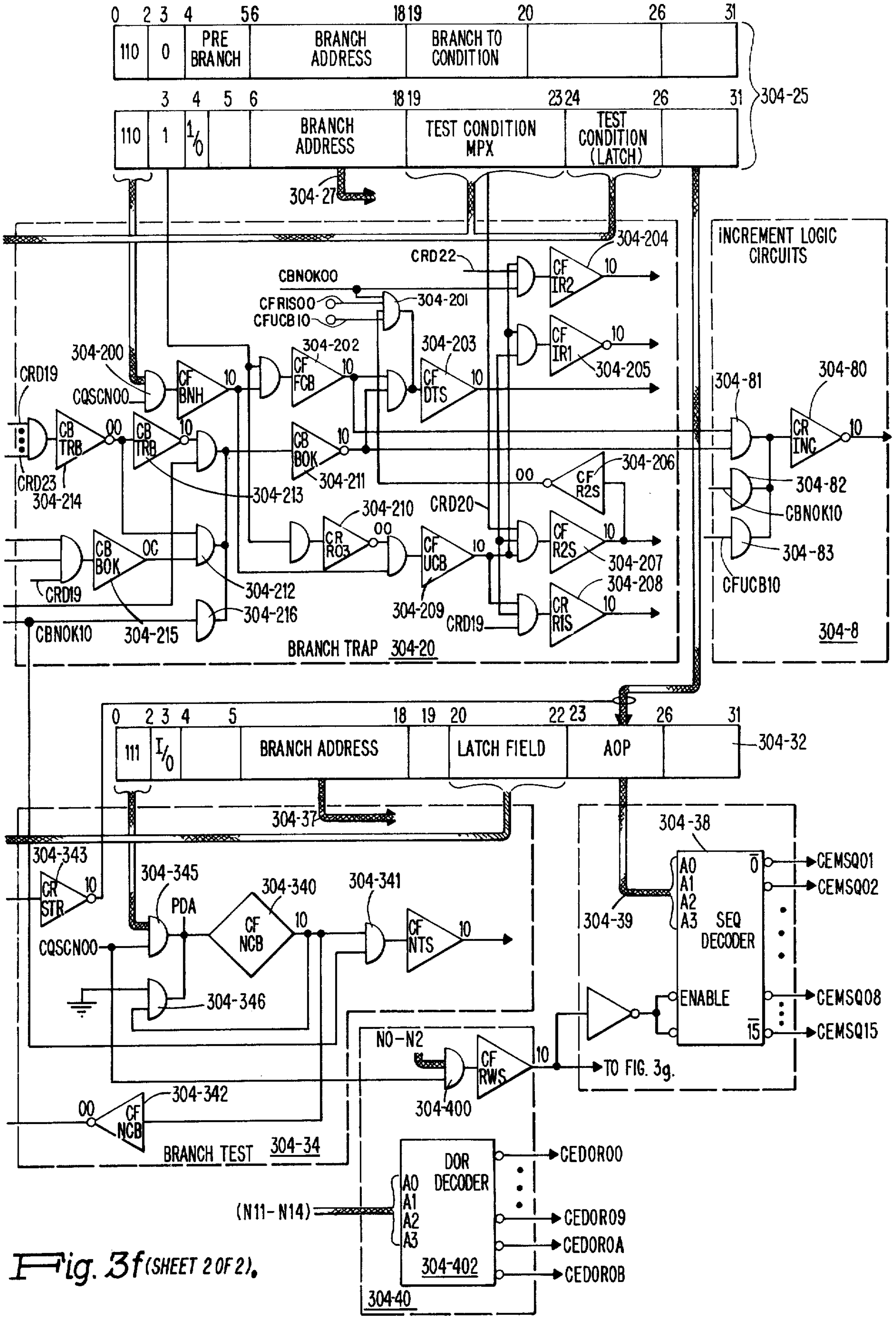
Fig. 3f (SHEET 2 OF 2).

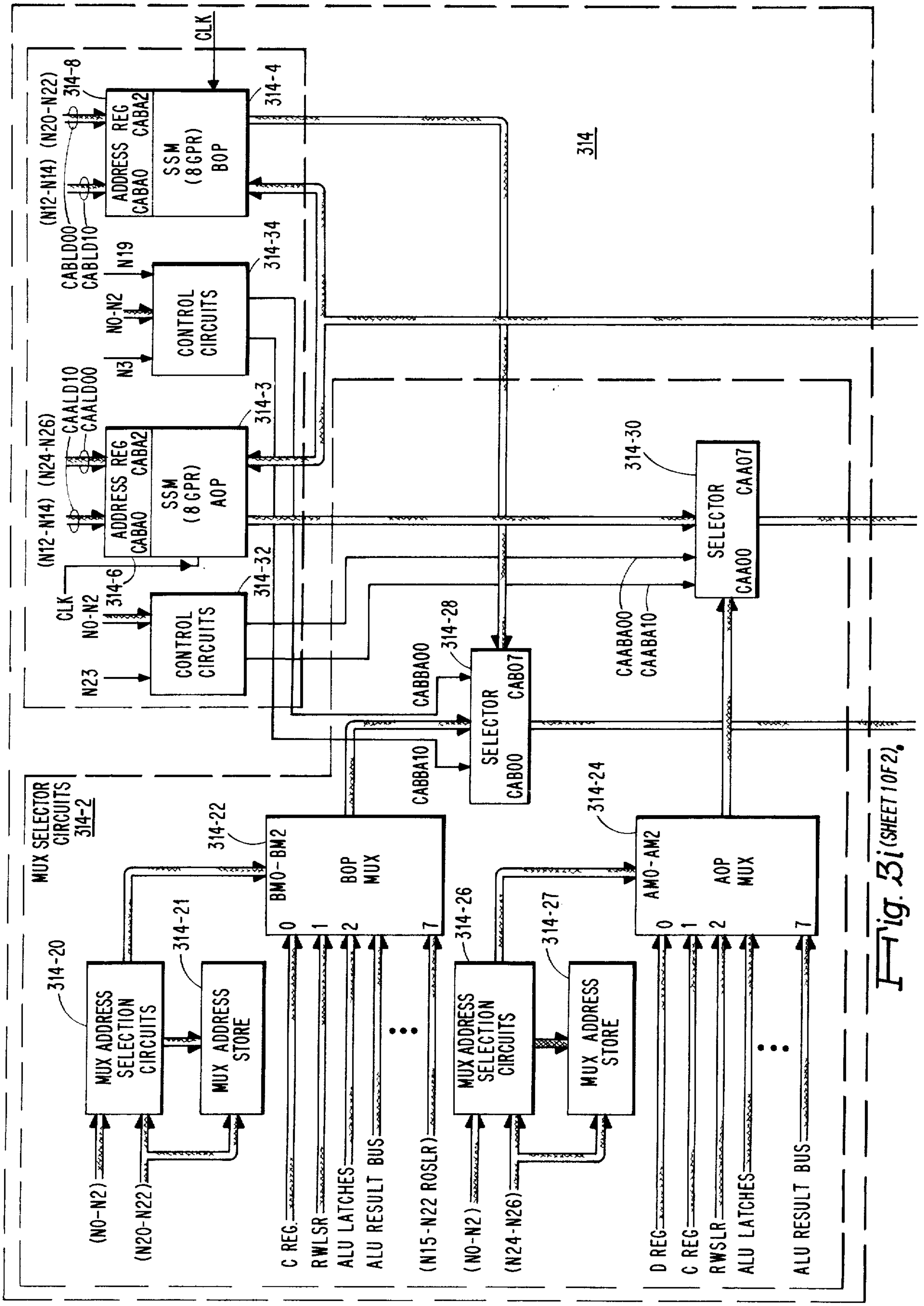
Fig. 3i (SHEET 1 OF 2)

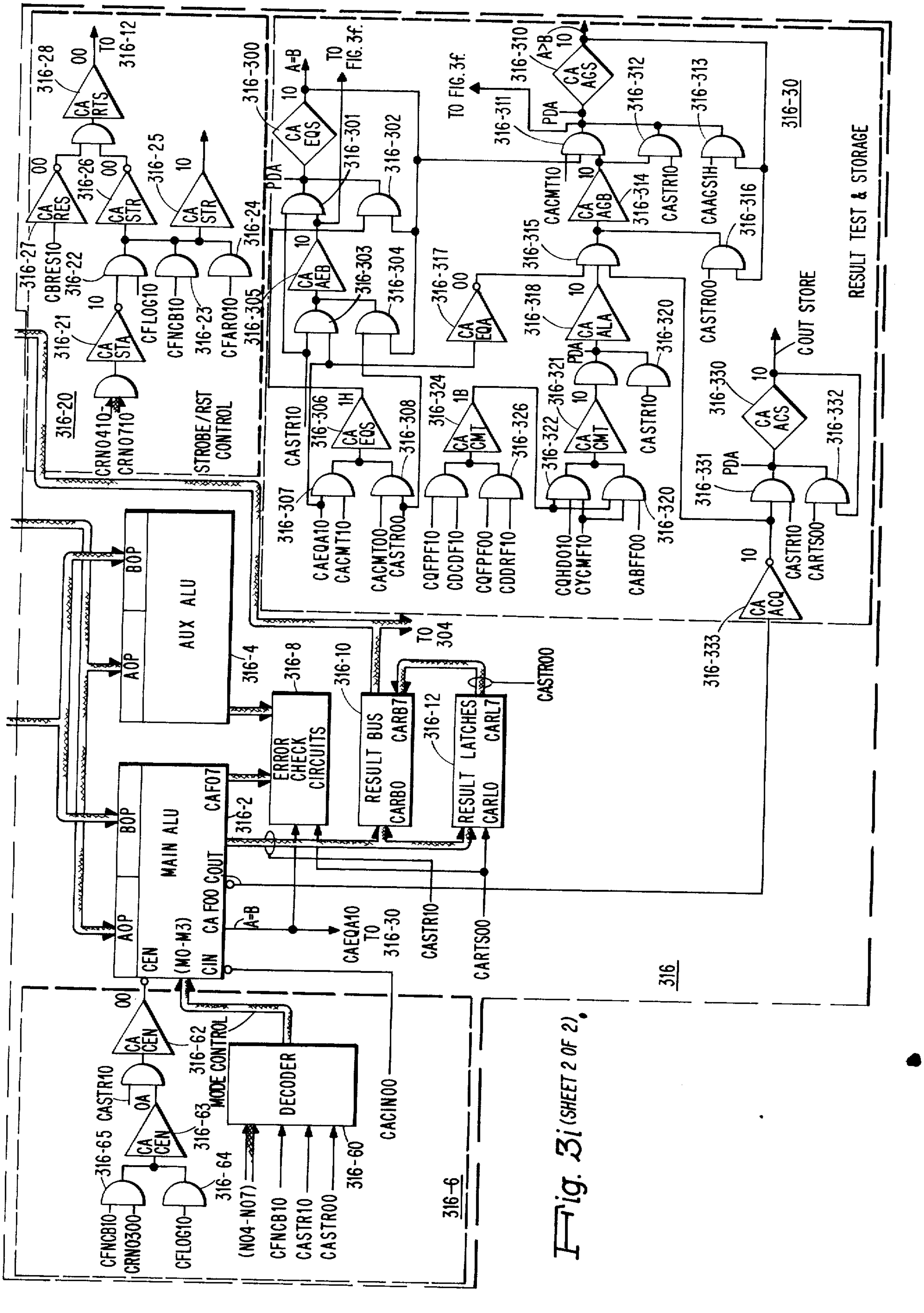
Fig. 3i (SHEET 2 OF 2)

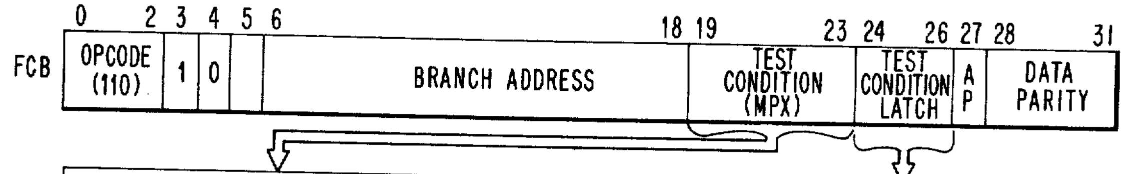

| TABLE 1 | |
|---|---|
| 19 —— 23 | TEST CONDITIONS |
| 00000 | C REG. FULL |
| 00001 | C REG. NOT FULL |
| 00010 | D REG. FULL |
| 00100 | ALU RESULT A=B |
| 00101 | ALU RESULT A>B |
| 01001 | END OF COMMAND FLOP |
| 01010 | GAP COUNTER NOT=0 |
| 01011 | DATA CKT NOT=0 |
| 01100 | DATA TRANSFER FLOP NOT |
| 01101 | REQ DATA FLOP NOT |
| 01110 | FORMAT FLOP |
| 01111 | PSI COUNT ZERO |
| 10101 | OPERATIONAL OUT FLOP |
| 10110 | DO SERVICE CODE FLOP |
| 11001 | TERMINATE OUT STORED |
| 11111 | TEST TABLE 2 CONDITIONS |

| TABLE 2 | |
|---|---|
| 24 — 26 | TEST CONDITION |
| 000 | TEST ALU RESULT LATCH BIT 0 FLOP |
| ⋮ | ⋮ |
| 111 | TEST ALU RESULT LATCH BIT 7 FLOP |

Fig. 4c.

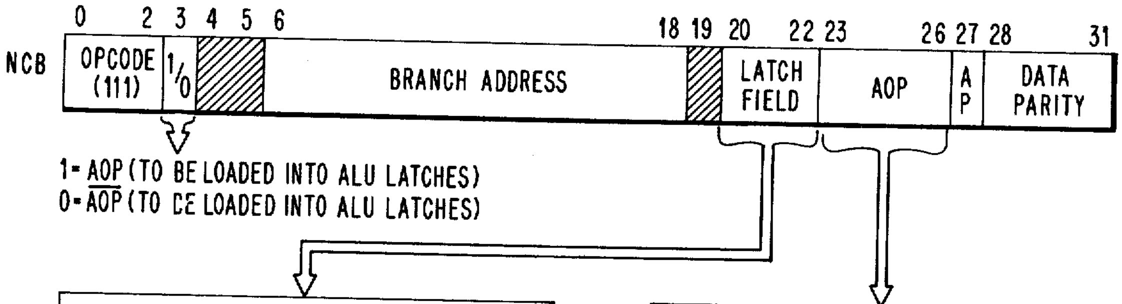

| TABLE 1 | |
|---|---|
| 20 — 22 | TEST CONDITION |
| 000 | TEST ALU RESULT LATCH BIT 0 FLOP |
| ⋮ | ⋮ |
| 111 | TEST ALU RESULT LATCH BIT 7 FLOP |

| TABLE 2 | |
|---|---|
| 23 — 26 | TEST CONDITION |
| 0000 | GEN PURPOSE REG 0 |
| ⋮ | ⋮ |
| 0111 | GEN PURPOSE REG 7 |
| 1000 | D REG |
| 1001 | C REG |
| 1010 | RWSLR |
| 1100 | ALU RESULT LATCH |
| 1110 | DATA COUNTER (LOW) |
| 1111 | DATA COUNTER (HIGH) |

Fig. 4d.

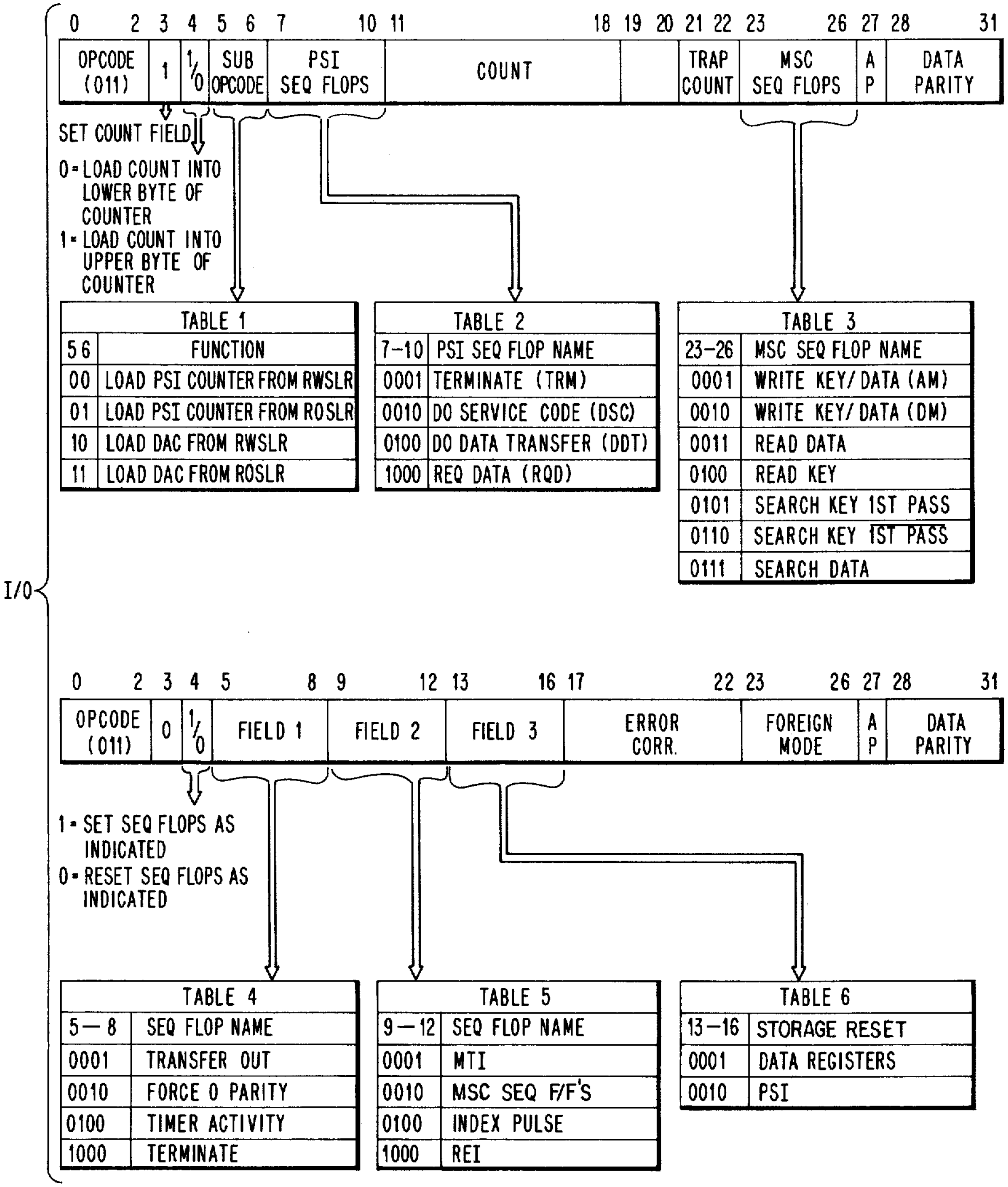

| TABLE 1 | |
|---|---|
| 5 6 | FUNCTION |
| 00 | LOAD PSI COUNTER FROM RWSLR |
| 01 | LOAD PSI COUNTER FROM ROSLR |
| 10 | LOAD DAC FROM RWSLR |
| 11 | LOAD DAC FROM ROSLR |

| TABLE 2 | |
|---|---|
| 7–10 | PSI SEQ FLOP NAME |
| 0001 | TERMINATE (TRM) |
| 0010 | DO SERVICE CODE (DSC) |
| 0100 | DO DATA TRANSFER (DDT) |
| 1000 | REQ DATA (RQD) |

| TABLE 3 | |
|---|---|
| 23–26 | MSC SEQ FLOP NAME |
| 0001 | WRITE KEY/ DATA (AM) |
| 0010 | WRITE KEY/ DATA (DM) |
| 0011 | READ DATA |
| 0100 | READ KEY |
| 0101 | SEARCH KEY 1ST PASS |
| 0110 | SEARCH KEY $\overline{\text{1ST PASS}}$ |
| 0111 | SEARCH DATA |

| TABLE 4 | |
|---|---|
| 5—8 | SEQ FLOP NAME |
| 0001 | TRANSFER OUT |
| 0010 | FORCE 0 PARITY |
| 0100 | TIMER ACTIVITY |
| 1000 | TERMINATE |

| TABLE 5 | |
|---|---|
| 9—12 | SEQ FLOP NAME |
| 0001 | MTI |
| 0010 | MSC SEQ F/F'S |
| 0100 | INDEX PULSE |
| 1000 | REI |

| TABLE 6 | |
|---|---|
| 13–16 | STORAGE RESET |
| 0001 | DATA REGISTERS |
| 0010 | PSI |

Fig. 4e.

MICROPROGRAMMABLE PERIPHERAL PROCESSING SYSTEM

RELATED APPLICATIONS

1. "Improved Search Processing Apparatus" invented by John A. Homberg, Albert T. McLaughlin, John J. Melus, Edwin J. Pinheiro, John A. Recks and George Rittenburg, filed on Dec. 18, 1973, Ser. No. 425,763 and assigned to the same assignee named herein.

2. "An Improved Microprogrammed Peripheral Processor" invented by John A. Recks and Edwin J. Pinheiro, filed on Dec. 18, 1973, Ser. No. 425,768 and assigned to the same assignee named herein.

BACKGROUND OF THE INVENTION

1. Field of the Invention

This invention relates to apparatus for interconnecting a plurality of peripheral devices to communicate with a data processing system. More specifically, the present invention relates to peripheral controllers which provide an appropriate interface for a plurality of mass storage devices, such as disc devices.

2. Prior Art

In order to provide greater efficiency in processing input/output operations, the burden of controlling input/output operations has been shifted to the peripheral controllers. This in turn has increased greatly the complexity of such controllers particularly where the controllers are required to handle data transfer operations involving devices having a variety of different operating characteristics. In order to reduce the cost of such controllers, many systems employ microprogramming. In general, the controllers have utilized general purpose microprocessors with tailored microprograms for different types of devices.

An important disadvantage of the above approach is that the speed of the data transfer operations performed by the microprogrammed peripheral controller is limited by the processing speed of the controllers microprocessor. Thus in order to provide reasonably efficient transfer rates, the microprocessor is required to operate at fast rates in order to provide the necessary transfer and control signals comparable with the processing rates of the devices. This in turn can increase greatly the cost of the peripheral controller. Moreover, when the system is required to handle faster input/output devices, this normally necessitates a complete redesign of the microprocessor.

Accordingly, it is a primary object of the present invention to provide a microprogrammed peripheral processor for processing data transfer operations between a channel and a peripheral device at a rate which is independent of the processor's processing rate.

It is a further object of the present invention to provide a peripheral processor for handling data transfer operations between a channel and a plurality of peripheral devices having a variety of different operating characteristics.

It is a still further object of the present invention to provide a peripheral processor which is able to handle high transfer rates utilizing a minimum of apparatus.

SUMMARY OF THE INVENTION

A microprogram peripheral processor includes a control store containing a number of microprograms for processing commands issued by a data processing unit and one of a number of peripheral devices. The peripheral processor also includes control sequencing hardware apparatus which is arranged to be conditioned by microinstructions from the control store in response to the command issued. Upon being so conditioned, the hardware apparatus sets up the various data transfer paths between a designated peripheral device and a channel. Thereafter, the transfer proceeds under the control of the hardware apparatus at a maximum rate. During the data transfer, the microprogram processor idles or performs operations independent of the data transfer until it receives a signal from the hardware apparatus indicating a completion of the transfer operation. Upon receipt of the signal, the control processing is again transferred back to the microprogrammed processor.

Thus, the arrangement of the present invention the data transfer can proceed independently of the processing rate of the microprogrammed processor. That is, the arrangement of the present invention obviates the need for requiring the microprogrammed processor to execute a number of microinstructions for either transferring or comparing bytes as required by the commands issued to the processor. Additionally, the arrangement of the present invention eliminates the necessity for having to introduce into the peripheral processor additional hardware duplicating operations which are also provided for by microprograms normally included within a general purpose microprocessor. Hence, the arrangement of the present invention reduces costs to a minimum by reducing the amount of duplication or redundancy which results from the utilization of a general purpose microprocessor. Moreover, by reducing duplication, the arrangement of the present invention achieves high reliability.

The above and other objects of the present invention are achieved in the illustrative embodiment described hereinafter. The novel features which are believed to be characteristic of the invention, both as to its organization and method of operation, together with further objects and advantages will be better understood by the following description when considered in connection with the accompanying drawings. It is to be expressly understood, however, that each of the drawings are for the purpose of illustration and description only and are not intended as a definition of the limits of the present invention.

BRIEF DESCRIPTION OF THE DRAWINGS

FIG. 3*f* shows in greater detail the different branch circuits of FIG. 3*e*.

FIG. 3*i* shows in greater detail the ALU section 316 of FIG. 2.

FIGS. 4*a* through 4*g* shows the different microinstruction formats executed by the processor of the present invention.

TABLE OF CONTENTS

Figure 1:
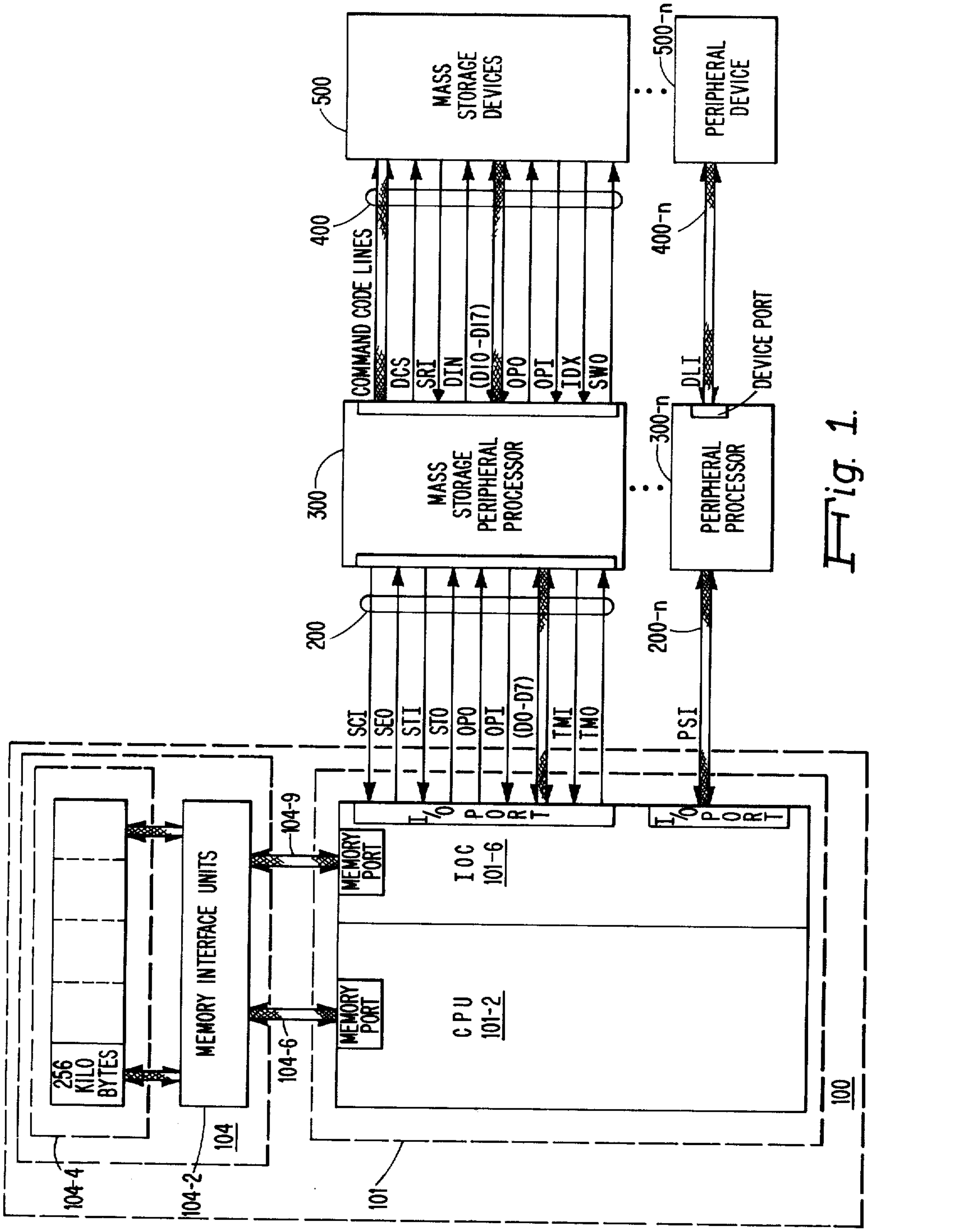
FIG. 1 is a diagrammatic illustration of a data processing system incorporating the principles of the present invention.
Figure 3A:
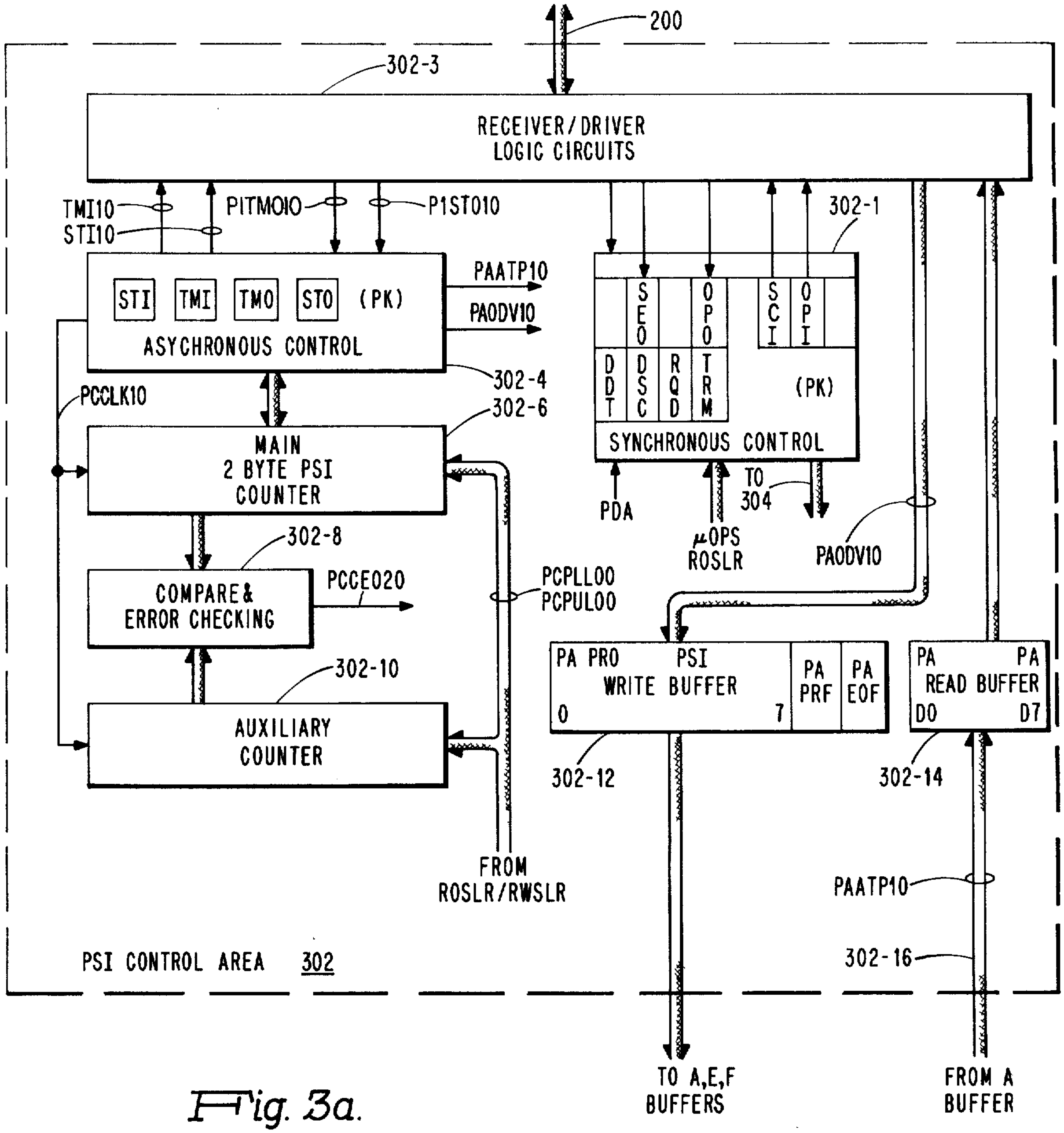
FIG. 3*a* shows in greater detail the PSI controls area of FIG. 2.
Figure 3B:
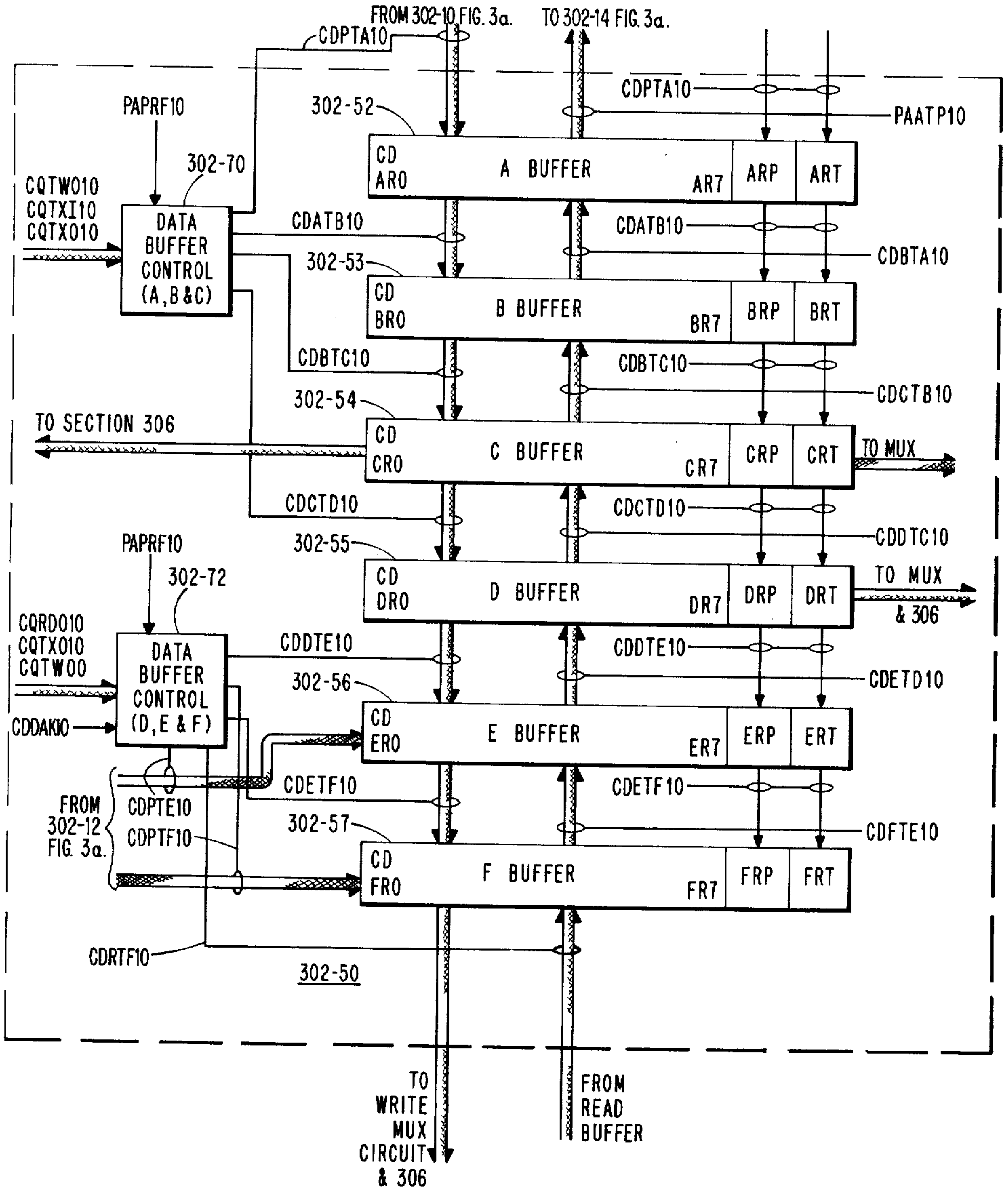
FIG. 3*b* shows in greater detail the Data Buffer Registers and Control Area 302-50 of FIG. 2.
Figure 3C:
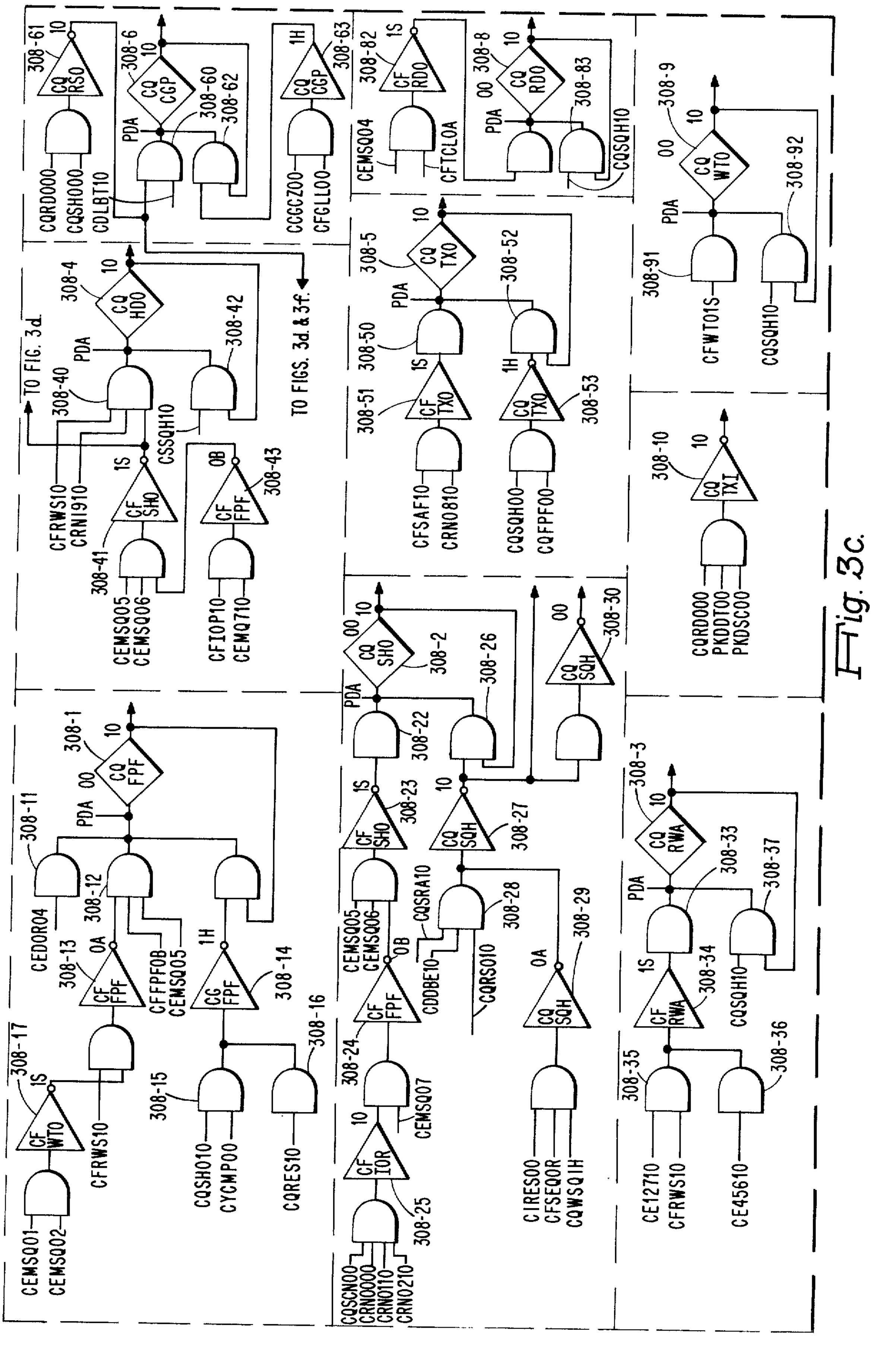
FIG. 3*c* shows in greater detail the control sequence storage of section 308 of FIG. 2.
Figure 3D:
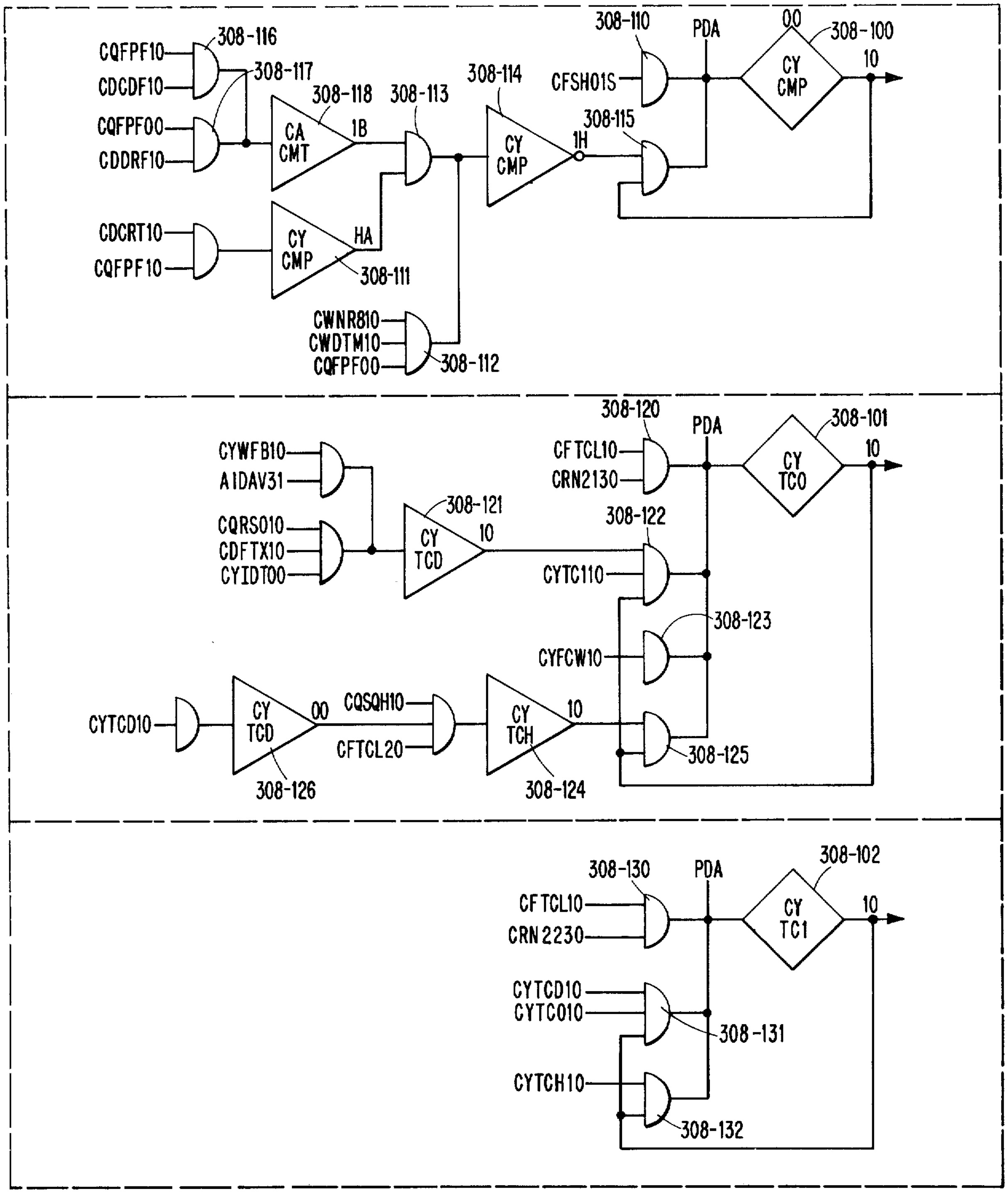
FIG. 3*d* shows in greater detail the counter controls of section 308 of FIG. 2.
Figure 3E:
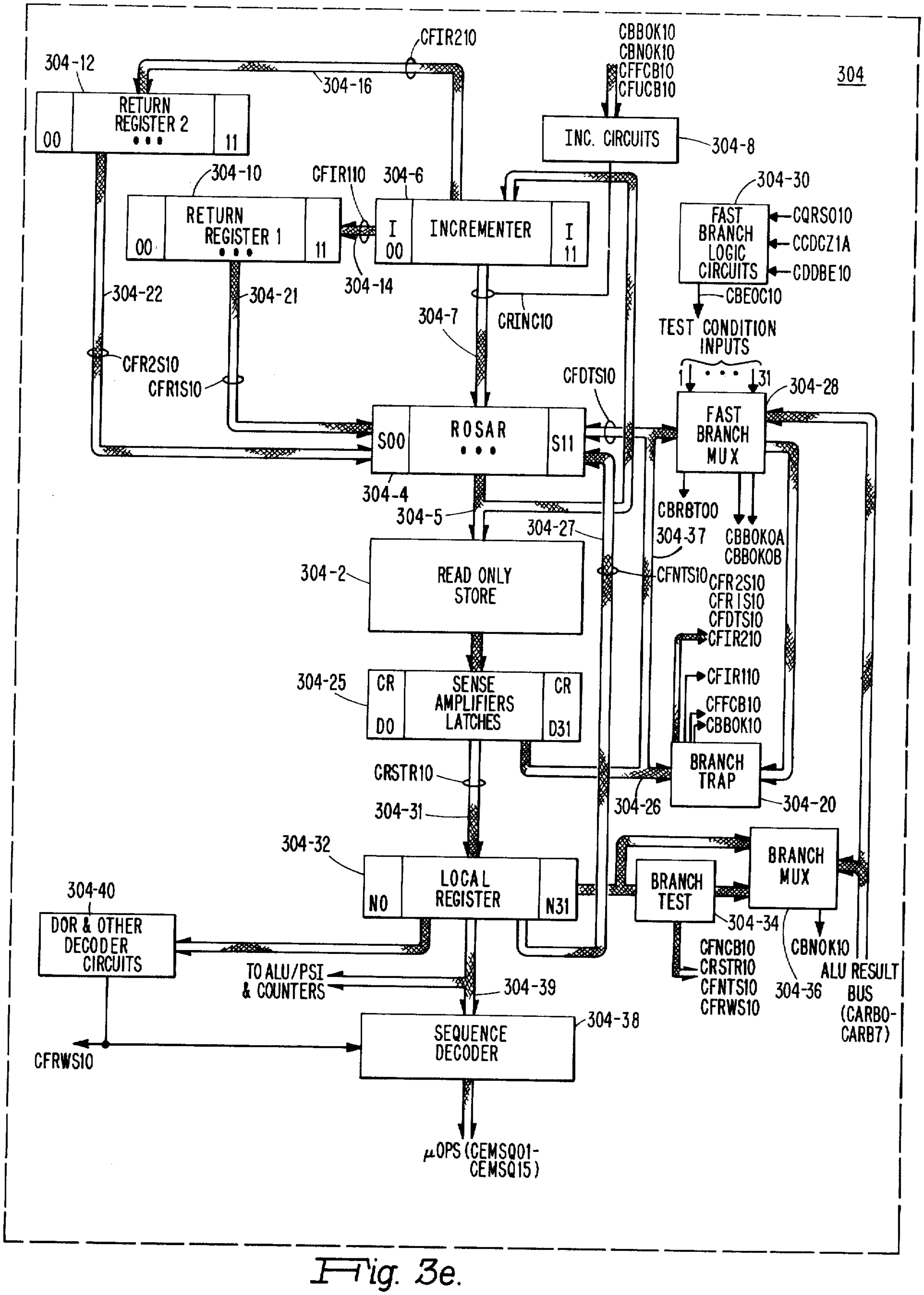
FIG. 3*e* shows in block form the read only storage controls section 304 of FIG. 2.

General Description of Overall System of FIG. 1
Peripheral Subsystem Interface Lines
Device Level Interface Lines
General Description of Mass Storage Processor
Detailed Description of Mass Storage Processor Sections
PSI Controls Section 302 and Buffer Section 302-50
High Speed Sequence Controls Section 308
Read Only Storage Controls Section 304
Microinstruction Formats
Detailed Description of the ROS Circuits of FIG. 3e
Read/Write Storage Section 306
General Register Section 314 and Arithmetic Logic Unit Section 316
Data and Gap Counter Section 318
Device Level Interface Control Section 310
Description of Operation
Appendix

GENERAL DESCRIPTION OF OVERALL SYSTEM OF FIG. 1

The present invention finds application primarily in a data processing system which includes an input/output subsystem in which a peripheral processor controls the operation of a plurality of peripheral devices in response to commands received from an input/output channel. This type of system can for the purposes of the present invention be considered conventional in design. Therefore, the system will be described only to the extent necessary in understanding the operation of the present invention. Also, for ease of reference, definitions of certain terms used herein are summarized in an appendix included herein.

Referring now to FIG. 1, there is shown a system which incorporates the microprogrammable peripheral processor of the present invention. The system includes a central processor complex (CPC) which includes those units used for addressing main storage for retrieving or storing information for performing arithmetic and logical operations upon data, for sequencing instructions in the order desired and for initiating communications between main storage and external devices. The main units of the central processor complex 100 includes a central processing unit (CPU) 102, a main memory subsystem 104 and an input/output controller (IOC) 106. The CPU executes instructions of one or more programs stored in the main storage subsystem 104. The IOC is that part of the system involved in the execution of commands used to carry out an input/output operation. An input/output operation is defined by a channel program. The program includes a plurality of instructions called commands. The operation is executed by a "channel". The channel includes the IO facilities, a hardware link between the IOC and peripheral processor termed a physical channel, and a logical channel. The logical channel is a collection of facilities in a peripheral processor which is required to execute an I/O operation defined by a channel program. Since channels are well known in the prior art, their operation will not be described in further detail herein.

A peripheral subsystem interface (PSI) 200 provides a transfer and control link for exchanging information between a mass storage peripheral processor 300 and the IOC 106. The exchange is accomplished by controlling the logical states of various signal lines in accordance with pre-established rules implemented through a sequence of signals termed "dialog". The interface includes a Service Code In line 200-1, a Service Enabled Out line 200-2, a Strobe In line 200-3, a Strobe Out line 200-4, a Terminate In line 200-4, a Terminate Out line 200-6, and an Operational In line 200-7, an Operational Out line 200-8, and data bus lines DO-DO7. The descriptions of the interface lines are given in greater detail in the section to follow.

PERIPHERAL SUBSYSTEM INTERFACE LINES

| Designation | Description |
|---|---|
| DO-7,DP | The data path lines are an one byte wide bidirectional path (eight bits + parity) that extends between the MSP and the IOC. The nature of the information on the data lines (i.e. data, service code, etc.) is determined by the dialog. |
| SCI | The service code in line extends from the MSP to the IOC. When set, SCI indicates that the MSP has a service code sequence to send to the IOC. This line is fully interlocked with a Service Enable out line. The MSP only transfers the service code sequence when the SEO line is high. The SCI line becomes high only when the SEO line is low. |
| SEO | The service enable out line extends from the IOC to the MSP and indicates when the IOC is ready to receive a service code sequence. The line is fully interlocked with the SCI line. |
| OPI | The operational in line extends from the MSP to the IOC. This line indicates the operational state of the MSP to the IOC. When activated, the OPI line indicates that the MSP is operational and capable of communicating with the IOC. When deactivated, it means that the MSP is powered down or is in a state that makes it incapable of responding to signals on the PSI. |
| OPO | The operational out line extends from the IOC to the MSP. This line indicates the state of the IOC. When activated, it indicates that the IOC is operational and capable of communication with the MSP. When deactivated, it signals that the IOC is powered down or is in a state that makes it incapable of responding on the PSI. |
| STI | The strobe in line extends from the MSP to the IOC. This line in conjunction with a strobe out line controls data transfers on the interface. For a read operation (i.e. data from the MSP), the STI line can only be set when the STO/TMO is reset. The STI line indicates to the IOC that data is present on the data lines. To obtain data the IOC responds by setting either the STO line or TMO line which resets the STI line. When the IOC detects the fall of the STI line, it takes the data from the lines. For a write operation, the roles of lines STO and STI are reversed. The IOC raises line STO when it puts data on the data lines. When the MSP detects the rise of line STO and it is ready to receive the data, it raises either line STI or line TMI. When the MSP detects the fall of line STO, it takes the data from the data lines. |

-Continued

| Designation | Description |
|---|---|
| STO | The strobe out line extends from the IOC to the MSP. This line is used by the IOC to indicate its participation in the dialog on the interface. For a read operation, STO is raised by the IOC when it detects the rise of STI (or TMI) and it is ready to obtain the data. On a read operation, STO cannot be raised if STI and TMI are both logical ZERO. When the MSP detects the rise of STO, it lowers STI (or TMI). Upon detecting the fall of STI (or TMI), the IOC takes the data from the data lines. If necessary, the IOC can hold up the dialog at this point by delaying the fall of STO. When it is ready to proceed, it lowers STO, indicating to the MSP that the data has been taken and that the data lines can now be altered. If the IOC terminates the current dialog, it will do so by raising TMO instead of STO for the last byte to be transferred. For a write operation, the STO line indicates to the MSP that the IOC has data ready for it. The IOC puts the data on the data lines and raises STO. The STO line may not be activated for a write operation unless the STI and TMI lines are reset. The STO line must be reset when STI (or TMI) is activated. When the MSP detects the fall of STO, it may then take the data. If necessary, the MSP can hold up the dialog at this point by delaying the lowering of STI (or TMI). When ready, the MSP lowers STI (or TMI) indicating to the IOC that the data lines can be now altered. |
| TMO | The terminate out line extends from the IOC to the MSP. This line is used by the IOC to end the current dialog. For a write operation, TMO can indicate one of the following conditions: (1) For a data transfer, TMO implies that a byte being transferred is the last byte of a field and the data count is exhausted. Since data chaining is transparent to the MSP, TMO raises only when the count of the last data chained CCE in the data chain array is exhausted. (2) For a command or IOC instruction transfer, TMO indicates that the transfer is complete with a byte being sent on the current transfer and that no more bytes are forthcoming. During a write operation, TMO can only rise if STI and TMI are low, and will fall when the IOC detects the rise of STI (or TMI). For a read operation, TMO is used in one of the following ways: (1) In a data transfer, TMO indicates that a byte being transferred exhausts the data count. Since data chaining is transparent to the MSP, TMO will only rise when the count associated with the last data chained CCE of the data chain array is exhausted. (2) In a service code sequence, TMO will be used in one of the following ways: 1. The IOC may raise TMO to stop the transfer of the sequence immediately (e.g. after detecting an error); 2. The IOC has received the maximum number of status bytes it can handle and the MSP is to stop any further transmission of status bytes in this service code sequence. In a read operation, TMO will be used in one of the above ways by being sent instead of STO. During a read operation TMO can only rise if STI (or TMI) is high, and will fall when STI (or TMI) falls. This line must be reset to a logical ZERO state when not in use. |
| TMI | The terminate in line extends from the MSP to the IOC. This line is used by the MSP to end current dialog. For a write operation, TMI is sent instead of STI and can indicate one of the following conditions: 1. For a data transfer, TMI indicates that a byte being received is the last byte the MSP will accept for this transfer sequence (e.g., media is exhausted), or that the MSP is temporarily suspending the data transfer sequence. 2. For a command transfer, TMI indicates that a byte being received is the last byte required by the MSP. For a read operation, TMI is sent instead of STI and indicates one of the following conditions: 1. For a data transfer, TMI indicates that a byte being transferred is the last byte available from the media for this data transfer sequence, or that the MSP is temporarily suspending the data transfer sequence. The suspended sequence may be resumed by using the service code "Initiate Data Transfer - Resume". However, it is important to note that a service code that causes Command Pointer movement (for this same logical channel) will indicate termination of the data transfer (cannot be resumed), since the Move Pointer service code implies that execution of that CCE is complete. Thus, if the MSP intends to resume a data transfer that it is suspending, it should not send any Move Pointer service codes for that logical channel until after the transfer is resumed. 2. For a service code sequence, TMI indicates that the byte(s) being transferred is the last byte in the service code sequence. TMI must be set to logical ZERO when not in use. |

As seen from FIG. 1, the IOC 106 is capable of controlling a plurality of physical channels designated 200-1 through **200-*n* which connect the IOC with one of a number of peripheral processors 300 through 300-*n***. Each peripheral processor exchanges information with each of its associated peripheral devices over a device level interface (DLI) according to specific dialog sequences. The various lines which comprise the device level interface and descriptions are set forth in the table herein to follow.

DEVICE LEVEL INTERFACE LINES

| Designation | Description |
|---|---|
| DCP,DC0–DC5 | The command code lines carry encoded commands from the mass storage processor (MSP) to the mass storage device (MSD) for decoding and execution. |
| D1P,D10–D17 | The nine bidirectional lines are used to transfer data, address, control and status information between the MSP and a MSD. |
| DCS | A Device Command Strobe line when at a logical ONE signals when the signals on the command codes lines are valid for sampling. |
| OPI | An Operational In line which signals that the MSD is existent, powered up and capable of communication with the MSP. |
| IDX | An index mark line when at a logical ONE for 2 microseconds indicates the beginning of a logical track. |
| OPO | An operational out line which signals that the MSP is existent, powered up and capable of communication with the MSD. |
| DIN | A device initialize line which causes a MSD to place all its storage elements in an initialized state. |
| SRI | A serial read in line which during a write operation signals the MSP that the MSD is executing a write command. The MSD activates this line upon receipt of a write command and does not reset it until the trailing edge of DCS. During a read operation, this line contains the information read from the media. The read signal is produced by the heads, amplified and converted into digital form before applied to the SRI line. It contains a pulse for each transition recorded on the medium. This line is also used as a strobe to control interface dialog when information is transmitted over the bidirectional data lines. |
| SWO | A serial write out line transmits the information to be written. It contains a single logical ONE pulse for each transition to be recorded on the medium. This line is also used as a strobe to control interface dialog when information is transmitted over the bidirectional data lines. |

The device level interface provides for the exchange of data and control information between a peripheral processor and connected peripheral devices. It will be obvious that the interface lines are only common to a specific type of device. The specific interface disclosed connects a mass storage device 500 to the mass storage peripheral processor 300 as shown in FIG. 1. Just as the IOC 106 is capable of exchanging data and control information between a plurality of peripheral processors, each peripheral processor can exchange data and control information between it and a plurality of peripheral devices. For simplicity, only a single peripheral device is illustrated as being connected to each peripheral processor of FIG. 1.

Continuing on with the general description of FIG. 1, it is seen that the memory subsystem 104 includes a memory interface unit 104-2 and a main memory 104-4. As shown, the main memory subsystem can have from 1 to 4 memory ports, each port providing a storage capacity of 256 kilobytes. The memory interface unit 104-2 includes the logic and control circuits required for establishing communication between a memory port and the CPU and IOC. For the purposes of the present invention these units can be considered conventinal in design. In the preferred embodiment the main memory subsystem 104-4 utilizes a MOS semiconductor memory. As seen from FIG. 1, the main memory subsystem comprises 1 to 4 main memory units each coupled with the processor subsystem via a corresponding one of the cables 104-6 through 104-9 as shown. In the processor itself, a memory port connects a memory unit. Each main memory unit includes a memory controller or main store sequencing unit and up to 8 memory subunits. Each subunit includes 4 sections, each of which includes a 8K by 10 bit memory array. Each main memory controller is operative to perform the necessary read/write memory operations required for accessing a word of information which comprises for 9 bit bytes of information.

Before beginning a description of the invention utilized in the mass storage processor 300 of FIG. 1, first a discussion of the manner in which information appears on a storage system in which the present invention is used will be given. This description is given by way of example only and should not be construed as a limitation of the present invention.

Information is generally stored along circumferential tracks on a rotating device such as a disk, in records comprising a number of information fields. These fields include a count field, a key field and a data field. Normally, an index mark indicates the physical beginning of each track and all tracks on a disk pack are synchronized by the same index mark. Each track is headed by a home address field for address identification and a track descriptor record (record R0) for indicating the physical condition of the track. Each of the fields of information recorded on a track are separated by gaps. The gap lengths vary depending upon the storage device, location within the record, format, bit density and the record length.

An address marker indicates the beginning of each record for control purposes. Each address marker is preceded by a synchronization area which includes a plurality of synchronization signals used to synchronize the timing circuits used in the performance of a read operation. The various terms defined above are also given in a glossary of terms section which is appended as a portion of this specification. The significance of these fields will be described later in connection with FIGS. **5*a* and 5*b***.

GENERAL DESCRIPTION OF MASS STORAGE PROCESSOR 300

Figure 2:
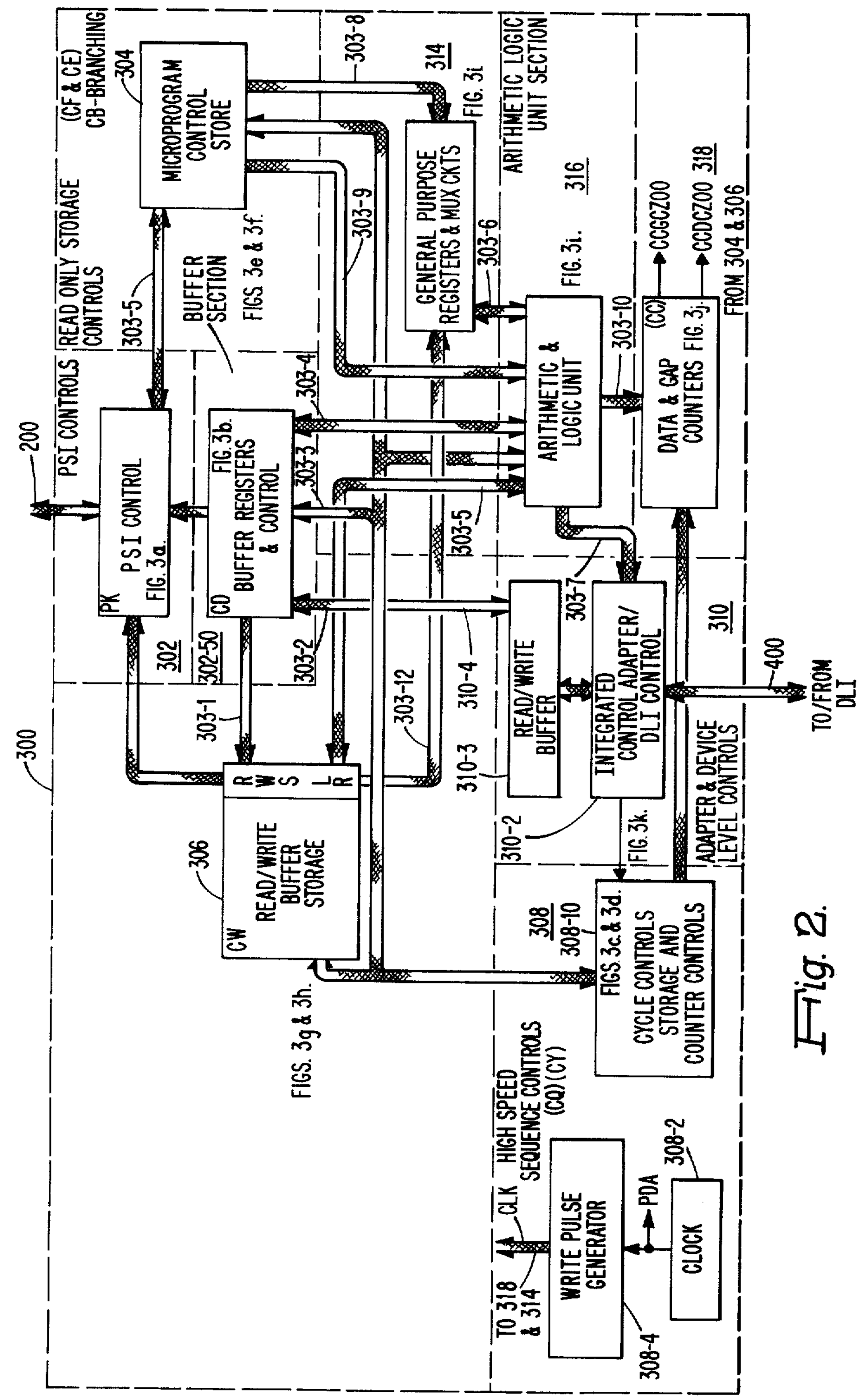
FIG. 2 shows in greater detail the peripheral processor 300 of FIG. 1.

FIG. 2 is a more detailed yet simplified diagram of a peripheral processor constructed in accordance with the principles of the present invention. Referring to the Figure, it is seen that the major sections of the processor 300 include: A Peripheral Subsystem Interface (PSI) Controls Section 302; a General Purpose Register section 314; an Arithmetic and Logic Unit (ALU) section 316; a Read Only Storage Control section 304; a High Speed Sequence Controls section 308; a Device Level Interface (DLI) Controls section 310; a Read Write Buffer Storage (RWS) section 306; and a Counter section 318.

The PSI controls section 302 includes logic circuits and buffer registers necessary to connect the processor with one byte wide asynchronous PSI interface 200 and sustain the required data and control dialog necessary for communication with the IOC. As seen from FIG. 2, this section couples to the various sections for receiving data and control signals via transfer conductor paths 303-1 through 303-5. The section 302 is divided into two areas: a PSI control area 302-1 and a buffer register and control area 302-50. These areas are described in greater detail herein. The ALU section 316 in addition to coupling to the Buffer section 302-50 also couples to the Buffer Storage section 306 and General Purpose Registers section 314 via paths 303-5 and 303-6 respectively. The ALU section 316 performs all logic, arithmetic and register transfers within the processor. The various modes of operation for the ALU are established by signals applied via conductor path 303-9 from the read only storage controls section 304. As described in greater detail herein, the section 316 includes a pair of identical arithmetic and logic units, conventional in design, designated as a main ALU and an auxiliary ALU, and their associated control and error checking logic circuits. Both ALUs are constructed of two 4 bis MSI ALUs which are interconnected to produce an 8 bit output. Depending upon the states of the input signals applied to the carry enable, carry in and mode control input terminals of the ALUs, the ALUs can be made to perform 16 logic or 32 different arithmetic operations upon the pair of operands being operated upon. Both ALUs operate upon the same operands simultaneously and the error checking circuits compare the results of both ALUs. The general purpose registers section 314 includes 16, 8 bit wide general purpose registers and provides storage for information required during a particular operation (e.g. command codes, ALU operands etc.). Additionally, the section includes 16, 8 input multiplexer-selector circuits, conventional in design, from which the contents of any one of 8 other sources can be applied to the ALUs as one of the operands. In a preferred embodiment, the general purpose registers correspond to storage locations of an addressable solid state scratch pad memory, conventional in design. The registers are addressable by the control store section 304 and the buffer storage section 306 via paths 303-8 and 303-12 respectively.

The gap and data counter section 318 also couples to the ALU section 316 via conductor path 303-10. This section includes data counter logic circuits and gap counter circuits provide primary count control during read, write and search operations. The data counter circuits provide a count of the number of bytes being operated upon. The gap count logic circuits provide orientation information by giving an accurate indication of the gap length between fields of a data record being read (e.g. the gap length between the header and key fields, the gap length between the key and data field, etc.). Each of the two counters, as explained in greater detail herein include a main and an auxiliary counter, together with decrementing and checking logic circuits. Each counter is constructed of 4 synchronous 4 bit binary counter chips which are connected to form a 16 bit counter. Both counters of the data counter are loaded by a microinstruction with the same count specified by the contents of either the ROSLR or RWSLR. Both counters are decremented and the states of both counters are compared by error checking circuits. When the circuits detect a non comparison, they cause an error indication to be set. Similarly, both counters of the gap counter are loaded via the ALU section 316 with same count derived from a constant field of a microinstruction. When enabled, the counters are decremented by clock pulse signals from a clock 308-2 (i.e. the counter is decremented by one every 600 nanoseconds). Error checking circuits check the counters for proper operation in the same manner as the operation of the data counter is checked.

The read only storage controls section 304 provides storage for resident control and diagnostic microprograms (i.e. 4K, 32 bit words of storage). The section, as described in greater detail herein, has a control store which includes two sections. One section is used for native operations and the other section is used for emulation of foreign systems. In the preferred embodiment, control store is unalterable and is constructed of programmable read only memory (PROM) chips, conventional in design. Obviously, the control store can also be constructed of random access memory (RAM) chips, conventional in design. Thus it can be loaded with microinstructions by external means, such as a tape cassette device.

The section 304 also includes associated addressing, control, decoding and parity logic circuits. Additional address storage circuits are included to enable branching between three levels of microinstruction subroutines.

The read/write storage section 306 couples via conductor paths 303-1, 303-5 and 303-12 to the other sections as shown in FIG. 2. This section includes a read/write alterable storage of 1.5K ×10 bits used for storing device parameter bytes in addition to providing temporary storage for control and data handling operations (e.g. status and address information).

The Device Level Interface Controls section 310 includes an integrated control adapter designated as block 310-2 which couples to paths 310-4 and 400. The adapter includes logic circuits and buffer registers required to establish an interface with disk storage devices of the system for controlling device operations and generating required dialogue sequences over the bus 400. That is, the section enables the selection of the designated disk device and execution of the various commands. The buffer registers provide an interface between the asynchronous operated device/adapter circuits and the synchronous operated mass storage processor logic circuits.

DETAILED DESCRIPTION OF MASS STORAGE PROCESSOR SECTIONS

Now, the above described sections will be described in greater detail with reference to FIGS. 3*a* through 3*k*.

PSI CONTROLS SECTION 302 AND BUFFER SECTION 302-50

The PSI Control Area 302 and Buffer Register and Control Area 302-50 are shown in greater detail in FIGS. 3*a* and 3*b* respectively.

Referring to FIG. 3*a*, it is seen that this area includes a plurality of receiver/driver logic circuits 302-3 which operate to provide digital control and data signals to interface 200. The receiver/driver circuits can be considered conventional in design and comprise a pair of differential amplifier circuits. Also, these circuits may take the form of the driver/receiver circuit invented by Nelson W. Burke disclosed in a patent application titled "Bidirectional Line Driver — Receiver Circuit" bearing Ser. No. 863,087, assigned to the same assignee named herein.

As seen from FIG. 3*a*, a read buffer 302-14 and a write buffer transfer information between the interface driver circuits and receiver circuits and the data buffers of the buffer section 302-50.

The read-buffer 302-14 includes a plurality of amplifier latching circuits, conventional in design. During read operations, the output signals from the A Buffer of section 302-50 applied via a bus 302-16 are loaded into the read buffer 302-14 when a control signal PAATP10 is switched to a binary ONE. As explained herein, this signal is generated by asynchronous circuits included in this block 302-4. Briefly, this block includes a plurality of latching amplifier circuits capable of being set and reset by the IOC via signals applied to various lines of the interface 200. For example, the asynchronous logic circuits signal the IOC of data stored in the read buffer by setting lines STI or TMI. The read buffer 302-14 stores bytes until the IOC resets one of the lines STO or TMO which in turn resets corresponding ones of the latching circuits.

The write buffer 302-12 includes a plurality of register stages, conventional in design. The buffer 302-12 receives input signals which are stored in the buffer in response to an output Data Valid signal PAODV10 being switched to a binary ONE. This signal is generated by asynchronous logic circuits when the IOC forces strobe output signal P1STO10 from a binary ONE to a binary ZERO. The contents of the write buffer are selectively loaded into the A, E, or F buffers as a function of their availability of section 302-50 by controls signals generated by control circuits 302-70 and 302-72 in response to signal PAPRF10.

The PSI control area 302-1 also includes synchronous control logic circuits included within 302-12. The synchronous control circuits include a plurality of flip-flops which can be settable by micro-operation signals from the read only storage controls section 304 applied via an input bus designated 302-14 in FIG. 3*a*. Also, the circuits can be set from signals applied via interface 200. For example, the micro-operation signals can initiate activity on the peripheral subsystem interface 200 by setting one of three sequence flip-flops included in this section. That is, a microinstruction can cause a setting of a request data flip-flop, RQD, conditioning the interface 200 to receive data bytes from the IOC. Also, micro-operation signals from another instruction can cause a do data transfer flip-flop, DDT, to condition the interface 200 to transfer data bytes to the IOC. Another microinstruction can produce micro-operation signals which condition a do service code flip-flop, DSC, to condition the interface 200 for signaling a transfer of service code or command information to the IOC. The other flip-flops include a terminate flip-flop, TRM, a service code in flip-flop, SCI, a service enable out flip-flop, SEO, an operational out flip-flop, OPO, and an operational in flip-flop, OPI, some of which are also set and reset by micro-operations signals for controlling the transfer of command and data bytes via interface 200. The operation of these flip-flops will be described in greater detail as is required for an understanding of the present invention.

Each of the flip-flops included within the synchronous control section 302-12 receives PDA clocking signals from a central clock or timing source 308-2 included in section 308. The clock can be considered conventional in design and can for example include circuits such as those disclosed in U.S. Pat. No. 3,725,871 which is assigned to the same assignee named herein.

It is also seen that section 302-1 includes a two byte or sixteen bit decrementing counter which includes 4, four bit binary counter stages, conventional in design. This counter is used by the asynchronous control logic circuits of block 302-4 to determine when a terminate in flip-flop TMI is to be set. An auxiliary counter 302-10 is also included to enable compare circuits of block 302-8 to detect the occurrence of a counter failure. That is, the auxiliary counter 302-10 and main counter 302-6 are both loaded in response to an I/O microinstruction from the same source (e.g. through the ALU section 318 from either the control store of section 304 or buffer storage of section 306) and both are decremented by a clocking signal PCCLK10 from the circuits of control 302-4. The compare circuits of block 302-8 check to determine whether both counters are at the same state when one of the counters has been decremented to zero. In the event they do not, the circuits cause the setting of an error indication. When both counters have been decremented to zero, the circuits of block 302-8 switch a count equal zero signal PCCE020 to a binary ZERO. This indicates that the required number of bytes have been transferred (i.e. no error indicated). For further information as to the types of circuits which can be used to implement the counters, registers and other units described herein, reference may be made to the publication titled "The Integrated Circuits Catalog for Design Engineers" by Texas Instruments Inc. dated 1972.

From FIG. 3*b*, it is seen that area 302-50 includes six registers 302-52 through 302-57, herein referred to as registers A through F, and associated control logic circuits included within blocks 302-70 and 302-72. Each register includes 11 stages: 9 for storing the 8 data bits and parity bit of a byte, 1 for storing a marker ror register full indicator bit and 1 for storing a terminate out indicator bit. Data and control information bytes are transferred between the read and write buffers of area 302-1 and a write multiplexer circuit and a read buffer, parallel by bit or byte serial. The direction of transfer and path is determined by the states of flip-flops included within the High Speed Sequence Controls section 308. As explained herein, these flip-flops are preset to certain states by microinstructions and the input signals applied by the flip-flops to the circuits of the control blocks 302-70 and 302-72 condition the circuits for such transfers.

The types of modes of operation which can be specified are as follows. The first mode (a no sequence active mode — NSA) represents the static state of the processor in which no data transfers to/from the disk units or to/from the IOC take place. The circuits of block 302-70 and 302-72 are conditioned such that registers 302-52, 302-53 and 302-54 are operatively coupled to the PSI and registers D, E and F are operatively coupled to the device adapter 310-2. The states of a pair of signals CQTXI10 and CQTX010 generated by a Transfer In and a Transfer Out flip-flops included in the sequence control circuits establish the direction of byte transfers for the groups of registers A through C and D through F. For example, the directions of transfer for the states of these signals as follows:

1. CQTXI00(1) = PSI ⟶ REG. A ⟶ reg. B ⟶ reg. C ⟶ wait for processor (firmware) action;
2. CQTXI10(1) = reg. C ⟶ reg. B ⟶ reg. A ⟶ wait for PSI action;
3. CQTX000(1) = Device Adapter ⟶ reg. F ⟶ reg. E ⟶ reg. D wait for processor (firmware) action; and
4. CQTX010(1) = reg. D ⟶ reg. E ⟶ reg. F ⟶ raise request line ⟶ wait for Device Adapter action.

Other modes, submodes, are derived by utilizing the states of these two signals as follows:

1. CQTXI00 and CQTX000 — Normal state of the processor. In this mode, bytes are transferred from the PSI and/or device adapter into the processor.
2. CQTXI00 and CQTX010 — In this mode, control information bytes are transferred to the device adapter and/or device.
3. CQTXI10 and CQTX000 — In this mode, information such as service code bytes, status bytes are transferred to the IOC.
4. CQTXI10 and CQTX010 — In this mode, the transfers of modes 2 and 3 are combined.

Another mode is a write operation mode which is established by the state of a control signal CQWT010 generated by a write operation sequence flip-flop included in the sequence control circuits. When signal CQWT010 is switched to a binary ONE, it forces signal CQTX010 and CQTXI00 to a binary ONE and a binary ZERO respectively. These signals condition the registers to transfer bytes from the PSI to the device adapter or to the read/write store etc.

The next mode is a read mode of operation which is established by the state of a signal CQRD010 generated by a Read Operation sequence flip-flop included in the sequence control circuits. The signal CQRD010 together with signal PADDT10 from the PSI control area 302-1 causes the signals CQTXI10 and CQTX000 to be switched to a binary ONE and a binary ZERO respectively. This allows bytes to be shifted from the device adapter through registers 302-57 through 302-52 to the PSI.

A further mode is a search operation mode which is established by the state of a signal CQSH010 generated by a search operation sequence flip-flop included in the sequence control circuits. The signal CQSH010 conditions the RWS section during search operations allowing bytes transferred through the registers from the device adapter or the PSI to the ALU section 316 to be written into the read/write storage section 306.

The control blocks 302-70 and 302-72 as seen from FIG. 3b generates the signals required to transfer bytes between registers at the appropriate time (i.e. when the registers are empty). The signals shown are generated in accordance with the following Boolean expressions. The "+" sign and "." sign designate "or" and "and" operations respectively.

1. CDPTA10 = CQTXI00 · CPTE00 · CDPTF00 · PAPRF30 · CDARF00. This is a PSI to A register transfer signal which is forced high when the Transfer In flip-flop is in a reset state (i.e. signal CQTXI00 = 1) when there is no transfer from the PSI to either the E or F registers (i.e. signals CDPTE00 and CDPTF00 = 1), the A register is not full (i.e. signal CDARF00 = 1) and the write register is full (i.e. signal PAPRF30 = 1).

2. PAPRF10 = PKVSP10 · PAOVD10 + PAPRF10 · PKVSP10 · CDPTX20. This is the register full indicator for the PSI write register which sets whenever PAODV10 comes high and there is a valid sequence in progress (i.e. PKVSP10 = 1). This indicator resets when PTX comes high which transfers the contents of the write register into the A, E or F registers.

3. PAATP10 = [(PKDSC00 · PKVSP10 + PSKSEO1A · PKVSP10) PKSTO20 · PKTM020 · PKADV10 · PKSTI20 · PKTMI20 · PKDDT10] + PAATP10 · PKVSP10 · CDARF00. This is a transfer contents of A register into the PSI read register. It comes high only during read operations (i.e. data transfers to the IOC). It comes high whenever the PSI is in a read mode (i.e. PKDDT10 signal), there is no strobe cycle in progress, the sequence is valid, the PSI counter is other than zero and there is a valid byte in the A register (i.e. signal PKADV10 = 1). It stays set long enough to insure that signals PKSTI10, PKTMI10 and PKATP30 are set and the full indicator for the A register is reset (i.e. CDARF00 = 1).

4. CDATB10 = CQTXI00 · CDBRF00 + CDBTC10. The A register to B register transfer signal comes high when input transfer signal CQTXI00 is a ZERO and the B register is empty (i.e. signal CDBRF00 = 1). It also comes high when a B register to C register transfer signal comes high (i.e. signal CDBTC10 = 1).

5. CDBTA10 = CDARF00 · CDFTA00 · CQTXI10 · CFARL20. This is a B register to A register transfer signal which comes high when the transfer in sequence flip-flop is set (i.e. signal CQTXI10 = 1), the A register is empty (i.e. signal CDARF00 = 1) and there is no transfer being made from the F register or ALU (i.e. signals CDFTA00 and CFARL20 = 1).

6. CDBTC10 = CQTXI00 · CFCRL20 · CDCRF00 + CDCTD10 · CQTXI00. This is the B register to C register transfer signal which comes high when the transfer in sequence flop is reset (i.e. signal CQTXI00 = 1) and the B register is empty (i.e. signal CDBRF00 = 1). The signal is high when the contents of the C register are transferred to the D register or write operations (i.e. signals CDCTD10 and CQTXI00 = 1).

7. CDCTB10 = CDABE10 · CDFTB00 · CQTXI10 . This is a C register to B register transfer signal which is high when the transfer in sequence flop is set (i.e. signal CQTXI10 = 1), the A, B or both registers are empty (i.e. signal CDABE10 = 1) and there is no transfer being made from the F to the B register (i.e. singgal CDFTB00 = 1).

8. CDCTD10 = (CDDRF00 + CDFRF10) · CYWFB10. This is a C register to D register transfer signal which is high only during write operations.

9. CDDTC10 = (CDARF00 + CDBRF00 + CDCRF00) CQRD010. This is a D register to C register transfer signal which is high during a read operation (i.e. signal CQRD010 = 1) when the A, B or C registers are empty.

10. CDDTE10 = CQTX010 · CDPTE00 · CDIDE10. This is a D register to E register transfer signal which is high when the transfer out sequence flop is set (i.e. signal CQTX010 = 1), the E, F or both registers are empty (i.e. signal CDIDE10 = 1) and there is no transfer being made from the PSI to the E register (i.e. signal CDPTE00 = 1).

11. CDETD10 = CQTX000 · CDDRF00 · CFDRL20 · CDDTC10. This is an E register to D register transfer signal which is high when the transfer out sequence flop is reset (i.e. signal CQTX000 = 1) and the F register is empty (i.e. signal CDDRF00 = 1). The signal is high when the contents of the D register are transferred to the C register during read operations (i.e. signal CDDTC10 = 1).

12. CDETF10 = CQTX010 · CDEFA10 · CDPTF00. This is an E register to F register transfer signal which is high when the transfer out sequence flop is set (i.e. signal CQTX010 = 1), the F register is empty (i.e. signal CDEFA10 = 1) and there is no transfer being made from the PSI to the F register (i.e. signal CDPTF00 = 1).

13. CDFTE10 = (CQTX000 · CDERF00 + CDETD10) · CDFTA00 · CDFTB00. This is an F register to A register transfer signal which comes high when the transfer out sequence flop is reset (i.e. signal CQTX000 = 1), the E register is empty (i.e. signal CDERF00 = 1) and there are no transfers being made from the F register to the A or B registers (i.e. signals CDFTA00 and CDFTB00 = 1). The signal is high during the transfer of the contents of the E register to D register (i.e. signal CDETD10 = 1).

14. CDRTF10 = CDDAK10 · CQTX000 · CDFRF00. This is a read data to F register transfer signal which is high when a data acknowledge signal from the device adapter is high, the transfer out sequence flop is reset (i.e. signal CQTX000 = 1) and the F register is empty (i.e. signal CDFRF00 = 1).

HIGH SPEED SEQUENCE CONTROLS SECTION 308

This section includes the timing circuits of blocks 308-2 and 308-4 in addition to the circuits together with associated circuits. As mentioned, the clock 308-2, conventional in design generates the clocking pulse signal for the processor. The generator 308-4, conventional in design, generates write pulse signals of the correct polarity and phase from the PDA signals. These CLK pulses are applied to the register circuits and counter circuits of sections 314 and 318 and condition them for write and loading operations respectively. The various sequence and cycle circuits are shown in greater detail in FIGS. 3*c* and 3*d*. The sequence flip-flops of this section shown in FIG. 3*c* are settable by firmware at the start of an operation and reset by hardware at the completion of the operation. The control signals derived from the microinstructions have either a "CE" or "CF" prefix.

As seen from FIG. 3*c*, the hardware sequence circuits include a gate and inverter circuit 308-10, flip-flops 308-1 through 308-9 with associated gating circuits 308-11 through 308-92 arranged as shown. The fliplop 308-1 is a first pass/format flop which is set to a binary ONE during search operations/write operations. The flip-flop 308-2 is a search flip-flop which is set to a binary ONE during search operations. The flip-flop 308-3 is a read/write storage allow flop which is set to a binary ONE and enables hardware control over reading, writing and incrementing of the read write storage of section 306. The flip-flop 308-4 is a search header operation flop which when set to a binary ONE enables the ALU section to compare all ONE bytes in a search argument of a key field of a record during search key operations.

The flip-flop 308-5 is the transfer out sequence flop which as mentioned controls the direction of byte transfers through registers D, E and F. When set to a binary ONE, it enables transfer of bytes from the D to E and E to F registers and causes the switching of the CDDAK10 signal notifying the device adapter that there is a byte in the F register when the full flop is set to a binary ONE. When reset, it enables the transfer of bytes from the F to E and E to D registers. The gate and inverter circuit 308-10 generates the transfer in signal. As mentioned, this signal controls the transfer of bytes through registers A, B and C. When set to a binary ONE, it enables bytes to be transferred from the A to B and B to C registers. It is set during read operations (i.e. signal CQRD000 = 0) or when either the do data transfer or do service code circuits are enabled (i.e. signal PKDDTOO or signal PKDSCOO = 0).

The flip-flop 308-6 is a count gap flop which is set to a binary ONE during read/search operations when processing a last check byte (i.e. when either signal CQRD000 or CQSH000 = 0 and signal CDLBT1O = 1). It is also set during write operations by circuits not shown. The flip-flop 308-8 is a read operation flop which is set to a binary ONE during read operations. The flip-flop 308-9 is a write operation flop which is set to a binary ONE during write operations.

Certain ones of the signals generated by the above circuits are applied to the circuits of the hardware cycle counter which FIG. 3*d* discloses in greater detail. It is seen that the counter includes flip-flops 308-100 through 308-102 and associated input circuits 308-110 through 308-132 arranged as shown.

The flip-flop 308-100 is a compare cycle flop which is set to a binary ONE by firmware (i.e. signal CFSHOLS = 1) during a search operation. It is reset to a binary ZERO when a punctuation bit signal is sensed (i.e. singal CWNR810 = 1) and the first pass flop is not set (i.e. not first pass). It is also reset when a terminate out bit is sensed in the C register (i.e. signal CDCRT10 = 1).

The flip-flops 308-101 and 308-102 are connected to form a two stage trap counter. During a write operation (i.e. signals CYWFB10, AIDAV31 and CYFCW10 = 1), the counter inhibits decrementing of the data counter of section 318 and "traps" sync bytes or address and sync bytes. During a read operation, the counter inhibits the transfer of sync or leading bytes of a field of a record being read from being sent to the PSI (i.e. signals CQRS010, CDFTX10 and CYIDT00 = 1) but allows them to be written into the read-write storage section 306 as required (e.g. flag byte read during a read count operation).

READ ONLY STORAGE CONTROLS SECTION 304

FIG. 3*e* shows section 304 in block diagram form. It is seen that the section includes a read only memory 304-2, addressable via an address register 304-4 which applies a 12 bit address via a path 304-5. The same address is applied to an incrementer register 304-6. The register 304-6 conventional in design, enables its contents to be incremented by one and loaded into register 304-4 via path 304-7 in response to increment control signal CRINC10 being forced to a binary ONE by control circuits of block 304-8.

Additionally, the contents of register 304-6 are applied to a pair of return registers 304-10 and 304-12 via paths 304-14 and 304-16 respectively. The contents of the register 304-6 are selectively loaded into the return registers in response to one of a pair of signals CFIR110 and CFIR210 being forced to a binary ONE by the branch trap circuits of block 304-20. Similarly, the contents of return registers 304-10 and 304-12 are selectively loaded into address register 304-4 via paths 304-21 and 304-22 in response to one of a pair of signals CFRIS10 and CFR2S10 being forced to a binary ONE by branch trap circuits 304-20.

When addressed, the store 304-2 applies signals to the sense latching amplifier circuits of a register 304-25 which are in turn applied to the branch trap circuits 304-20 for decoding and to address register 304-4 via paths 304-26 and 304-27 respectively. When the branch trap circuits 304-20 decode a branch microinstruction and the test condition is satisfied, they force a signal CFDTS10 to a binary ONE and the contents of an address field are loaded into register 304-4.

Additionally, a portion of the contents from circuits 304-25 are applied to the multiplexer selector circuits of a fast branch MUX block 304-28 which also receives a plurality of test condition input signals on input terminals 1-31, one of which is applied from logic circuits of block 304-30 and input signals from the ALU section (i.e. bus signals CARB0-CARB7). The circuits of MUX block 304-28 generate output signals representative of conditions being tested which are applied to the branch trap block 304-20. This block will be described in greater detail in connection with FIG. 3*f*.

The contents of circuits 304-5 are selectively applied to the flip-flop stages of local register 304-32 via a path 304-31 and loaded into the register when circuits included in a branch test block 304-34 force a strobe signal CRSTR10 to a binary ONE. Portions of the contents of register 304-32 are applied to the branch test block 304-34 and to a multiplexer selector circuit included in a branch MUX block 304-36. Additionally, the mux block receives signals from the ALU as indicated. Also, register 304-32 loads an address into the address register 304-4 via a path 304-37 when the branch test block forces a signal CFNTS10 to a binary One. Circuits included within a sequence decoder 304-38 generate the micro-operation control signals in response to the signals applied via a path 304-39 from register 304-32.

MICROINSTRUCTION FORMATS

Before describing the various blocks of FIG. 3*e*, in greater detail, the different types of microinstructions and their formats will be described with reference to FIGS. 4*a* through 4*g*.

Figure 4A:
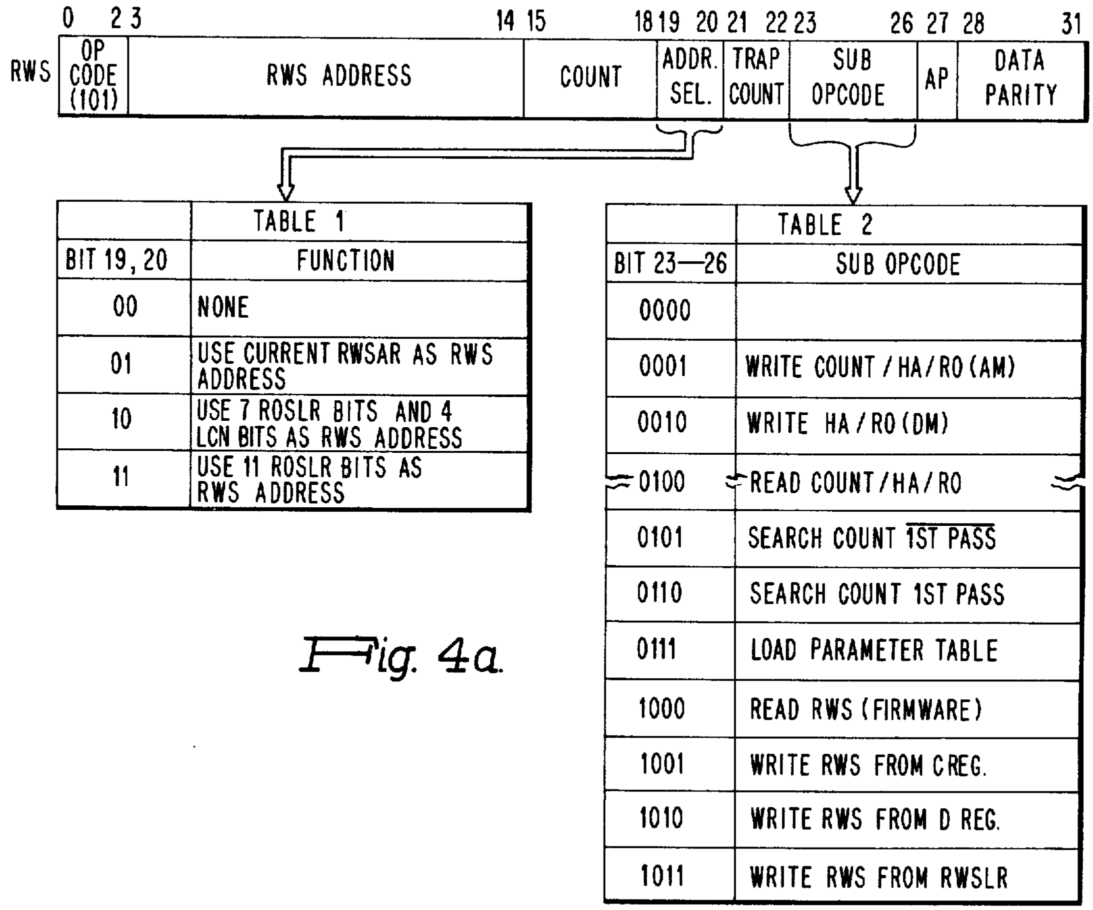

Referring to FIG. 4*a*, there is shown a read/write store (RWS) microinstruction word which is used to control the address and data path of information to be read from or written into the read/write storage section 306. As seen from the Figure, this microinstruction word has an op code of 101 specified by bits 0 through 2. Bits 13 and 14 form a field which indicates the location in the read/write buffer storage for reading out or writing into a single byte. In the case for more than a single byte read/write operation, the contents of this location specify a starting address. The next field is a count field which includes bits 15 through 18. This field is used primarily for read/write or search count or header address operations which require either the reading or writing of information continuously from or to respectively the read/write buffer storage section. For example, the four bit count specified by this field can be loaded into the low order byte position of the data counter contained within section 318 while the rest of the stages of the counter are filled with zeros by the hardware. Bits 19 and 20 serve as an address select field which can specify three ways by which the firmware can generate a read/write storage address. These ways are set out in the associated table. It is seen from this table that when this field is set to "01", the hardware utilizes the contents of the read/write storage address register without referencing the RWS address field of the microinstruction. When the field is set to "10", the firmware generates the read/write store address by loading a four bit current logical channel number (LCN) into bit positions 2 through 5 of a read/write store address register; the remainder of the address bits are taken from the RWS address field contained in the microinstruction. When this field is set to "11", the entire RWS address designated by the RWS address field of the microinstruction contained in the read only store local register is used.

Bits 21 and 22 serve as a trap count field and are used to specify the number of bytes which are to be masked in order to perform in various modes of operation. Bits 23 through 26 constitute a four bit field which is used to designate particular sequences required for read/write or search operations involving the storing of information into the scratch pad store of the read/write storage section. The table indicates the type of operations which are specified by different codings of the B sub op code bits.

Figure 4B:
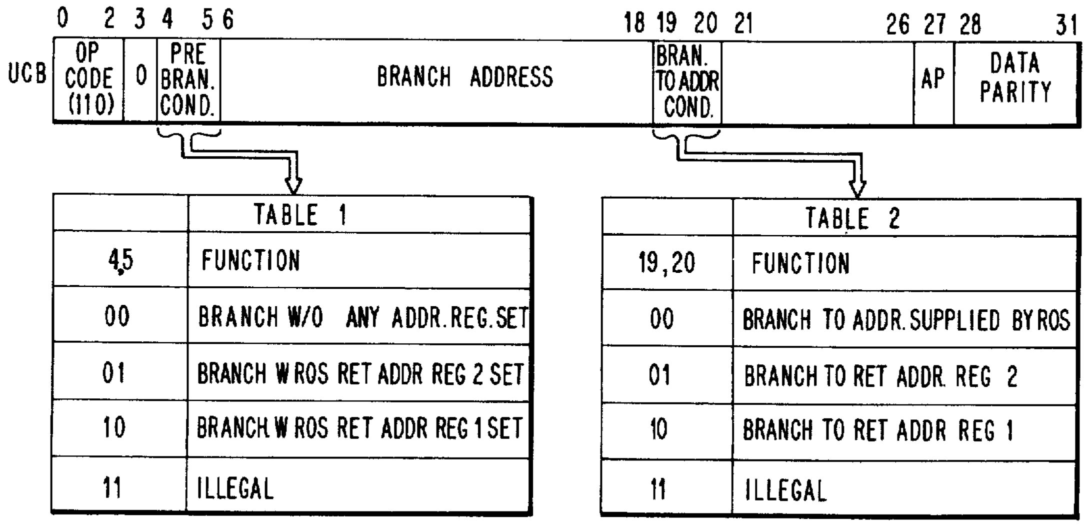

FIG. 4*b* shows the format of an unconditional branch microinstruction. This microinstruction is one of two "fast branch" microinstructions which requires that the bits of the microinstruction be decoded from the sense amplifier latches in order to enable generation of a next microinstruction word address within one clock pulse time period. As implied from the name, this microinstruction is used to specify a non test branch operation for the purpose of calling in another micro program or routine. The op code bits 0 through 2 as shown in FIG. 4*b* are coded as 110. Bit 3 is set to a binary ZERO to specify that this is an unconditional fast branch operation. Bits 4 and 5 correspond to a "prebranch condition" field which is used to specify the setting of a return address before the unconditional branch. More specifically, the read only storage control section 304, as mentioned, includes two branch return registers (i.e. return address register 1 and return address register 2) which are used to keep track of addresses when branching from one routine to another. As indicated by the table in FIG. 4*b*, when bits 4 and 5 are set to "00", branching occurs without requiring any return register to be set to a particular address. When the bits 4 and 5 are set to "10", the branching hardware is operative to increment by one the current address found in ROSAR (304-4) and store it into return address register 1 before branching to a new address. After the routine branch to has been completed, the contents of return address register 1 are used to return to the first or original routine. When bits 4 and 5 are set to "01", the return address register 2 is loaded with the address of the microinstruction after it has been incremented by 1. This address register provides a second level of branch return. As indicated by the same table, it is undesirable to set bits 4 and 5 to "11" because this will result in loading the same address into both address registers 1 and 2.

As indicated by the FIG. 4*b*, bits 6 through 18 constitute a 12 bit branch address wherein bit 18 is the least significant bit and bit 6 constitutes an odd parity bit. Bits 19 and 20 constitute a "branch to address condition" field which specifies the conditions indicated in the table. When these bits are set to "00", the store will branch to a location defined by the branch address of the microinstruction. When bits 19 and 20 are set to "01", the store branches to an address contained in return address register 1 while it will branch to the address contained in return address register 2 when these bits are set to "10". Similarly, bits 19 and 20 will not be set to "11" since this is defined as an illegal condition. Bits 21 through 26 normally contain all zeros since they constitute an unused field. The rest of the bits are as indicated.

FIG. 4*c* shows the format of the second fast branch microinstruction which corresponds to a fast conditional branch (FCB) microinstruction. As shown, it has the same op code as the unconditional branch microinstruction but has bit 3 set to a binary ONE. Bit 4 serves as a set return addresss register 1 field. When this bit is set to a binary ONE and the test result is positive, the contents of the read only store address register are incremented by 1 and stored in the return address register 1. The store then branches to the location specified by the branch address field of the fast conditional branch microinstruction. Bit 5 is a reset test flop field bit which when set causes certain test flops to be reset after completion of the test. One of these flip-flops corresponds to an end of command flip-flop described herein.

Bits 6 through 18 constitute a branch address field while bits 19 through 23 constitute a multiplex test condition field. The test conditions are defined as indicated in table 1 of FIG. 4*c*. There can be up to 31 flip-flops which are capable of being tested. The table indicates some of the more pertinent flip-flops. The test is made to determine whether or not flip-flop is in its binary ONE or set state. When this field is set to all ones, this indicates that none of the 31 test flops are to be tested but that one of the latches which receive the ALU result bus signals defined by bits 24 through 26 are to be tested. Bits 24–26 constitute a test condition latch field which is coded as indicated by Table 2. As explained herein, this field enables the contents of any one of the 8 bit registers delivered through the ALU section to be tested on a bit by bit basis.

FIG. 4*d* illustrates the format of a normal conditional branch (NCB) microinstruction. Unlike the fast conditional branch and unconditional branch microinstructions, this microinstruction is decoded at the output of the read only store local register and requires an interval of two clock pulse periods to obtain the results of the test. The normal conditional branch microinstruction enables the testing of any bit position (binary ONE and binary ZERO states) of a register specified by the A operand field of the microinstruction. As seen from FIG. 4*d*, this microinstruction has an op code of "111". Bit 3 indicates whether the binary ONE or binary ZERO of outputs of the registers specified by the A operand field are to be tested. Bits 4, 5 and 19 are unused fields and therefore set to binary ZEROS. Bits 6 through 18 constitute a branch address field while bits 20 through 22 constitute a latch field. As seen from the Figure, these bits when coded as indicated by Table 1 define the bit position of the ALU selected register to be tested. Bits 23 through 26 constitute the A operand (AOP) field which defines as indicated by Table 2 any one of 16 registers whose contents can be stored in the ALU latches.

FIG. 4*e* shows the formats of an input/output, (i.e. I/O) microinstruction. This microinstruction is used to condition the mass storage processor, PSI, and device adapter circuits to handle those operations requiring information transfers to/from the device adapter and IOC interfaces. As seen from FIG. 4*e*, this microinstruction word has an op code "011". Bit 3 corresponds to a set counter bit which when set to a binary ONE causes either an input/output counter or data counter to be loaded with either the contents of the count field which comprises bits 11 through 18 or from the RWSLR. This operation occurs for input/output operations such as a service code sequence, a write data sequence, a read data sequence, a search key or data sequence etc. When this bit is set to a binary ZERO, none of the aforementioned counters are loaded with information but only the sequence flip-flops are set as indicated by Tables 1 through 6 of FIG. 4*e*. Bit 4 is used when a count field is used (i.e. Bit 3 is a binary ONE). This bit is used to indicate to the processor which byte of the two byte PSI or data counters is to be loaded with the count specified by the count field. In the instance where two bytes are loaded into the counters, this requires two I/O microinstruction words. Every time the low order byte positions of a counter are loaded, the upper order byte positions of the same counter are all reset to binary ZEROS. When bit 4 is a binary ZERO, it indicates that the low order byte positions of the counter are loaded with the count field of the I/O microinstruction. Conversely, when bit 4 is a binary ONE, the upper byte positions of the counter are loaded with the microinstruction count field. When bit 3 of this microinstruction is set to a binary ZERO, this signals the processor which flip-flops in fields 1 through 3 and those in the error correction and foreign mode fields are to be set or reset. When bit 4 is set to a binary ONE, those flip-flops designated by these fields are set to binary ONES. When bit 4 is a binary ZERO, those flip-flops designated by the fields are reset to their binary ZERO states. Bit 4 has no significance when the fields are coded to contain all zeros. Tables 4 through 6 set forth representative codes for certain ones of the flip-flops contained within the mass storage processor.

Bits 5 and 6 specify a sub op code field when the count field is used (i.e. bit 3 is a binary ONE). The op code field defines which one of the counters (i.e. PSI byte counter or data counter) is to be loaded and the source of the count to be loaded (i.e. from the read/write storage local registers or read only store local register). Table 1 defines the various codings for these bits and corresponding functions. Bits 7 through 10 define a PSI sequence flop field when bit 3 is set to a binary ONE. These flip-flops, as mentioned above, set up the data paths for the PSI apparatus to handle data transfers between the IOC and mass storage processor. Table 2 illustrates the codes for designating different ones of these four flip-flops. While the coding of bits 7 through 10 illustrate the setting of a single flop, they can be modified to set more than a single sequence flop with a single microinstruction. Bits 11 through 18 designate a count field which is used by the processor to load either the PSI counter or data counter. When loading the two byte wide counters, either the PSI or sequence flops are set only when a count is being loaded into the upper byte stages of the counter. As indicated by FIG. 4*e*, bits 19 and 20 are unused bits when bit 3 is a binary ONE. Bits 21 and 22 serve as a trap count field when bit 3 is a binary one. This count field indicates the number of bytes to be trapped by the processor during a read, a write or a search operation. Depending upon the particular record format being processed, this field will be set to specify the correct number of bytes to be trapped. Bits 23 through 26 define a sequence flop field when the 3 is a binary ONE. The sequence flip-flops are set to predetermined states which in turn establish the path for accomplishing bidirectional transfers of information through the various registers of the MSP. The codings for these fields are as indicated in Table 3 of FIG. 4*e* and some of these flip-flops were previously discussed above.

When bit 3 is set to a binary ZERO, bits 5 through 26 are utilized as indicated by Tables 4 through 6.

Figure 4F:
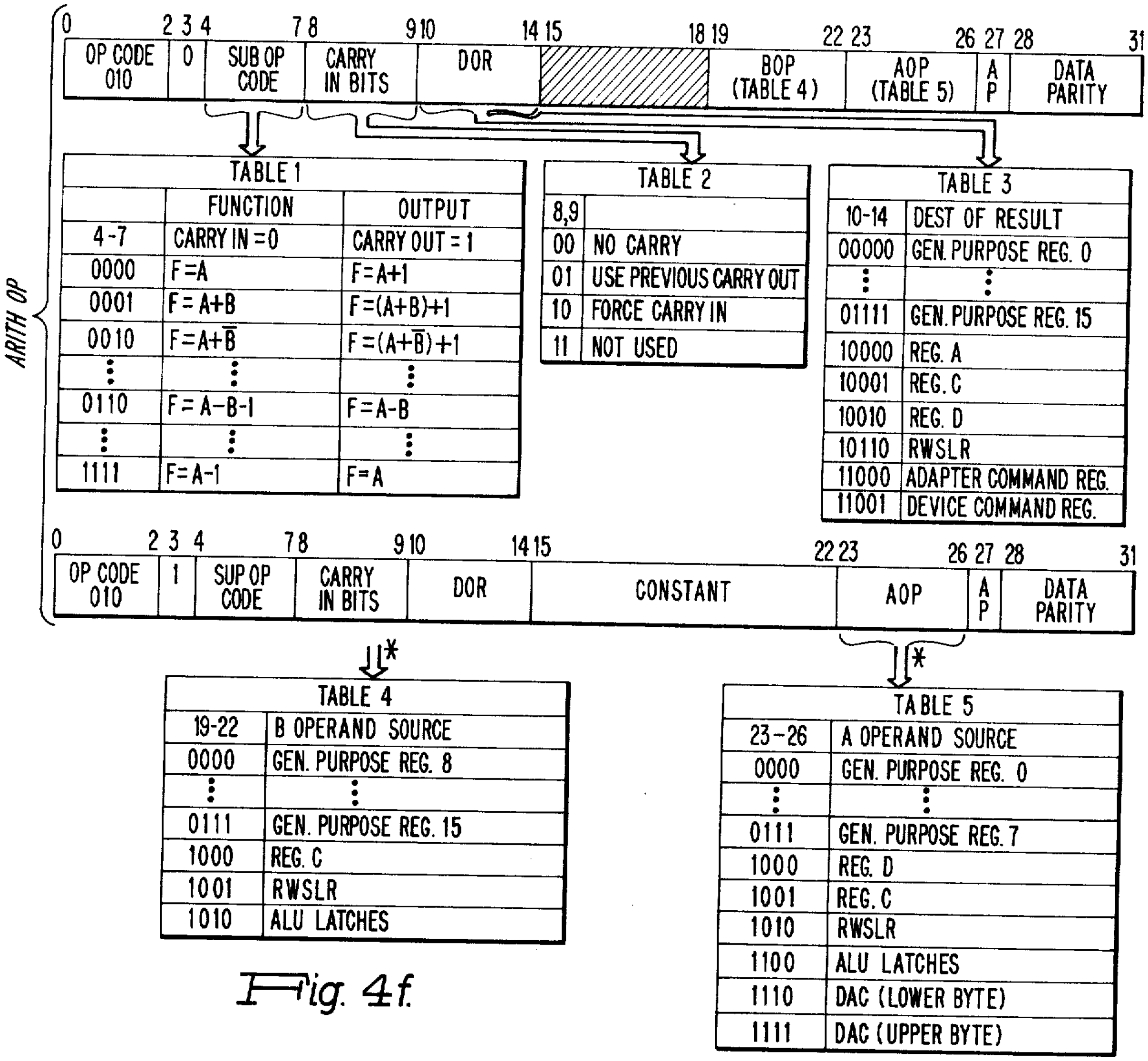

FIG. 4*f* illustrates two formats for microinstructions used for specifying different arithmetic operations. The arithmetic operation microinstructions include an op code "010". Bit 3 is used to indicate different formats of the microinstruction. Bits 4 through 7 constitute a sub op code field which defines up to 16 different arithmetic operations some of which are logical operations. Table 1 indicates certain ones of the arithmetic operations coded by bits 4 through 7. These operations are well known and therefore will not be described in greater detail herein. For further information, reference may be made to the aforementioned text published by Texas Instruments Inc. Bits 8 and 9 serve as a carry in field and are coded in accordance with Table 2 to specify three different carry in conditions for performing various arithmetic operations. Bits 15 through 18 are not used when bit 3 is a binary ZERO and therefore these bits are binary ZEROS. Bits 10 through 14 are coded as indicated by Table 3 to specify the destination of the result produced by an arithmetic operation. Bits 19 through 22 constitute a B operand (BOP) constant field which indicate the source of the B operand in accordance with Table 4. Similarly, bits 23 through 26 indicate the source of the A operand in accordance with Table 5. It will be noted from FIG. 4*f* that when bit 3 is a binary ONE, bits 15 through 22 are used as the B operand.

Figure 4G:
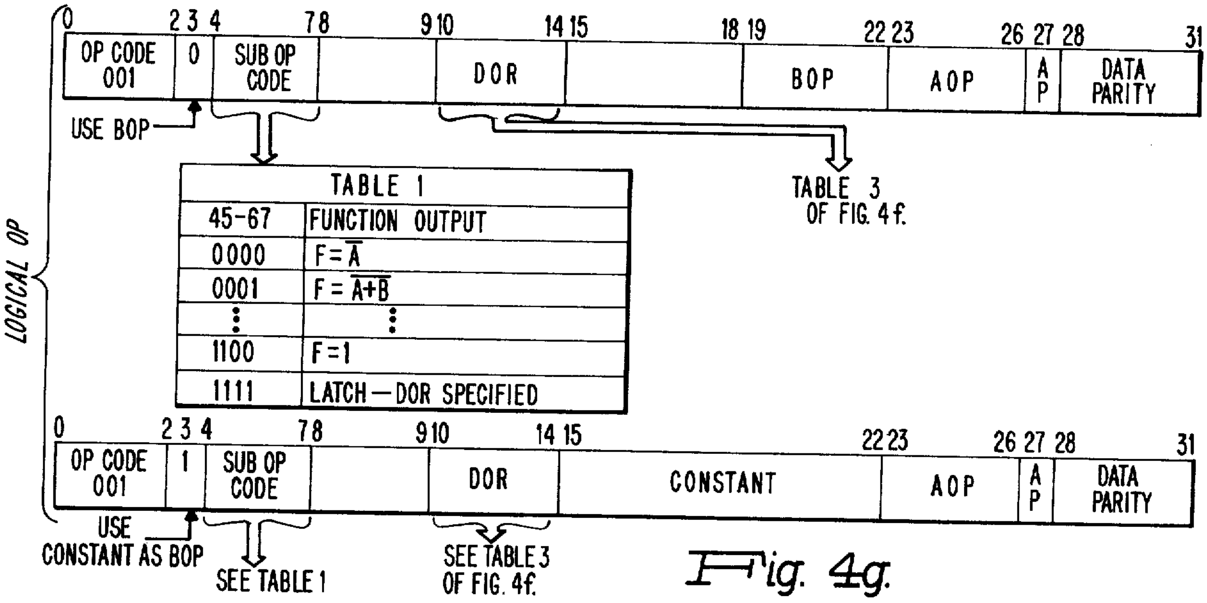

FIG. 4*g* illlustrates two formats for microinstructions used for specifying different types of logical operations. The logical operation microinstructions include an op code "001". The state of a format bit 3 when a binary ZERO indicates that one of the registers designated in the table is to be the source of the B operand. When bit 3 is a binary ONE, the 8 bit constant field of the microinstruction is the B operand. Bits 4–7 of a sub op code field designate the logical operation to be performed by the ALU upon the A and B operands. Table 1 indicates some of the type operations. However, the aforementioned text published by Texas Instruments may be consulted for more information.

Bits 15 through 18 are not used when bit 3 is a ZERO. Bits 10–14 constitute a destination of ALU result field and is coded to specify one of the registers in the table indicated for receiving the result generated by the ALU. All codes, except 11110 and 11111, cause the result to be delivered to the designated register as well as storing it in the ALU latches. With codes 11110 and 11111, the result is not transferred to a register but is only stored in the ALU latches.

As mentioned above, bits 19–22 define the source of the B operand to the ALU when bit 3 is a ZERO. Bits 15–22 define the B operand when bit 3 is a binary ONE. Also, bits 8 and 9 are not used in this type microinstruction. Similarly, bits 23–26 define the source of the A operand to the ALU.

DETAILED DESCRIPTION OF THE ROS CIRCUITS OF FIG. 3*e*

With reference to FIG. 3*f*, certain ones of the circuits of FIG. 3*e* will now be described in greater detail. Referring to this Figure, it is seen that the branch trap block 304-20 includes the circuits 304-200 through 304-215 which are arranged as shown. As mentioned, these circuits generate the required signals during the execution of the two fast instructions which are directly applied to the circuits by sense amplifier latches 304-25. The signals produced by the branch trap circuits are generated in accordance with the following Boolean statements.

1. CFDTS10 (ROS DATA TO ROSAR) = CFUCB10 . CBNOK00 . CFRLS00 . CFRS2S00 + CFFCB10 . CBBOK10.
2. CRDO310 (Fast Conditional Branch) = CFBNH10 . CDR0310.
3. CFIR110 (incrementer to return Reg 1) = CFUCB10 . CBNOK00
4. CFIR210 (incrementer to return Reg 2) = CBNOK00 . CFUCB10 . CRD2210.
5. CFRIS10 (return Reg 1 to ROSAR = CFUCB10 . CRD1910 . CBNOK00.
6. CFR2S10 (return Reg 2 to ROSAR) = CFUCB10 . CRD2010 . CBNOK00.
7. CBBOK10 (branch OK for FCB) = $\overline{\text{CBBOKOC}}$ . $\overline{\text{CBTRB00 + CBTRB10 . CBRBT00 + CBNOK10.}}$
8. CBBOKOC (FCB Test conditions) = CBBOKOA . CRD1900 . CBBOKOB.
9. CFUCB10 (Unconditional Branch) = CFBNH10 . CRDO300.

The signals CBBOKOA, CBBOKOB and CBST00 are derived from corresponding ones of the multiplexer selector circuits 304-280 through 304-285 included within the fast branch MUX block 304-28. These circuits receive a number of input signals from various parts of the processor and these signals representative of certain test conditions are sampled and the results of the sampling are applied to the branch trap circuits 304-20 as shown. One of the inputs applied to multiplexer circuit 304-284 is signal CBEOC10 which is generated by a flip-flop 304-303 included within the fast branch logic circuits of block 304-30. As shown, this block includes this flip-flop together with associated gating circuits 304-301 through 304-302 arranged as shown.

Other test signals include an index pulse not received signal A1IDT00 generated by the adapter section 310 in response to index pulse signal from line IDX, a gap counter not equal zero signal CCGCZ00 from section 318, a data counter not equal zero signal CCDCZ00 from section 318, a data termination flop not set signal PKDDT00 from section 302, and first pass/format flop set signal CQFPF10 from the high speed sequence controls section 308. It will also be noted that circuit 304-308 receives an A equal B signal CAAEB10 and an A greater than B signal CAAGB10 from the ALU section 316.

It is also seen from FIG. 3F that the branch test circuits of block 304-34 include the circuits 304-340 through 304-344 which are arranged as shown. These circuits are operative to generate branch signals in response to a normal condition branch microinstruction stored in read only store local register 304-32. Additionally, these circuits generate signals for enabling sequence decoder circuit 304-38 which is operative to decode bits 23 through 26 of the normal condition branch micro-instruction which are applied via path 304-39. The multiplexer selector circuits included within branch MUX block 304-36 provide a branch signal CBNOK10 in response to sampling one of the latches of the ALU section as specified by latch field bits 20 through 22. Additionally signal CBNOK10 is applied to the circuits included within increment logic circuit block 304-8. As shown, this block includes circuits 304-80 through 304-83. These circuits force signal CRINC10 to a binary ONE in accordance with the following Boolean statement:

CRINC10 (increment ROSAR) = (CBNOK00 . CFUCB00 . CRRES00) . (CFFCB00 + CBBOK00).

READ/WRITE STORAGE SECTION 306

Figure 3G:
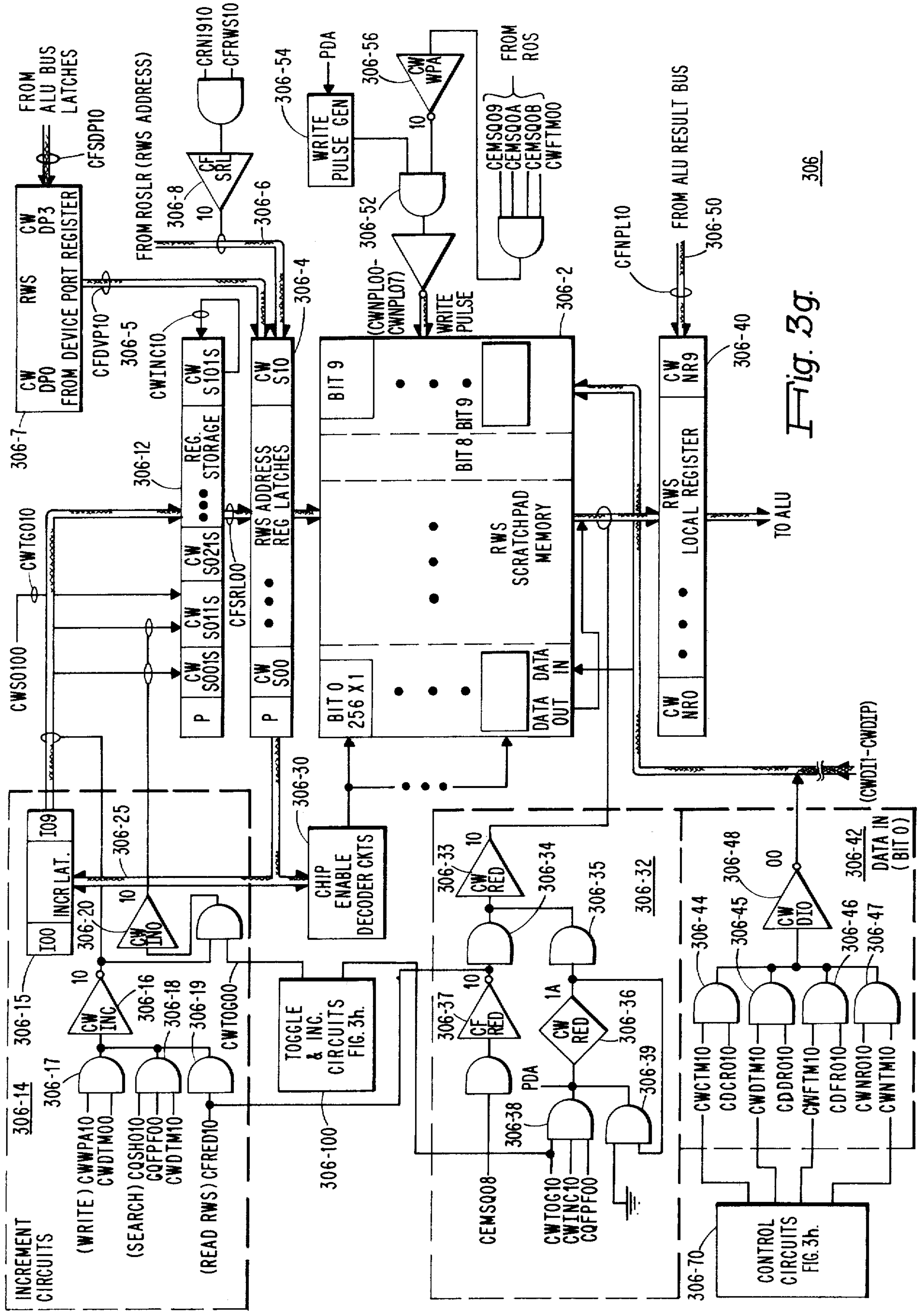
FIG. 3*g* shows in greater detail various portions of the Read Write Buffer Storage Section 306 of FIG. 2.
Figure 3H:
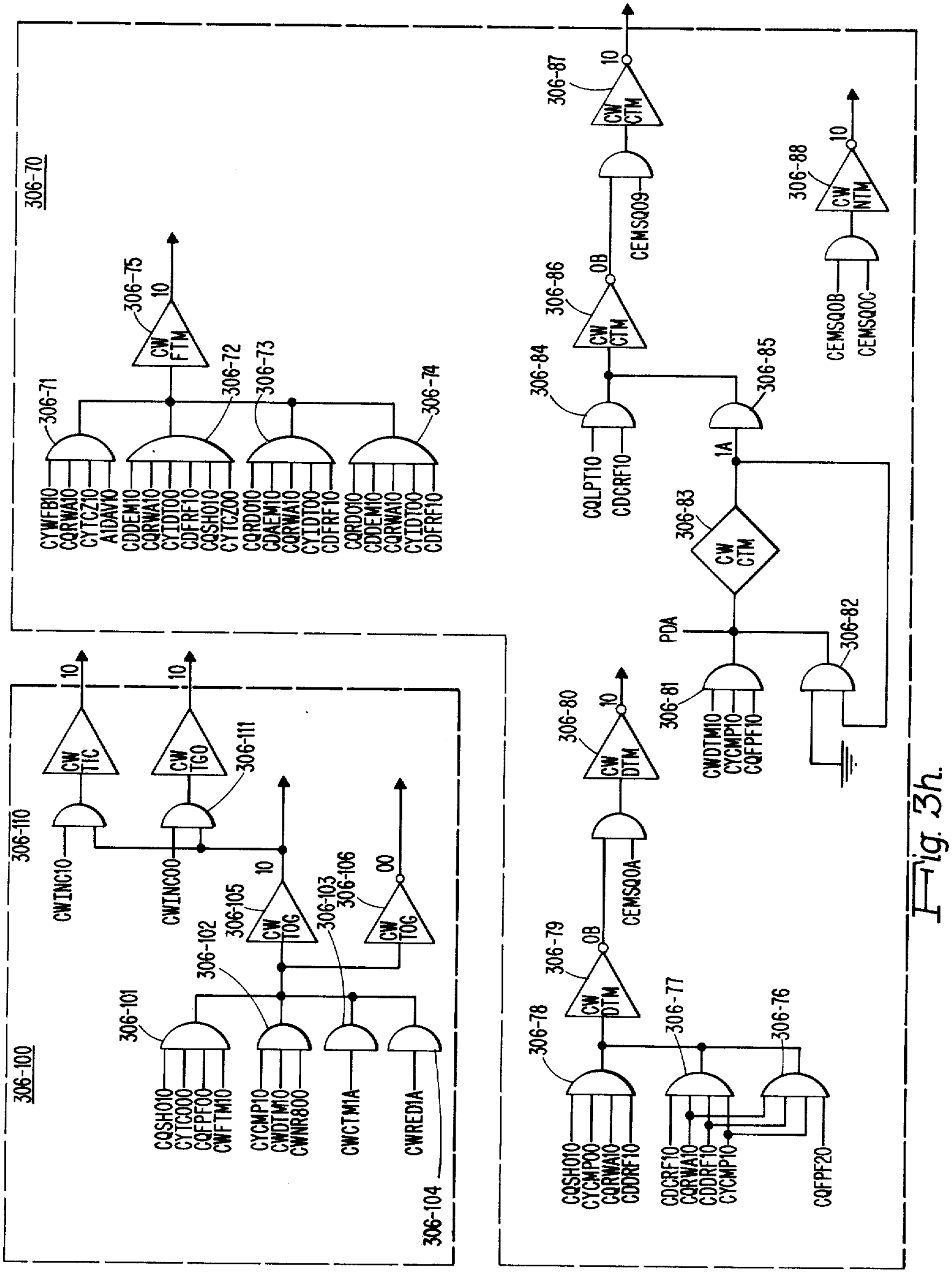
FIG. 3*h* shows in greater detail the control logic circuits 306-70 and toggle 1 increment circuits 306-100 of section 306 of FIG. 3*g*.

FIG. 3*g* and 3*h* show in greater detail the read/write storage section 306. As seen from the Figure, it includes a scratch pad memory 306-2 constructed from a number of 256x1 bit arrays, conventional in design, arranged as indicated. The memory 306-2 is addressed via an address register 306-4 which includes a number of amplifier latches. The register 306-4 can be loaded from the ROSLR via a bus 306-6 in response to a control signal CFSRL10 generated by an AND gate and amplifier circuit 306-8. Similarly, predetermined bit positions of the register e 306-4 can be loaded with a LCN bits from a RWS device port register 306-7 a path 306-5 in response to a control signal CFDVP10. As seen from FIG. 3*g*, register 306-7 is loaded from the ALU bus latches of Section 316. When signal CFSRL10 is a binary ZERO, register 306-4 can be loaded via a path 306-10 with an address supplied by register storage 306-12. This register receives an address from circuits of block 306-14 after the address from register 306-4 applied via a path 306-20 has been incremented by ONE and applied thereto when an increment signal CWINC10 and an increment only signal CWINO10 are both forced to binary ONES. The circuits 306-16 through 306-19 force signal CWINC10 to a binary ONE during all write operations, during search operations and read operations, in accordance with the expression:

CWINC10 = CWWPA10 . CWDTM00 + CQSH010 . CQFPF00 . CWPTM10 + CFRED10.

The circuit 306-20 forces signal CWIN010 to a binary ONE during search operations when signal CWTOG10 is a binary ZERO and CWINC10 is a binary ONE.

The high order three address signals from address register 306-4 are applied to chip enable decoder circuits 306-30 which generates enabling signals for each row of arrays. When the circuits of block 306-32 force read signal CWRED10 to a binary ONE, the byte contents of an address location are loaded into an output logic register 306-40. The circuits 306-33 through 306-39 of block 306-32 force signal CWRED10 to a binary ONE when the sequence decoder of section 304 generates signal CEMSQ08 and when flip-flop 306-36 forces signal CWRED1A to a binary ONE.

The block 306-42 shows a representative stage of the DATA IN circuits used in entering a bit of information into an addressed location. The circuits include AND gates 306-43 through 306-47 and amplifier circuits 306-48 arranged as shown. Gates 306-44 through 306-46 are used to store information from the C, D and F registers of the Buffer Section. Gate 306-47 is used to store information from local register 306-40. The various transfer signals are generated by the circuits of block 306-70 which will be described in connection with FIG. 3*h*. Also shown, the local register 306-40 can be loaded from the ALU section via a path 306-50 when the read only store forces a signal CFNRL10 to a binary ONE.

During a write portion of a memory cycle, a gate and inverter circuit 306-52 is enabled to apply a write pulse generated by write pulse generator 306-54 which drives a set of eight driver inverter circuits (e.g. CWWPL00 – CWWPL07) causing the information to be written into an addressed location. The circuit 306-52 is enabled when another gate and inverter circuit 306-56 forces a write pulse allow signal to a binary ONE.

FIG. 3h shows the circuits 306-71 through 306-88 of block 306-70 for generating the various transfer control signals CWDTM10, CWCTM10, CWFTM10 and CWNTM10. The AND gates 306-76 through 306-78 decode the states of certain ones of the sequence flip-flops and condition the inverter circuit 306-79 to force signal CWDTMOB to a binary ZERO for transferring bytes from the D register to the read-write store during other than a first pass search operation. This in turn causes the AND gate and inverter circuit 306-80 to force signal CWDTM10 to binary ONE. Similarly, the read only store by forcing signal CEMSQOA to a binary ZERO causing a transfer of bytes from the D register in response to the decoding of a "OA" contained in the sub op code field of a RWS microinstruction.

The circuits 306-81 through 306-86 decode the states of certain ones of the sequence flip-flops to force signal CWCTMOB to a binary ZERO when transferring bytes from the C register to the read-write store during a first pass search operation. Similarly, the read only store forces signal CEMSQ09 to a binary ZERO upon decoding of a "09" in the sub op code field of a RWS microinstruction. This allows the transfer of bytres from the C register to the read write store.

The AND gate and inverter circuit 306-88 enables the writing of the contents of the read-write store local register back into the read write store upon the decoding of either a "OB" or "OC" in the sub op code field of a RWS microinstruction. The AND gates 306-71 through 306-74 respectively force transfer signal CWFTM10 to a binary ONE during write count or key operations, bytes trapped by the trap counter during search operations, during read count or key operations when a byte is transferred from the register F.

In addition, FIG. 3h discloses the logic circuits of block 306-100 used to generate toggle signal CWTOG10, a toggle only signal CWTGO10 and a toggle and increment signal CWTIC10. These circuits by generating signal CWTOG10 provide the facility to increment the contents of the RWS address register through 512 memory storage locations within one clock (PDA) time. This arrangement facilitates the storage of information from two sources during search operations. That is, it enables the immediate storage of count and key field bytes from a selected device into a first group of storage locations (0–511) and the storage or search argument bytes from the IOC into a second group of locations (512–1023). The second most significant bit position (CWS01) is "toggled" between two states to logically increment/decrement the memory address by 512 locations since it has a positional value of 512.

The toggle logic circuits of block 306-100 include AND gates 306-101 through 306-104, amplifier circuit 306-105 and inverter circuit 306-105. The toggle signal CWTOG10 is generated in response to decoding the states of certain sequence flip-flops. In particular, AND gates 306-101 through 306-104 respectively force signal CWTOG10 to the proper state for storing a flag byte contained in the F register during a search operation not first pass, for storing a byte contained in the D register during any search operation in the compare cycle when the punctuation bit has not been sensed on a previous read cycle, for storing a byte contained in the C register first pass in the compare cycle and for read out of a search argument byte from the read/write store during a search not first pass operation.

The AND gate and amplifier circuits 306-110 and 306-111 of block 306-100 combine the toggle signal CWTOG10 with increment signals CWINC10 and CWINC00 as shown, to produce toggle only signal CWTGO100 and toggle and increment signal CWTIC10. With the increment signal CWINC10 set to a binary ONE, the toggle only signal CWTGO10 is held at a binary ZERO preventing the access of the next group of 512 storage locations. The AND gate 306-20 of FIG. 3*g* forces increment only signal CWINO10 to a binary ZERO when a signal CWTOG10 is a binary ONE enabling the address from the increment latches to be loaded into the address regisiter flip-flops. When CWSO110 of the address register is to be toggled to a binary ZERO and the address incremented by one, AND gate 306-110 switches signal CWT1C10 to a binary ONE.

GENERAL REGISTER SECTION 314 AND ARITHMETIC LOGI UNIT SECTION 316

FIG. 3*i* shows in greater detail sections 314 and 316. As seen from the Figure, the ALU includes a main ALU 316-2 and an auxiliary ALU 316-4 together with their associated mode select, carry-in and carry enable circuits (e.g. circuits of block 316-6) in addition to parity error check circuits 316-8. Since the auxiliary ALU 316-4 only serves to deuplicate the operation of the main ALU 316-2 for checking purposes, its associated circuits need not be shown and its operation need not be described.

The main ALU 316-2 is capable of performing 16 logical operations or 32 arithmetic operations in response to applying predetermined combinations of input signals to its carry-in (CIN), carry-enable (CEN) and mode control (M0-M3) input terminals. The ALU is enabled for receiving A and B operand signals by circuits 316-62 through 316-65 which force enable signal CACEN00 to a binary ZERO. When not performing either logic or arithmetic operations, the ALU 316-2 operates in a subtract mode (i.e. normally used during search and error detection operations). That is, the natural state of the ALU in the absence of applying signals to the mode control circuits is $f = A\text{-}B\text{-}1$ where $f$ = the result. More specifically, the mode signals applied to the ALU are coded "0110" which condition the ALU to produce the desired result (see FIG. 4*f*). The ALU subtracts the A and B operands by performing a ones complement addition and produces a result corresponding to A-B-1 at stages CAF00 through CAF07. The absence of a carry in signal causes a force carry-in to be applied to carry-in input terinal Cin. The result is in turn applied to the 316-10 result bus latches 316-10 and results latches 316-12 when sampled in response to a strobe signal CASTR10 generated by the circuits of a strobe/RST control block 316-20. The $A$=$B$ output terminal of both ALUs are compared by an AND circuit of block 316-8 to verify the comparison.

During a logical operation, the sub op code field of the microinstruction (i.e. CRN0410-CRN0710) is applied to the decoder 316-60 from the ROS local register of section 304. The input signals CRN0410 through CRN0710 together with strobe signals CASTR10 and CASTR00 from control 316-20 condition the decoder 316-60 to generate the appropriate mode control input signals which are in turn applied to inputs M0 through M3. As mentioned above, these signals in turn condition the main ALU to perform the logical operation designated. The A operand (APO) is applied from the general purpose register location or "hot" registeer havingn the address specified in the A op field of the microinstruction word (i.e. bits N23 through N26). The B operand (BOP) is applied from: (1) a general purpose or hot register specified by the B op field of the micronstruction word (i.e. bits N19 through N22) or (2) from an 8 bit constant specified by the miroprogrammer (i.e. bits 15–23 of the microinstruction word stored in the ROS local register) when the microinstruction op code format indicating bit is a binary ONE. As seen from FIG. 3*h*, these signals are applied via the B operand multiplexer selector circuit included within block 314-2. At this time, bits N0 through N2 of the op code field together with bits 19 through 22 condition a decoder within the block 314-2 to apply the appropriate selection signals to the B operand MUX circuit 314-22.

After performing these specified logical operations, the main ALU 316-2 delivers the result to the result bus circuit 316-10 and to the circuits of a result test and storage block 316-30. As seen from FIG. 3i, the circuits 316-30 include a plurality of flip-flops 316-300, 316-310 and 316-330 together with gating circuits 316-301 through 316-304, circuits 316-311 through 316-325 and circuits 316-331 through 316-333 arranged as shown. The equal store flip-flop 316-300 is set to its binary ONE state when the ALU forces equal signal CAEQA10 to a binary ONEn at the same time strobe signal CASTR10 goes to a binary ONE. The flip-flop 316-300 is reset to a binary ZERO when signal CAEQA10 is forced to a binary ZERO during a compare time interval (i.e. when signal CACMT10 is a binary ONE). The A greater than B stored flip-flop 316-310 is switched to its binary ONE state when the signal CAEQA10 is a binary ZERO and a carry-out signal CAAC010 is a binary ONE. The flip-flop 316-310 is reset to a binary ZERO when strobe signal CASTR10 is forced to a binary ONE. It will be noted that the output signals from flip-flops 316-300 and 316-310 are recirculated back to circuits 316-305 and 316-314 respectively. Thus, when either flip-flop is reset to a binary ZERO, it causes the appropriate one of the signals CAAEB10 and CAAGB10 also to be forced to a binary ZERO. As mentioned above, it is the signals CAAEB10 and CAAGB10 which are applied to the branching circuits. These signals indicate whether the comparison was successful during a search operation. The carry out store flip-flop 316-330 is set to its binary ONE state when there is carry out generated by the main ALU 316-2.

The result contained in the result bus circuits 316-10 are transmitted to the read only storage control section 304 and to the general register section 314. As mentioned, the result either remains in the result bus circuits for subsequent branch testing or is delivered to one of the 31 registers specified by bits N10 through N14 of a logic or arithmetic type microinstruction (i.e. the DOR microinstruction field — see FIGS. 4*f* and 4*g*). The strobe allow signals produced by control block 316-20 allow resetting of the result circuits 316-12 and error checking circuits 316-8 via a reset signal CARST00. As seen from FIG. 3*a*, these circuits include a plurality of gating circuits 316-21 through 316-28 arranged as shown. The AND gate and inverter circuit 316-21 is operative to generate strobe allow signal CASTA10 which allows storing of the ALU result for all arithmetic, logic and normal conditional branch type microinstructions with the exception of a logic type microinstruction which has bits 4 through 7 set to all binary ONES. This allows delivering the result of a previous microinstruction without destroying stored information. In the case of a logical operation signal CFLOG10 equals a binary ONE, in the case of an arithmetic operation signal CFAR010 equal to binary ONE and in the case of a normal conditional branch operation, signal CFNCB10 is a bianry ONE. These signals in turn condition amplifier circuit 316-25 and inverter circuit 315-26 to generate the appropriate strobe signals. The AND gate and amplifier circuit 316-28 is operative to force reset signal CARPF00 to the correct state in response to reset signal CARES00 and strobe signal CASTR00 as shown.

Similar to a logical operation, bits CRN04 through CRN07 together with the strobe signals condition the decoder 316-60 to generate the appropriate mode control input signals during an arithmetic operation. Additionally, a carry in signal CACIN00 is generated from the carry in bits CRN08 and CRN09 of the microinstruction word by circuits not shown and the results applied to the carry in (CIN) terminal. Depending upon the coding of the microinstruction word bits mentioned, the signals applied to the CIN and MO through M3 terminals specify the particular arithmetic operation to be performed. The A and B operands are derived from the sources mentioned above in connection with the description of a logical operation. Similarly, the result loaded into the result latch circuits 316-12 and applied to the eresult bus can be delivered or stored for testing as determined by the bits of the DOR field of the microinstruction word.

As mentioned, during a search operation, the ALU performs all arithmetic operations requierd for processing count, key and data field portions of a record during the respective count, key or data field search operations. The ALU is conditioned to perform the desired logical operation (A-B-1) during which the B operand obtained from the B operand multiplexer selector circuit 314-22 from either the C register or the read/write storage section is compared with the A operand obtained from A operand multiplexer circuit 314-22 via the D register. Initially, a logic type microinstruction coded to specify a $f=1$ operation (See FIG. 4*f*) causes the ALU to force equal signal CAEQA10 to a bianry ONE. At the same time the strobe signal CASTR10 is forced to a binary ONE which switches equal compared flip-flop 316-300 to a binary ONE. During the search, no further arithmetic or logic microinstructions are executed and therefore, strobe signal CASTR10 remains a binary ZERO. At the completion of the search operation, a FCB micrionstruction is used to test the state of signals CAAEB10 and CAAGB10 to determine whether there was a successful comparison. The microinstruction also forces the strobe signal CASTR10 to a binary ONE which resets the ALU circuits.

Considering now the general purpose register and multiplexer circuits of block 314, it is seen from FIG. 3i that the general purpose registers are included within two solid state memories 314-3 and 314-4. These memories, conventional in design, are addressable through their respective address registers 314-6 and 314-8. These registers receive signals directly from the read only store local register (i.e. CRN20 through CRN22 and CRN12 through CRN14) which provide the address for the general purpose register. The contents of the address register are then delivered to a selector register whereafter they are applied to the ALU.

The address selection circuits included within block 314-20 decode bits N19 through N22 providing output selection signals BM0 through BM2 as inputs to the B operand multiplexer circuits 314-22. The multiplexer output signals from the selected source register are applied to the selector register 314-28 when the control circuits of block 314-34 force signal CABBA00 to a binary ONE. This is done in response to the specific codings of bits N0 through N3 and N19 which determine whether the information from a general purpose register or one of other registers of the system is to serve as the B operand source. Flip-flops included within a MUX address store block 314-21 retain an indication of bits N20 through N22 for continuous selection of that source during a search operation. In greater detail, it is bit 19 applied to the control circuits 314-34 which determines which one of the allow functions CABBA10 or CABBA00 is to be forced to a binary ONE to select either the addressed general purpose register or register coupled to multiplexer circuits of block 314-22. In a similar fashion, the multiplexer address selection circuits of block 314-26 apply the control signals AMO through AM2 to the A operand multiplexer circuits of block 314-24 so as to select one of the registers as the source of the A operand. Also, flip-flops included within the MUX address store 314-27 retain an indication of bits N24 through N26 for further reference during a search operation. The control circuits included within block 314-32 in response to bits N0 through N2 and N23 are operative to generate allow signals CAABA10 and CAABA00 to select the output of an addressed general purpose register or one of the registers coupled to the multiplexer circuits 314-24. When signal CAABA10 is forced to a binary ONE, the contents of an address general purpose register are applied to selector 314-30. Conversely, when allow signal CAABA00 is forced to a binary ONE, the contents of a designated one of the registers is selected and applied to selector 314-30. As mentioned previously, when writing information into a general purpose register of each of the memories 314-2 and 314-4, the addresses are defined by bits N12 through N14 (i.e. by the DOR field of the logic or arithmetic type microinstruction and writing takes place in response to a pulse signal CLK generated by write generator 308-4.

DATA AND GAP COUNTER SECTION 318

Figure 3J:
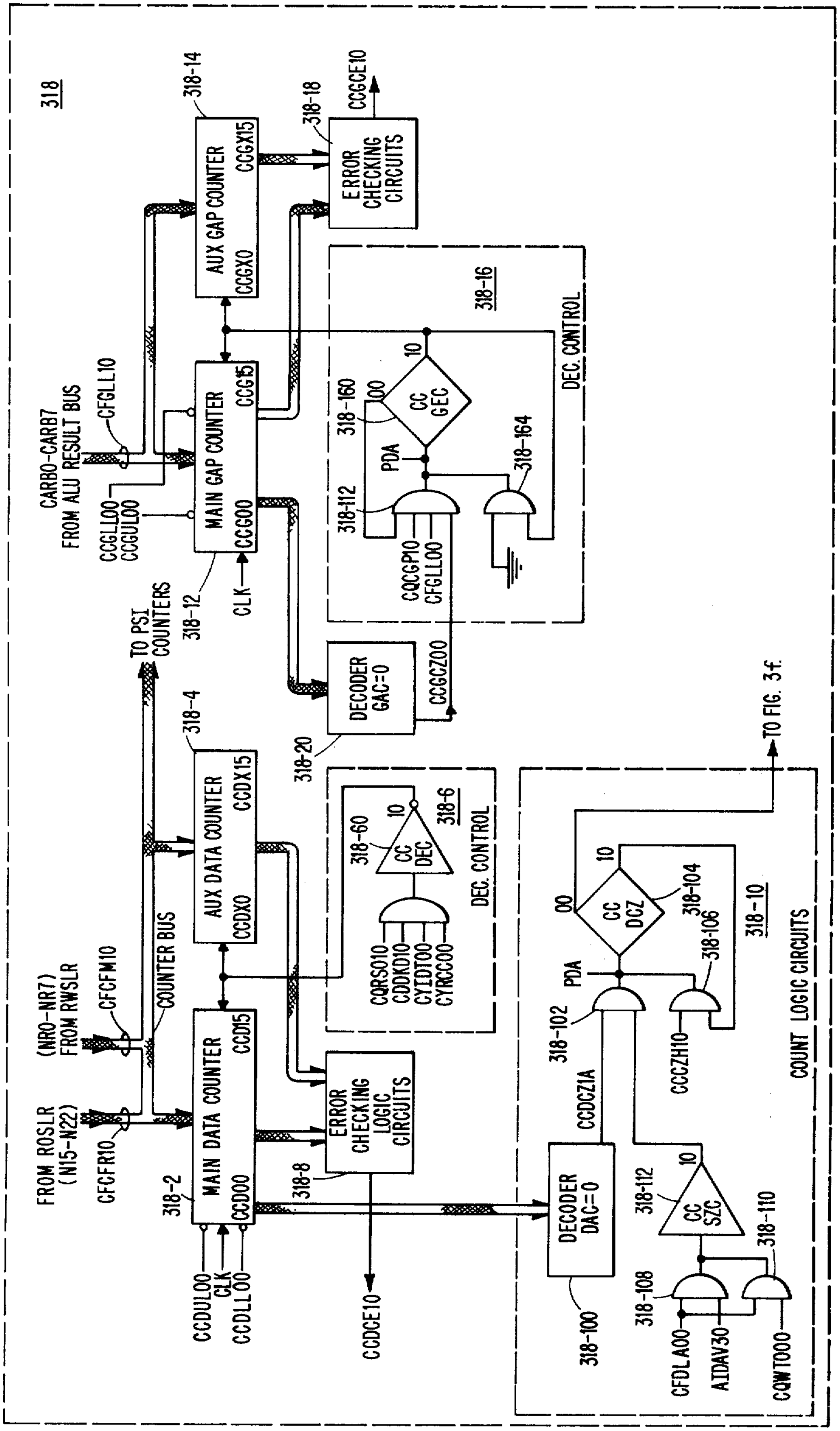
FIG. 3*j* shows in greater detail the data and counter section 318 of FIG. 2.

FIG. 3*j* shows in greater detail the logic circuits which comprise section 318. Referring to that Figure, it is seen that the logic circuits for the data counter (DAC) includes a main counter 318-2 and an auxiliary counter 318-4 together with their decrementing control circuits 318-6 and error checking logic circuits 318-8. Additionally, the section includes count logic circuits arranged to signal when the data counter has been decremented to zero. As shown, these circuits included within block 318-10 include a decoder 318-100, conventional in design, which is operative to force signals CDDCZ1A to a binary ONE when it detects that the data counter has been decremented to zero. This in turn conditions an AND gate 318-102 of fli0-flop 318-104 to be switched to its binary ONE state when either one of the AND gates 318-108 or 318-110 cause an amplifier circuit 318-112 to force signal CCSCZ10 to its binary ONE state. The flip-flop 318-104 is reset to its binary ZERO state via an AND gate 318-106 when a hold signal CCCZH10 is forced to a binary ZERO. As briefly described previously, the counters 318-2 and 318-4 are loaded in response to an I/O microinstruction word. Specifically, an 8 bit count field is loaded these counters from the read only storage local register (i.e. bits CRN15 through CRN22) or from the read/write store local register (i.e. from stages CWNR1 through CWNR7). Either of these sets of signals are applied to a counter bus and then loaded into the counters simultaneously in response to pulse signal CLK and signals CCDUL00 (DAC upper load) and CCDLL00 (DAC lower load) being forced low. The specific count fields selected is established by the set count field of the I/O microinstruction word. It is this count field which is operative to cause the generation of signals CFCR10 and CRCFM10.

During operation, both counters are decremented by a decrement signal CCDEC10 each time a byte is transferred to/from the device adapter. Although decrementing can occur during a write operation, a read/-search operation or load operation, the AND circuit which generates the decrement signal for a read/search operation has only been disclosed (i.e. AND gate and amplifier circuit 318-60). The error checking logic circuits 318-8 include a conventional comparator which compares the contents of both counters and in the event a non comparison is detected, these circuits force an error signal CCDCE10 to a binary ONE.

As seen from FIG. 3*j*, this section also includes a main gap counter 318-12, an auxiliary gap counter 318-14 together with decrementing control circuits 318-16 and error checking circuits 318-18. Also, as shown, section 318 includes gap decoder circuit 318-20 which generates an output signal indicating when the main gap counter has been decremented to zero. Both counters 318-12 and 318-14 are loaded simultaneously with an 8 bit constant from the ALU result bus in response to the CLK pulse signal when signals CCGLL00 (GAC lower load) and CCGUL00 (GAC upper load) are forced to binary ZEROS. The loading takes place upon the decoding of an arithmetic type microinstruction which causes the generation of signal CFGLL10. This occurs in response to an arithmetic type microinstruction. During operation, both counters are decremented by signal CCGEC10 which is generated by a flip-flop 318-160 which is set via an AND gate 318-162 in response to signal CQCGP10 being forced to a binary ONE. The flip-flop 318-60 resets via an AND gate 318-164 at the end of a clock (PDA) pulse time. The contents of both counters are compared by a conventional comparator circuit included within block 318-18 and when a non comparison is detected, the comparator circuit forces an error signal CCGCE10 to a binary ONE.

DEVICE LEVEL INTERFACE CONTROL SECTION 310

Figure 3K:
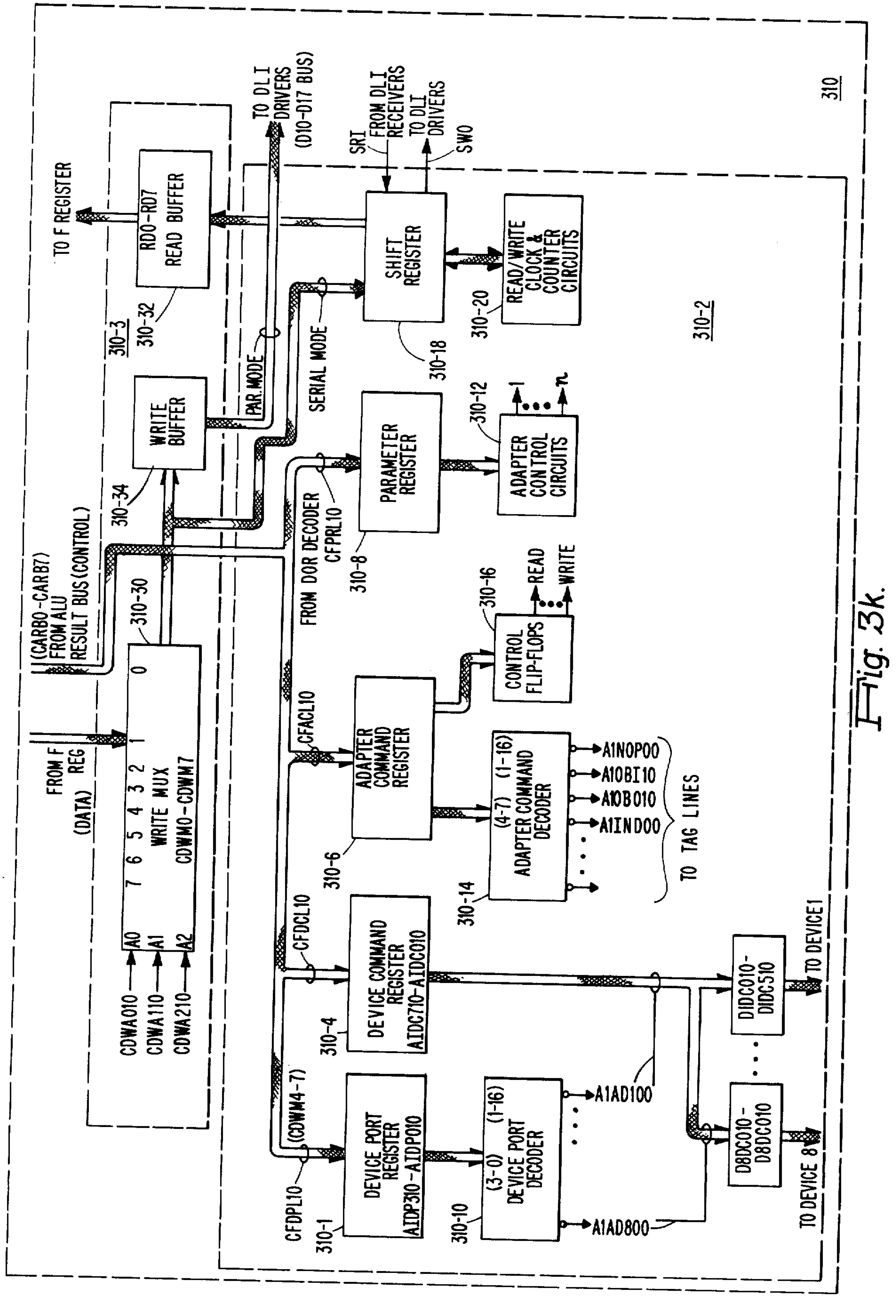
FIG. 3*k* shows in greater detail the adapter and device line controls section 310 of FIG. 2.

With reference to FIG. 3*k*, the section 310 will be described in greater detail. As discussed previously, this section comprises an integrated control adapter 310-2 and read/write multiplexer and buffer circuits included within block 310-3. As seen from FIG. 3*k*, the adaper 310-2 includes a plurality of registers which enable conditioning of the adapter and a selected device. These registers include a device port register 310-1, a device command register 310-4, and an adapter command register 310-6 and a parameter register 310-8. Each register is enabled in a specific sequence to store information. Specifically, the various registers are enabled for storing signals by control signals CFDPL10, CFDCL10, CFACL10 and CFPRL10. These signals are derived from the decoding of a specific field of a logic type microinstruction by the DOR decoder circuits of section 304. As shown, in response to the control signals, the registers are loaded from the ALU result bus of block 310-3. The write multiplexer circuit serves as gating device for all write operations and receives input signals from the various sections of the processor (e.g. from the F register of buffer section 302-50.

The device port register 310-1 is normally the first register loaded in a given sequence and is used to associate a logical channel number with a specific device. That is, the low order four bits applied by the ALU result bus are loaded into the device port register and a device port decoder 310-10 decodes these bits into a number of select signals, only some of which are shown, used to select any one of 12 mass storage devices. The parameter register 310-8 is usually the second register loaded and it is loaded from the read/write storage section with previously stored device parameter byte information required for a particular operation via the ALU. This information byte is decoded by adapter control circuits 310-12 and generate control signals for conditioning the adapter to operate in a given mode. Since details are not relevant to the present invention, they are not given herein.

The device command register 310-4 receives information from the ALU and forwards the information directly to one of the devices specified to execute the command (i.e. selected by device port decoder 310-10. The adapter command register 310-6 is normally the last register loaded in sequence and conditions the circuits within the adapter 310-2 to execute the device command specified. The lower order four bits A1AC4 through A1AC7 are decoded by an adapter command decoder 310-14 which generate signals used to set various tag lines of the interface or specify certain types of operations within the adapter. Bits 0 through 3 are applied to control gating circuits and used to set various control flip-flops included within a block 310-16. These flip-flops establish whether the adapter is to perform a read or write operation in addition to defining other information relative to that type of operation. Since a discussion of such circuits is not relevant to the present invention, it is not included herein.

As also seen from FIG. 3*k*, the adapter includes a shift register 310-18 and associated read/write clock and counter circuits 310-20. When operated in a serial mode, information applied by an interface line SRI from the device is shifted into the shift register 310-18 under the control of a read clock, conventional in design. As shifting occurs, a bit counter included within block 310-20 is incremented by one every other bit interval since normally a synchronization bit brackets each data bit. When the counter has been incremented to a predetermined count, such as a count of six for six bit mode or a count of eight for eight bit mode, it causes the assembled character to be transferred in parallel to a read buffer 310-32. Additionally, this transfer causes the adapter 310-2 to generate a data available signal (A1DAV10 is forced to a binary ONE) which indicates to the processor sequence logic circuits of section 304 that a data byte has been stored in read buffer 310-32 and is ready for transfer into the F register of section 302. Upon sensing the data available signal, the sequence control circuits of section 304 are operative to acknowledge the signal by forcing a data acknowledge signal A1DAK10 to a binary ONE. Thus, it is seen that the generation of signals A1DAV10 and A1DAK10 enable the adapter and processor operations to be synchronized with one another.

In the case of a write operation, the adapter 310-2 upon detecting that data has been stored in the F register is operative to force device strobe signal DXDCS10 to a binary ONE. The command loaded into the device command register 310-4 is decoded and executed. In a similar fashion, the adapter utilizes the signals A1-DAK10 and A1DAV10 for sampling when a byte has been stored in the F register and ready for transfer into a write buffer 310-34 and then into the shift register 310-18 for shifting out a bit at a time onto interface line SWO. Although not shown, the shift register 310-18 includes gating circuits which are arranged to be conditioned by the clock 310-20 to alternate the bit transfers with sync bits. By contrast when the adapter operates in a parallel mode, it transmits and receives information bytes from the write buffer 310-34 and read buffer 310-32 respectively via bus lines D10-D17. In this mode, lines SW0 and SRI transmit strobe signals.

DESCRIPTION OF OPERATION

With reference to the flow charts of FIGS. 6a through 6c, the operation of the apparatus of the present invention disclosed in FIGS. 1, 2 and 3a through 3k will now be described. Initially, the IOC 106-6 receives an I/O instruction specifying a search key operation. The IOC 106-6 decodes the instruction and then initiates a transfer of I/O command bytes to the mass storage processor 300. The bytes include a logical channel number (LCN) byte and bytes of one or more channel command words. The LCN byte indicates which channel is to be involved in the execution of the instruction. The command words include a command code byte specifying the type of operation, count bytes specifying the number of bytes to be transferred between main storage and the processor and address bytes specifying a main storage starting address for the transfer.

After the IOC receives signals indicating that the mass storage processor 300 is ready to receive command bytes to execute the operation, it starts transferring the bytes starting with the LCN byte. FIG. 6a illustrates in simplified form a portion of a channel program initiation routine used in processing a next command. In FIG. 6a as well as the other flow charts, the different microinstructions are designated by "relative" or logical addresses which include the name of the routine and a letter-number (e.g. A0700). The microinstructions of each routine are assigned sequential physical addresses in the ready only store according to the alpha numerical ordering of their relative addresses. The mass storage processor 300 prepares for receipt of the command by executing an I/O type microinstruction which generates subcommand signals which cause the setting of the TRM and RQD flip-flops and the loading of the PSI counter with a predetermined count (i.e. count of 3). The LCN byte is loaded into the PSI write buffer 302-12 in response to signal PAODV10 being forced to a binary ONE by the processor PSI circuits. The write buffer contents are loaded into the A register when signal CDPTA10 is forced high by the control circuits 302-70. Thereafter, the control circuits 302-70 force in succession signals CDATB10, CDBTC10 and CDCTD10 to binary ONES.

Figure 6A:
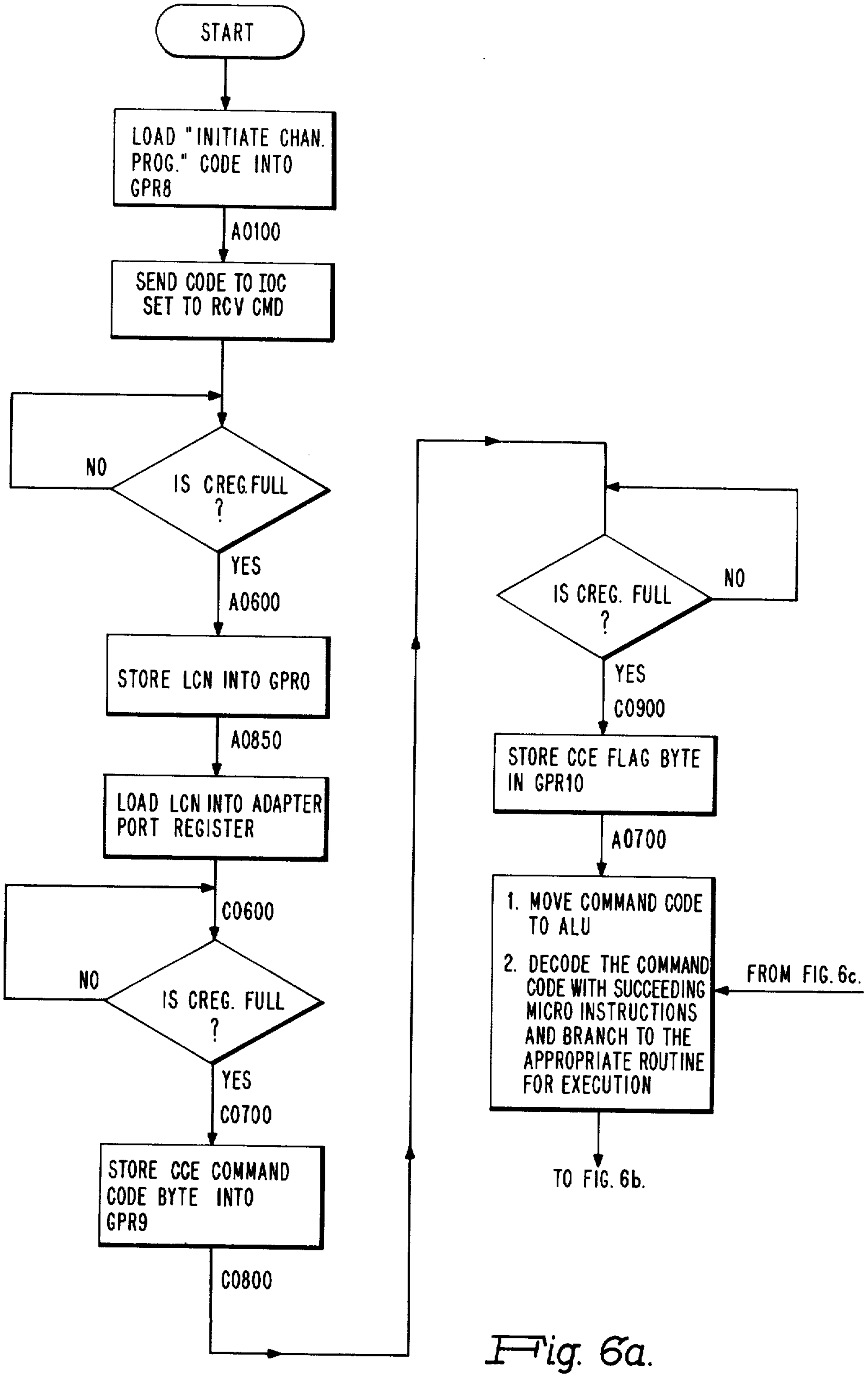
FIGS. 6*a* through 6*c* are flow diagrams used in describing the operation of the processor of the present invention.
Figure 6B:
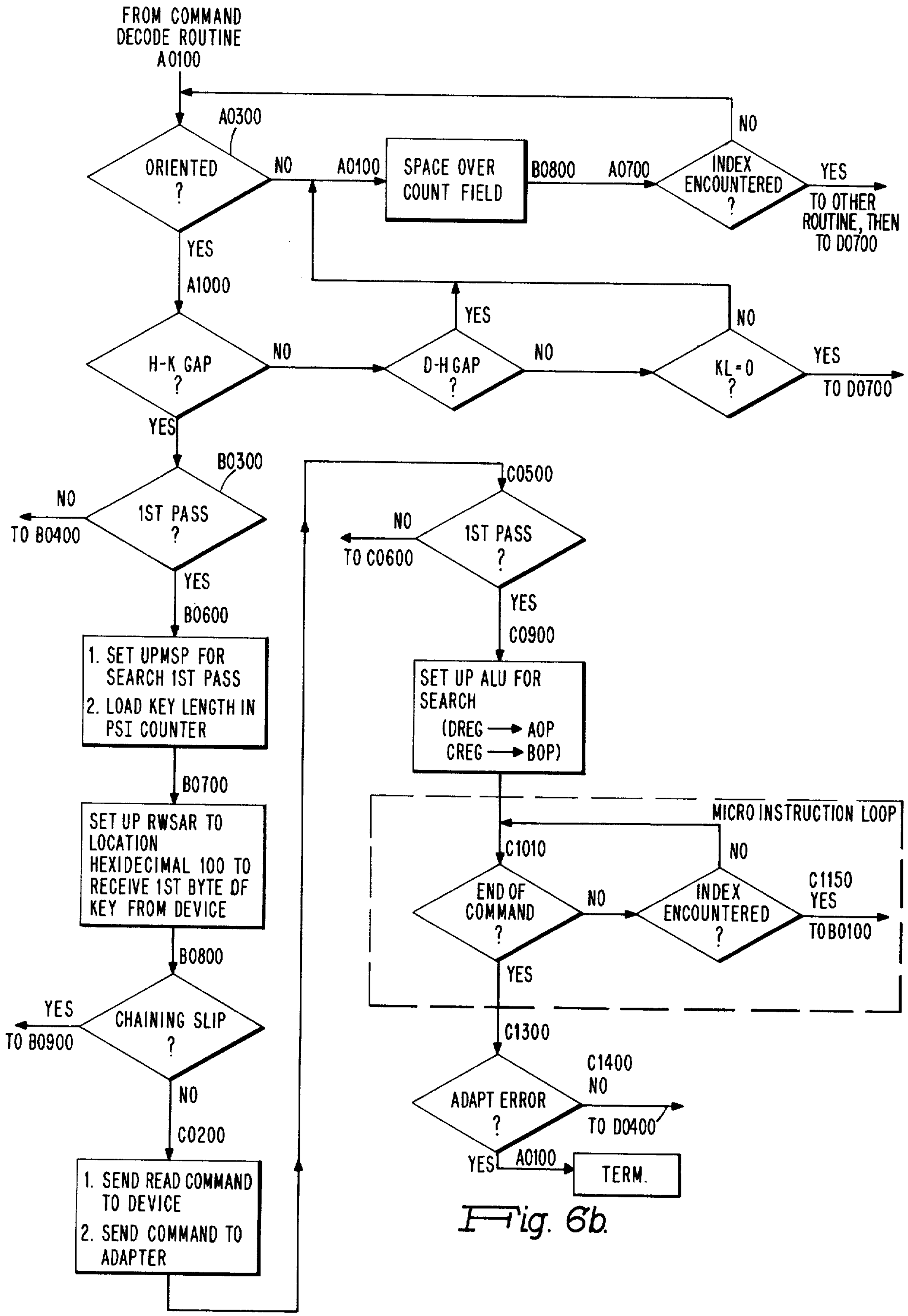

As seen from FIG. 6a, during the transfer interval, the read only store tests the contents of the C register for arrival of the LCN byte by executing a fast branch type microinstruction AO700. When the C register is loaded, the store stops testing and then advances the next microinstruction AO600 for storing the LCN byte in one of the general registers (i.e. GPR No. 0). Thereafter, the processor 300 executes another microinstruction AO850 which transfers a bit representation of the LCN byte stored in the general purpose register No. 0 to the device adapter port register via the ALU. At the same time, the LCN byte is transferred via the ALU and stored in the RWS device port register.

It is assumed that the LCN byte relates to a command of a channel program previously activated. Therefore, the device is assumed to have been "seized" and bit status obtained therefrom. Accordingly, the flow chart of FIG. 6a omits such details.

The processor hardware decrements the PSI counter by 1 via signal STI each time it receives a byte; the microprogram control store waits until the next byte is loaded into the C register. By executing a similar sequence of operations, the processor 300 stores the command code byte in another one of the general purpose registers (i.e. GPR No. 9). The processor hardware terminates the routine sequence upon receipt of the third byte which is a flag byte. This byte is loaded into another general purpose register. At that time, the processor hardware will have decremented the PSI counter to ZERO which signals the end of the transfer.

The processor 300 enters a command decode sequence wherein it examines the bits of the command code. That is, it executes a microinstruction, designated CMDEC AO700, in which it fetches the command code from general purpose register No. 9 and loads it into the ALU latches. Then during a succession of branch microinstructions, the processor tests the command code a bit or a number of bits at a time and branches on the results of the test to the start of an appropriate microprogram routine for executing the command. The bits are tested sequentially so as to more easily detect the encountering of so-called "don't care" bits (i.e. those not required selecting a routine).

It is assumed that the I/O operation specified by the channel program is a search operation in which the bytes of the key field portion of the record of FIG. 5 are going to be read from the mass storage device and compared with the search argument bytes the processor receives from the IOC. Referring to FIG. 6b, it is seen that the read only store causes the processor to perform a test to determine whether its "oriented" with respect to the record being read. In greater detail, the processor had previously stored orientation information in a general purpose register indicating the relative position of the mass storage media and the format of the record being read from a track. It tests this information (i.e. a particular bit) to determine when an operation specified by the command is to be executed. As the different fields within a record are being read, the bits of the orientation information of a control "work byte" stored in the general register are updated.

Figure 5B:
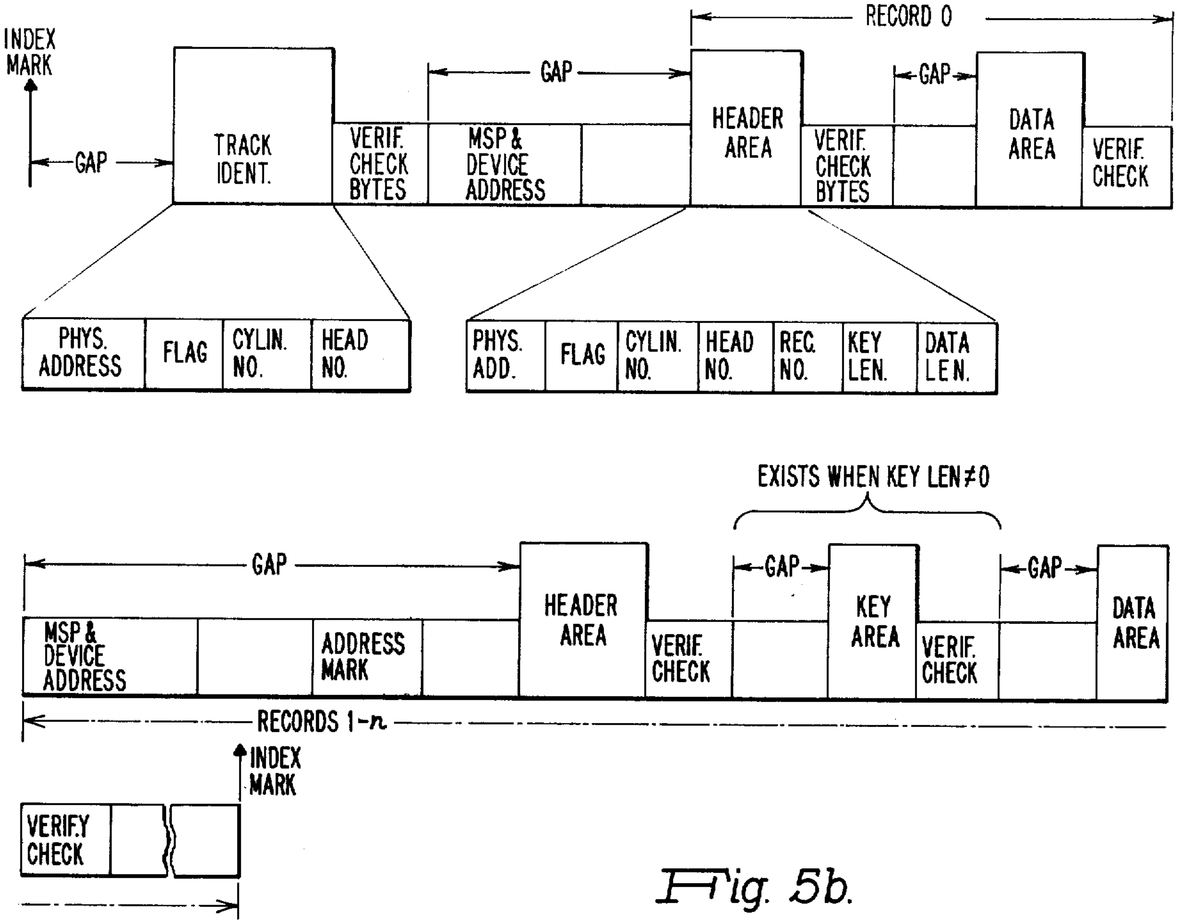
FIGS. 5*a* and 5*b* show the format of the records stored on the mass storage devices.
Figure 5A:
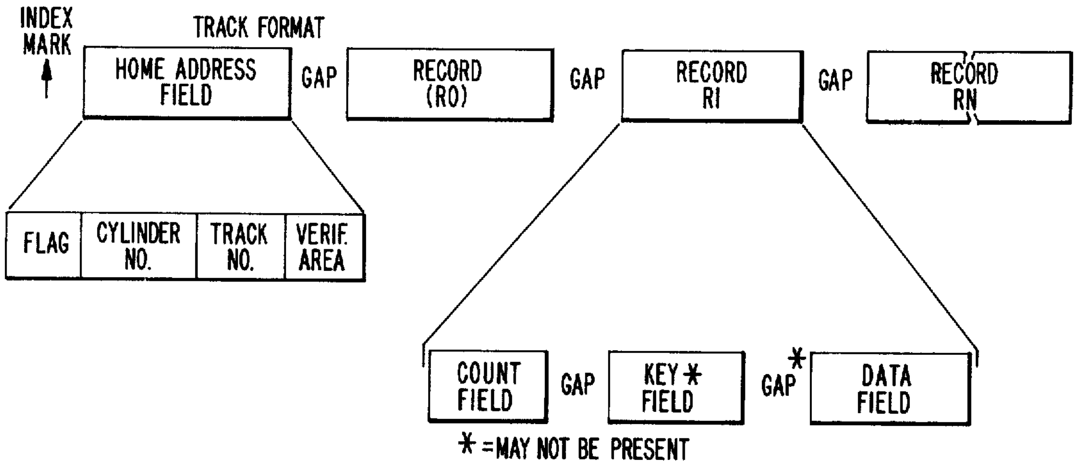

From FIGS. 5a and 5b, it is seen that the start of a track is indicated by an index mark. When the selected mass storage device signals the adapter that it has sensed the start of the track by forcing line IDX to a binary ONE. The adapter in turn signals the processor which sets a first bit in the control work byte to a binary ONE indicating the receipt of an index mark signal. It is the state of this bit which is tested by having the read only store read out a branch type microinstruction AO300. In the event that this bit is not set to a binary ONE, the processor branches to another microprogram routine beginning with microinstruction AO100 to fetch a count field which indicates the position of the media relative to the record being written.

The next test the processor makes is to determine whether the head is in the header to key gap which means that the next field is a key field. It does this by executing another branch type microinstruction A1000. Assuming that the control work byte contained in the same general register indicates that the read/-write head is in the header-key gap, the results of the tests made on the state of another bit within the control byte stored in the general register will be positive. The read only store sequences to the next location where it reads out another microinstruction BO300 fetches the contents of GPR No. 10 and tests the state of a bit 6 to determine whether this is a first pass indicating that the processor has not searched for a key of a record previously in response to this channel command. Since in this example, this is the first pass (i.e. bit 6 is normally a binary ZERO) the read only store then sequences to microinstruction BO600 as indicated in FIG. **6*b*.**

The processor reads out an I/O type microinstruction BO600 having the format of the top instruction of FIG. **4*e*.** It is this microinstruction which the processor uses to set up the hardware paths for the first pass of a search key operation. The I/O microinstruction sub op code field is coded "00" to specify the loading of the PSI counter from the read write store local register which normally contains the key length information obtained from the header portion of the record being read. The data counter will have been loaded from a previous command because it was previously assumed that the test of being oriented was positive.

The PSI sequence flops field of the I/O microinstruction BO600 is set to the code "1001" so to request data from the IOC and signal the IOC to terminate transfer with the last byte. The count field is all zeros and the trap count field is set to "01" indicating that the processor is to disregard the first byte of the key field of the record since it is a sync byte signalling the start of a field. The next field, MSCSEQ flops, of microinstruction BO600 is coded as "0101" which designates a search first pass function.

When the microinstruction BO600 is read out into the read only memory local register, it is decoded by the sequence decoder and sets the appropriate control and sequence flip-flops to binary ONES. That is, the first pass (CQFPF) flip-flop 308-1, the read/write active (CQRWA), flip-flop 308-2 and search CQSHO flip-flop 308-3 are all switched to binary ONES. The transfer out (CQTXO) flip-flop 308-5 remains a binary ZERO. Also, transfer in signal CQTXI10 is a binary ZERO which places the buffer registers in their static states. The other flip-flops of FIG. **3*c* remain in their binary ZERO states. The trap flip-flops 308-101 and 308-102 of FIG. 3*d* are set to a count of "01". The compare cycle CQCMP flip-flop 308-100 is switched to a binary ONE when the search flip-flop switches to a binary ONE. This flip-flop enables the ALU Result test and Storage Circuits 316-30 (see FIG. 3i) for storage of the search results during each byte comparison (i.e. enables signal CACMT10** to be forced to a binary ONE when both the C and D registers store bytes — signal CACMT1B = 1).

The search CQSHO flip-flop when in a binary ONE state conditions the logic circuits of FIG. **3*h* to enable the RWS memory to store the bytes in the appropriate locations as they are being transferred from the IOC and the device. The first pass/format CQFPF flip-flop when a binary ONE conditions the buffer control circuits to have registers A, B and C transfer in bytes from the PSI control rather than from the RWS memory. The flip-flops CQFPF and CQORWA, both binary ONES, are going to couple the RWS memory 306-2 to the C register thereby allowing the bytes received from the IOC to be written into the RWS memory. Also, the CQFPF flip-flop establishes a path between the D register and RWS memory 306-2. These paths enable the writing of the search argument bytes from the IOC and the key field bytes read from the mass storage device into the RWS memory 306-2** to take place concurrently.

As seen from FIG. **6*b*, the processor 300 loads the appropriate starting address into the RWS address register from the read only store by executing a RWS microinstruction designated as BO700. Next, the processor reads out a branch type microinstruction which when decoded tests whether the command has arrived on time from the IOC (i.e. whether the read/write head is still in the header-key gap indicating that the command is not too late to operate on the field indicated). Assuming that is the case, the test "chaining slip" will be in the negative (i.e. gap counter zero signal CCGCZ10) and the processor 300 now begins to set up the device (see FIG. 3*k*). As seen from FIG. 6*b*, the processor reads out microinstructions starting with a microinstruction CO200. Although not shown, this is done when the gap counter has been decremented to ZERO. The first logic type microinstruction (i.e. see FIG. 4*g*), when read out and decoded, causes a read command specified by the constant field to be loaded into the device command register 310-4. Another logic type microinstruction of the same type, causes a command to be loaded into the adapter command register 310-6 which causes the adapter 310 to force the DCS line to a binary ONE signalling the device of the command. Additionally, the adapter 310 in response to the command is operative to send bytes via the read buffer 310-32** after it has sensed having read the required preliminary control information, as for example, a particular start pattern.

Next, the processor 300 reads out a branch type microinstruction CO500 which when decoded again tests the state of bit 6 of the flag byte contents of GPR No. 10. Since this bit is set to a binary ZERO, the read only store sequences the microinstruction CO800 wherein it sets bit 6 of the flag byte in GPR No. 10 to a binary ONE as shown in FIG. **6*b*. Next, it reads out a logic type microinstruction ($F$=1) CO900 which when decoded by the sequence decoder sets up the final paths to enable the ALU section to compare the byte contents of the C and D registers. That is, the B operand and A operand fields of the logic microinstruction are coded to have stored in the MUX address stores 314-21 and 314-22 coded signals which condition the B op MUX 314-22 and A op MUX 314-24 respectively to apply to the main and auxiliary ALU's C register and D register contents as operands. This completes the connection of the comparison path. Also, the signals condition the ALU to force the equal signal CAEQA10 to a binary ONE by setting the mode signals M0-M3 to specify a result $f$=1. This in turn switches the equal store flip-flop 316-300** to a binary ONE in readiness for the search.

At this time, the different groups of buffer registers are connected to shift bytes in the proper direction, the PSI interface is conditioned to accept bytes from the IOC, the device has been given a command, the adapter is conditioned to receives bytes from the device and the ALU section is conditioned to compare the bytes from the designated sources. Also, the counters have been set to the appropriate counts. The PSI counter has been set to a count corresponding to key length and thereafter is decremented automatically upon receipt of each byte from the IOC. The data counter has been set to an appropriate count (i.e. key length included in count field) and is also decremented automatically as each byte is received from the device.

At this time, the firmware setup of hardware is complete and the processor 300 is placed under the control of the hardware. That is, all transfers of bytes take place independently of the read only storage and thus are free of any processing delays. This can be seen from an examination of the flow chart of FIG. 6*b*. The read only store enters an idle loop which includes the two branch type microinstructions designated as C1000 and C1100. During the transfer operation, the read only store reads out a FCB microinstruction which when decoded tests the state of the end of command CBEOC flip-flop 304-300 of FIG. 3*f* (i.e. test input No. 1 of circuit 304-284 of FIG. 3*f*). When the CBEOC flip-flop is set to a binary ONE that signals the firmware that the transfer operation is complete. When the test is positive (CBEOC10 = 1), the read only store breaks its idling and again assumes control by sequencing to microinstruction C1300 whereafter it stores the results of the search key operation as described herein. Also, by another FCB microinstruction C1100, the processor 300 tests for the end of track signaled by the device sensing of an index mark which in turn forces signal AIIDT00 to a binary ZERO. Until one of these signals is forced to the binary ONE state, the processor 300 continues idling through the two microinstruction loop. During the idling, each time a byte is stored in the C and D registers, the circuits of block 316-30 force compare time signal CACMT10 to a binary ONE. If both bytes compare the ALU 316-2 forces signal CAEQA10 to a binary ONE which in turn holds flip-flops 316-300 in its binary ONE state. If at any compare interval, the bytes do not compare the ALU forces signal CAEQA10 to a binary ZERO. This forces the hold signal CAEQS1H to a binary ZERO which resets the flip-flop 310-300 to a binary ZERO. At that time, signal CAAEB10 is also forced to a binary ZERO. Thus a first non comparison will reset the equal compare flip-flop 310-300 and this flip-flop remains in that state until another microinstruction is executed. This occurs only after the completion of the operation.

From FIG. 3*f*, it is seen that the end of command flip-flop 304-300 is set to a binary ONE when the data counter has been decremented to a count of ZERO (i.e. signal CCDZ1A=1) and all of the registers (i.e. A, B, C, D, E and F registers) are empty (i.e. signal CDDBE10=1). Assuming that the last byte has been transferred and data counter has been decremented to ZERO, the read only store upon read out and decoding of the FCB microinstruction C1010 sequences to the branch type microinstruction 1300 which tests to determine whether the EOC flip-flop 304-300 was set to a binary ONE because it was the end of the transfer operation (i.e. data counter was decremented to ZERO) or because an error was detected by the adapter 310 (i.e. signal AEERR10=1). Assuming no error, the read only store sequences to microinstruction DO400 which is a first microinstruction of a routine for evaluating the comparison results. Either one or none of the flip-flops 316-300 and 316-310 of result test and storage 316-30 of FIG. 3*h* will be set to a binary ONE. Assuming that there was a comparison, then the equal CAEQS flip-flop 316-300 is a binary ONE. After the setting of the status bits, reflecting the results of the key search, the processor executes a branch type microinstruction which returns the processor to microinstruction DO100. This microinstruction tests the results and sets an indicator. The processor 300 sequences to microinstruction D400 to test for whether there was a read error. Assuming there is no read error, this means there was a true comparison and the read only store now sequences to a microinstruction routine beginning with microinstruction H100 which loads an appropriate code into a general purpose register (GPR No. 8) used in signalling the IOC. After appropriate signal exchanges over the PSI, the IOC is caused to send the next command to be executed which could for example be a command to perform an operation on the data field of the record whose key compare with that supplied by the IOC.

Figure 6C:
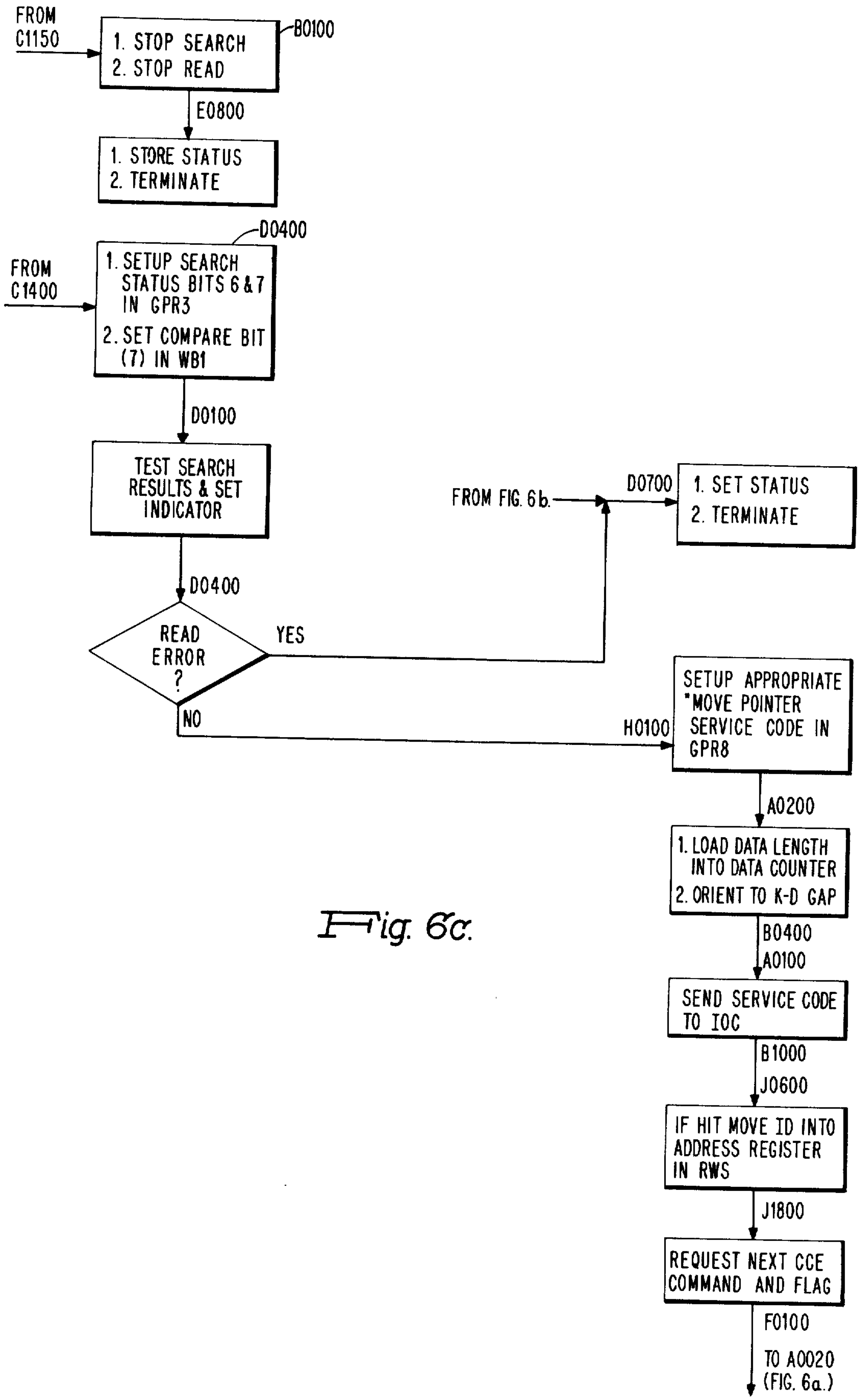

FIG. 6*c* shows the operations performed by the processor while it awaits the next command from the IOC. It is during this time that the read/write head of the mass storage device is passing through the key/data gap of the record (see FIG. 5*b*). For example, the processor fetches and decodes microinstruction which loads the data counter with a count corresponding to the data length field included in the amount field associated with the key field of the record just searched. This is done in anticipation that the next command will specify an operation upon that data field. The routine in the Figure is called "process end of file" (PREOF). When it loads the data counter it also checks for a data length of ZERO. If it is ZERO, this indicates that this is an end of file record. Assuming no end of file, the read only store sequences to microinstruction AO100 which sends the code stored in the general purpose register to the IOC, also a part of the request for the next command. The read only store then returns to a previous routine in which it updates the contents of an address register location in the RWS memory to correspond to the identifier of the last record searched successfully. Then the read only store references the search routine for at last time to set up the PSI controls section to accept the next command following which it finally branches to the command code routine CMDEC to decode the next command code.

It is seen that the present invention provides a microprogrammable processor which includes hardware control sequencing apparatus in addition to microprogram control store. The control store generates signals which condition the hardware sequencing apparatus to set up appropriate hardware paths for executing a particular command. Following the set up, the microprogram control store transfers control to the hardware sequencing apparatus which enables the data transfer to proceed at maximum independent of the operating or cycling speed of the control store.

In the particular operation described above, the control store idled until the hardware sequencing apparatus signaled the completion of the transfer. Of course, the ALU was involved in comparing bytes from two sources as required by the search operation. It will be appreciated that in the case of other types of operations, the control store instead of idling could perform certain operations unrelated to the transfer of bytes. For example, in response to arithmetic microinstructions read out of the control store, the ALU can compute a variable length gap as part of a write command. That is, in some cases a disk is formatted to have a variable length gap based on the length of the data field being written. Thus, while the data transfer takes place, the ALU in the processor of the present invention computes the gap by adding the data length and key length and take a percentage of the sum. Similar calculations can be performed as part of a read command where a variable length gap is calculated in anticipation of another format specified by a write command chained to the read command being executed.

Additionally, the control store can perform operations which modify the contents of different address registers within the processor such as updating certain registers to indicate the address of a "last data field processed". These operations would take place either before the control store enters an idle loop condition or during the data transfer as required for the particular command being executed.

The above examples here are given for the purpose of illustration only. For further details into the manner in which some of the operations described herein may be carried out, reference may be made to the related applications referenced herein. Many changes to the processor of the present invention can be made without departing from the spirit and scope of the present invention. To prevent undue burdening the description with matter within the ken of those skilled in the art, a block diagram approach has been followed, with a detailed functional description of each block and specific identification of the circuits it represents. The individual engineer is free to select elements and components such as flip-flop circuits, shift registers, etc. from the individual's own background or from standard references such as those mentioned herein.

It will also be noted that the exact coding patterns for all microinstructions were not disclosed herein since the engineer is free to select alternate forms of coding. For further details and insight into techniques for deriving such coding and for additional background information concerning the system, reference may be made to the text titled "Computer Design Fundamentals" by Chu, McGraw-Hill Book Company, Inc., Copyright 1962 and the text titled "Microprogramming Principles and Practice" by S. S. Husson, Prentice-Hall, Inc., Copyright 1970. For convenient reference, the following appendix is included which defines certain terms which have been used in describing a preferred embodiment of the present invention.

APPENDIX

Glossary of Terms

| TERM | DEFINITION |
|---|---|
| Alternate Track | An alternate track is one which contains data that has been repositioned from a defective primary track. |
| Byte | The basic unit of information handled by the Mass Storage Subsystem (MSS). A byte is made up of 8 information bits each of which can be set to logical ONE (ON) or to logical ZERO (OFF), to represent any one of 256 combinations. Bit 0 is defined as the leftmost or most significant bit and bit 7 as the rightmost or least significant bit. |
| Byte Wide Path | Bytes of information transferred across the interface consist of eight information bits plus one odd parity bit. The information is arranged so that bit 0 is always the most significant bit. The parity bit is ONE if the number of ONE bits in the corresponding eight information bits is even, ZERO if the number of ONE bits is odd, i.e. odd parity is generated on the eight information bits. |
| Central Processor Complex (CPC) | The Central Processor Complex consists of those units used for addressing main storage, for retrieving or storing information, for arithmetic and logic processing of data, for sequencing instructions in the desired order, and for initiating the communication between storage and external devices. The main units of the CPC are the Central processor unit (CPU), the main store and the Input/Output controller (IOC). |

-Continued

APPENDIX

Glossary of Terms

| TERM | DEFINITION |
|---|---|
| Channel Command Entry (CCE) | The Channel Command Entry is the elementary building block of channel programs. It consists of two CCWs and may contain a command, flag, count information, branching information, key or buffer addresses and a command extension field. The address of a CCE is the address of its first CCW. |
| Channel Control Word (CCW) | A CCW is a 32-bit (4 byte) word that is a subdivision of a CCE. |
| Channel Program (CP) | A CP is a complete set of instructions and addressing information to carry out an I/O operation. It is composed of CCEs which are made up of CCWs. |
| Count Field | The first field of each record. The Count field describes the Key and Data fields of the same record. |
| Cyclic Check Code | A Cyclic check code is used for error detection when information is stored into and retrieved from a field. When data is recorded, a cyclic check code is arithmetically coded from the information to be placed in the field and is recorded as part of the field. When a field is read from the storage medium, the cyclic check code is recomputed and compared to the cyclic check code recorded as part of the field. If the comparison is unsuccessful an error condition is indicated. On certain devices, the cyclic check code is replaced by an error detection and correction code. |
| Cylinder | All tracks which are available for data transfer without additional movement of the access mechanism. Each cylinder in a storage device is identified by a unique cylinder address and designates a specific position of the set of Read/Write heads on each surface of the device. |
| Data Field | The field which contains the information identified by the Count and Key fields of the record. The Data field is recorded on the storage media immediately following the Key field; if a Key field does not exist, the Data field follows the Count field. |
| Defective Track | A defective track is a track from which recorded information cannot be reliably recovered. This condition is normally a result of a surface imperfection and localized to a small portion of the track surface. |
| Field | A group of related contiguous bytes. Four types of fields are defined within the MSP: a Home Address field, a Count field, a Key field and a Data field (definitions follow). |
| Home Address Field | One Home Address field on each track follows the Index Mark, identifies the physical location of the track within the storage device, and contains information describing the condition of the track. The first record recorded on the track starts at Index Mark when a Home Address field does not exist. |
| Index Mark | A mark which signals the beginning of a track. All tracks in a cylinder are synchronized by the same Index Mark. |
| Input/Output Controller (IOC) | An IOC is the mainframe hardware/firmware involved during the execution of a channel program. It may control several physical channels. In this document the unit which connects to the mainframe side of the PSI is referred to as the IOC. Other terms that have been used with the same meaning are Central Processor Unit, Channel Control Unit, Channel, I/O Processor, etc. |
| IOC Instruction | An IOC instruction is an instruction sent from the IOC to the PCU. This instruction is not part of the channel program, but may be related to channel |

-Continued

APPENDIX

Glossary of Terms

| ERM | DEFINITION |
|---|---|
| | program activity (e.g., disconnect). |
| .ey ield | The Key field allows searching of identifying information about a record. The identifying information is stored within the Key field. If present, the Key field immediately follows the record Count field. |
| .ine tates | An interface signal line in the ONE state, or high, is understood to be in the logical TRUE state; a line in the ZERO state, or low, is understood to be in the logical FALSE state. The rise of a line will imply a transition from the FALSE to the TRUE state while the fall of a line will imply the transition from the TRUE to the FALSE state. |
| .ogical :hannel LC) | The input/output system is based on the concept of logical channels. The access path from the CPU to the device for the purpose of executing an I/O operation is termed a channel. The channel consists of IOC facilities, a hardware link between the IOC and PCU identified as the physical channel, and a logical channel. The logical channel in its most elementary form is the collection of facilities in a peripheral control unit subsystem required to execute an I/O operation such as a read, write, etc. An I/O operation is defined by a channel program. A logical channel can only have one channel program active on it at one time. Logical channel numbers are used by the channel for ordering the storage of parameters required to maintain a number of channel programs operating simultaneously. As such, software visibility of an I/O operation is through a logical channel. (From a software point-of-view, devices are allocated an IOC number, a physical channel number and a logical channel number for selection purposes). A logical channel number explicitly identifies a device. A channel program is restricted to one device. Devices are assigned logical channel numbers at system configuration time or when the device is added to the system. There may be more than one logical channel per device. A logical channel is considered active from the time an Initiate New Channel Program service code is received by the IOC until it is terminated by an event notification to software. |
| Magazine | A group of tracks and/or cylinders which may be individually removable. If several magazines exist in a device, only one magazine at a time may be positioned with the read/ write erase mechanism. |
| Multiple Track Operation | The ability of the MSS, when provided with certain I/O commands in certain modes, to automatically switch to successive tracks in the same cylinder and to continue the operation on the new track. |
| Peripheral Device | A peripheral device is a single addressable data source or sink. The peripheral device may be a unit controlling a physical medium (e.g. disk drive, tape drive) or an electronic medium (e.g., communications channel). |
| Peripheral | A PP (e.g. mass storage processor (MSP)) is the unit connected on the peripheral side of the PSI which controls and operates the peripheral device. Other names with similar meanings are Peripheral Control Unit, Peripheral Controller, Microprogrammed Peripheral Controller (MPC), Multi-Line Controller (MLC), etc. |
| Peripheral Subsystem | A Peripheral subsystem (e.g. mass storage subsystem MSS) is comprised of those functional units existing outside of the central processing and main store facilities which are required to operate and control the peripheral devices in a system. A |

-Continued

APPENDIX

Glossary of Terms

| TERM | DEFINITION |
|---|---|
| | peripheral subsystem may include one or more PSIs, one or more peripheral control units, and one or more peripheral devices. |
| Physical Channel | A physical channel is the hardware link between the IOC and the peripheral control unit. This hardware link consists of one PSI and the facilities at each end of the PSI dedicated to the PSI. |
| Primary Track | A primary track is the original track on which data was stored. |
| Read | Read indicates the direction of dialog flow (from the PCU to the IOC), i.e. an input operation. |
| Record | A group of related fields. A record consists of a Count field, a Key field which immediately follows its related Count field on the storage media, and a Data field which immediately follows its related Count and Key field. The length of the Key field may be specified as zero, in which case a record consists of only a Count and Data field. |
| Record Overflow | Record overflow is a capability which allows a logical record to be recorded on more than one track. Such a record is known as an overflow record. A portion of an overflow record that is written on one track is called a record segment. Most functions defined in the MSS treat the entire logical record as if it was a single physical record. |
| Record Segment | A segment of an overflow record - see Record Overflow. |
| Service Code | A service code is an eight-bit instruction (plus parity) transferred over the PSI from the PP to the IOC and used for defining subsequent information transfer over the interface as well as initiating activity in the IOC. |
| Track | One of the concentric recording areas on a disk surface. Each track in a cylinder is identified by a unique track address which defines the particular Read/Write head to be used in referencing the device. |
| Write | Write indicates the direction of dialog flow (from the IOC to the PP), i.e., an output operation. |

While in accordance with the provisions and statutes there has been illustrated and described the best form of the invention known, certain changes may be made to the system described without departing from the spirit and scope of the invention as set forth in the appended claims and that in some cases, certain features of the invention may be used to advantage without a corresponding use of other features.

Having described the invention, what is claimed is:

1. A microprogrammed peripheral processor coupled to a first interface and being operative to control the operation of at least one input/output device coupled to a second interface in response to command signals received from said first interface and for transferring information signals between said first and second interfaces involving said input/output device, said peripheral processor comprising:

microprogram control means, said control means including;

storage means having a plurality of storage locations for storing a plurality of microinstruction sequences, each having a plurality of microinstructions, branch control means including a plurality of input terminals coupled to receive a plurality of signals to be tested and coupled to said storage means for conditioning said storage means to branch to different ones of said sequences in accordance with said signals and decoding means coupled to said storage means for generating control signals in response to said microinstructions read out from said storage means during a cycle of operation;

bidirectional data transfer means for transferring information signals coupled to said first and second interfaces;

sequence control means for generating control signals coupled to said data transfer means and to said microprogram control means and, said branch control means in response to signals applied to different ones of said terminals representative of a command code to condition said storage means to branch to one of said sequences, said decoding means being operative to generate control signals in response to decoding microinstructions of said one sequence for application to said sequence control means, said sequence control means being conditioned by said signals to generate said signals for controlling the subsequent transfer of information signals through said data transfer means at a rate independent of the operating rate of said microprogram control means.

2. The peripheral processor of claim 1 wherein said sequence control means includes;

a plurality of bistable devices connected to switch state in response to predetermined ones of said control signals from said microprogram control means and wherein said one of said routines includes at a specified point therein a predetermined said plurality of bistable devices to predetermined states for controlling said transfer of information signals.

3. The processor of claim 2 wherein said predetermined type of microinstruction is an input/output type microinstruction including a plurality of fields, one of said plurality corresponding to a sequence field coded to establish which ones of said plurality of bistable devices are to be switched to their binary ONE states for execution of the operation specified by said command code.

4. The processor of claim 1 wherein said storage means includes a read only storage element.

5. The processor of claim 1 wherein one of said input terminals of said branch control means couples to said sequence control means, said branch control means in the absence of a predetermined signal from said sequence control means being operative to condition said storage means to repeat cycling through a predetermined microinstruction sequence, said one of said input terminals of said branch control means being operative upon receipt of said predetermined signal from said control sequencing means indicating completion of said data transfer to inhibit said storage means from repeating cycling through said predetermined microinstruction sequence.

6. The processor of claim 5 wherein said sequence includes two branch type microinstructions coded to contain branch addresses and test conditions which provide a two microinstruction loop until one of said test conditions is satisfied.

7. The processor of claim 5 wherein said sequence control means further includes;

cycle control means coupled to different ones of said bistable means, said cycle control means including a plurality of bistable means, said plurality of bistable means of said cycle control means being conditioned by said bistable means to switch state in a predetermined sequence in response to signals indicating the occurrence of certain hardware events for generating signals defining different sequences of operations for said processor during said transfer.

8. The processor of claim 5 wherein said one of said input terminals of said branch control means is operative in response to said predetermined signal to cause said storage means to branch to another microinstruction sequence to test the results of said transfer and said branch control means in accordance with signals representative of said results applied to other ones of said input terminals causing said storage means to sequence to a predetermined routine of microinstructions for processing a next command code.

9. The processor of claim 7 wherein one of said plurality of bistable means of said cycle control means is connected to receive said predetermined signal indicating an end of said data transfer, said one bistable means being operative to switch from a first state to a second state applying a signal to said one of said input terminals, said branch control means being conditioned by signals from said decoding means decoding a microinstruction in said sequence coded to test the state of said signal to inhibit said microprogram control storage means from repeating cycling through said sequence when said one bistable means is in said second state.

10. The processor of claim 1 wherein said bidirectional data transfer means includes:

a plurality of buffer registers, coupled in series to transfer bidirectionally information byte serially therebetween; and, circuit means coupled to different ones of said buffer registers and to said sequence control means, said circuit means being conditioned by said sequence control means to enable selectively said buffer registers in a predetermined manner to operate said data transfer means in a plurality of different modes.

11. The processor of claim 10 wherein said sequence control means includes a transfer in flip-flop and transfer out flip-flop coupled to said circuit means, said circuit means being operative to establish the direction of transfer for first and second groups of said plurality of buffer registers in accordance with the states of said transfer flip-flops.

12. The processor according to claim 11 wherein said first group includes registers designated A, B and C and said second group includes registers designated D, E and F, said circuit means being responsive to said transfer-in flip-flop when a binary ONE and a binary ZERO respectively to condition said first group so as transfer bytes from said C register to said A register and from said A register to said C register and said circuit means being responsive to said transfer-out flip-flop when a binary ONE and a binary ZERO respectively to condition said second group to transfer bytes from said D register to said F register and from said F register to said D register.

13. The processor according to claim 12 wherein signals corresponding to the states of said transfer-in and transfer-out flip-flops are used to define a plurality of submodes of operation in accordance with the states of certain ones of said control sequence flip-flops.

14. The processor according to claim 13 wherein during a first submode of operation, said processor sequence control means includes first logic control circuits for generating signals for enabling a transfer of information bytes into said processor from said first and second interfaces through said first and second groups of registers.

15. The processor according to claim 2 further including:

arithmetic and logic unit coupled to said second interface and to said data transfer means; and, read/write storage coupled to said arithmetic and logic unit and to said data transfer means, said sequence control means including second logic control circuits operative to apply said signals for conditioning said arithmetic and logic unit and said read/write storage to perform sequences of operations required for processing and storage of said byte signals respectively.

16. A peripheral subsystem including a peripheral processor coupled to a peripheral subsystem bus and to at least one peripheral device, said processor operative for controlling the operation of said one peripheral device coupled to a device level interface for a transfer of byte signals between said peripheral subsystem bus and device level interface in response to commands applied to said subsystem bus, said peripheral processor comprising:

a peripheral subsystem interface portion;

a microprogram control means, said control means including;

addressable control memory for storing a plurality of microinstructions, branch control means having a number of test inputs and coupled to said control memory for conditioning said control memory to branch to said microinstructions in accordance with signals applied to said inputs, and decoding means coupled to said control memory for generating control signals in response to said microinstructions read out from said control memory;

buffer register and control means coupled to said peripheral subsystem interface portion;

an arithmetic and logic unit coupled to said microprogram control means and to said buffer register and control means;

a device level interface portion coupled to said device level interface;

read/write storage coupled to said buffer register and control means and to said arithmetic and logic unit;

adapter control circuits coupled to said device level interface portion, to said buffer register and control means and to said arithmetic and logic unit; and, sequence control means for generating subcommand control signals and being coupled to said microprogram control means, said arithmetic and logic unit, said read/write storage, said adapter control circuits and to said buffer register and control means;

said branch control means in response to command code signals corresponding to one of said commands applied from said bus applied to certain ones of said test inputs to condition said control memory to branch to a first sequence of microinstructions, said decoding means in response to microinstructions of said sequence being operative to generate control signals for conditioning said sequence control means to apply a predetermined set of said subcommand control signals for operatively connecting for operation said buffer register and control means, said arithmetic and logic unit, said read/write storage, and said adapter control circuits in a predetermined manner for performing transfers of byte signals required for the execution of said one command under the control of said sequence control means.

17. The peripheral subsystem according to claim 16 wherein said sequence control means includes:

command storage means, said command storage means including a plurality of bistable storage means connected to switch to predetermined states in response to said control signals for providing said predetermined set of subcommand control signals, and;

cycle control means coupled to said command storage means, said cycle control means including a plurality of bistable storage elements selectively coupled to receive certain ones of said set of control signals from said plurality of bistable storage means and signals from different portions of said subsystem indicative the occurrence of certain hardware events, said plurality of bistaable storage means being operative to generate cycle control signals for defining different sequences of operations to be performed by said arithmetic and logic unit and said read/write storage during said execution of said one command.

18. The peripheral subsystem according to claim 17 wherein said processor further includes:

data counter means coupled to said read/write storage and to said microprogram control means, said counter means including input means conditioned by control signals during said first sequence for loading said counter means selectively with a predetermined count indicative of the number of byte signals to be transferred between said interface portions and said counter means being coupled to said adapter control circuits, said counter means including circuit means being responsive to certain ones of said signals from said adapter control circuits indicative of the occurrence of transfers of byte signals to modify said count during the execution of said one command.

19. The subsystem according to claim 18 wherein said counter means further includes:

decoder means being operative to generate an output control signal when said counter means has been modified to store a count indicating the completion of the transfer of said number of byte signals; and, wherein one of said inputs of branch control means is coupled to receive said output control signal, said branch control means being responsive to said output control signal to cause said control memory to discontinue sequencing through the microinstruction sequence under execution and begin execution of a subsequent microinstruction sequence for processing the results from executing said one command.

20. The subsystem of claim 17 wherein said peripheral subsystem interface portion includes:

a first plurality of bistable storage elements coupled to said microprogram control means, said first plurality of storage elements being conditioned to control the transfer of signals through said portion; and, interface sequence control means including a second plurality of bistable storage elements coupled to said microprogram control means, said control signals being operative to switch said second plurality of bistable storage elements to predetermined states to condition said subsystem interface portion for execution of said one command.

21. The subsystem of claim 20 wherein said first sequence of microinstructions includes an input/output type microinstruction which has a plurality of field portions including a first sequence field portion coded to define the states of said second plurality of bistable storage means of said peripheral subsystem interfaces and a second sequence field portion coded to define the states of a second plurality of bistable storage means of said sequence control means, said sequence control means being conditioned by said input/output type microinstruction to generate signals to switch said plurality of bistable storage means to predetermined states in accordance with said first and second sequence fields for conditioning said processor to execute said one command.

22. The subsystem of claim 21 wherein said peripheral subsystem portion includes counter means coupled to said microprogram control means and to said read/write storage and wherein said input/output type microinstruction further includes a sub op code field portion coded to define which one of said counter means is to be loaded with said predetermined count and a count field portion coded to define said predetermined number, said sequence control means being operative in response to said microinstruction to generate signals for loading a specified one with said number.

23. The subsystem of claim 21 wherein said first sequence of microinstructions further includes read/write store microinstructions and logic type microinstructions, and decoding means being operative in response to said microinstructions for generating signals for conditioning said read/write storage, said adapter control circuits, said one peripheral device and said arithmetic and logic unit for executing said one command.

24. The subsystem of claim 22 wherein said sub op code field portion of said input/output type microinstruction is coded as follows:

00 designates that said counter means of said peripheral subsystem portion is to be loaded from said read/write storage;

01 designates that said counter means of said peripheral subsystem portion is to be loaded from said microprogram control means;

10 designates that said data counter means is to be loaded from said read/write storage; and, 11 designates that said data counter means is to be loaded from said microprogram control means.

25. The subsystem of claim 22 wherein at least two of said plurality of bistable storage elements of said cycle control means are interconnected to form a trap counter, and wherein said input/output type microinstruction further includes a trap count field portion coded to specify a number of data byte signals received from said one peripheral device to be trapped during the execution of said one command, said decoding means of said microprogram control means being operative in response said microinstruction to generate signals for loading said trap counter with a bit representation of said trap count field portion.

26. The subsystem of claim 25 wherein said command code signals designating said one command applied to said subsystem bus coded to specify a read, a write or search operation involving said one peripheral device for conditioning said branch control means to have said control memory branch to different sequences of microinstructions, each including at specified points therein an input/output type microinstruction coded to condition said sequence control means to enable said processor to execute the operation specified.

27. A peripheral processor coupled to a first interface and being operative to control the operation of any one of a plurality of input/output devices coupled to a second interface in response receiving command signals including a command code byte requiring the transfer of information byte signals between said first and second interfaces involving a selected one of said input/output devices, said peripheral processor comprising:

a microprogram control means, said control means including;

an addressable control store, said control store including a plurality of storage locations for storing microinstructions, an address register connected to said control store for storing an address for referencing said locations during cycles of operation, branch and test control means coupled to said address register, said branch control means including input means for receiving signals from different portions of said processor, said branch control means being operative in accordance with the testing of said signals to modify the contents of said address register to cause said store to branch to a sequence of microinstructions, an output register connected to said control store for temporarily storing the microinstruction contents of a referenced location during each cycle of operation, and decoding means coupled to said output register and operative to generate control signals in response to decoding certain portions of said microinstruction contents;

bidirectional data transfer means, said transfer means having a plurality of inputs and output data paths, one input and output path being coupled to said first and second interface;

arithmetic and logic means including;

an arithmetic and logic unit having a first operand input and a second operand input and operative to perform a predetermined number of arithmetic and logic operations upon byte signals applied as operands to said first and second inputs and first and second input multiplex circuit means coupled to said first and second inputs respectively, each of said multiplex circuit means having an output and a plurality of inputs, said inputs being connected to receive byte signals from a corresponding number of sources and including circuit means for selecting signals from one of said sources to be applied to said output, at least one of said inputs of each of said input multiplex circuit means being connected to a predetermined one of output data paths and result circuit means coupled to said unit for generating signals indicating the results of operations performed on said operands;

read/write storage means including plurality of storage locations for storing control and data bytes as required for execution of said commands, said storage means further including data input gating means coupled to predetermined ones of outputs of said data transfer means, control circuit means connected to said data input means and operative to generate signals for selecting which one of said outputs is to apply signals to said storage means, and output register means connected to store temporarily signals read out from an addressed one of said locations, said output register means being connected to said input multiplex circuit means; and, sequence control means coupled to said output register of said control store, said data transfer means and said read/write storage means;

said microprogram branch control input means being coupled to said result circuit means and conditioned by the results of testing of said command code byte to cause said store to branch to a predetermined sequence of microinstructions, said decoding means being operative upon read out of microinstructions of said predetermined sequence to generate control signals, said sequence control means being conditioned by said control signals to apply signals to said data transfer means, said read/write storage control circuit means and to said input multiplex circuit means for subsequently enabling the transfer byte signals through said data transfer means to said first and second interfaces, to said arithmetic and logic means and to said read/write storage means as defined in accordance with said command code, said transfer proceeding under the control of said sequence control means at a rate established in accordance with said selected one of said input/output devices independently of the operating rate of said microprogram control means thereby making said control means available for the performance of operations unrelated to said transfer.

28. The processor of claim 27 wherein said sequence control means includes:

a plurality of bistable devices connected to switch state in response to predetermined ones of said control signals from said microprogram control means and wherein said one of said routines includes at a specified point therein a predetermined type of microinstruction for initially presetting said plurality of bistable devices to predetermined states for controlling said transfer of information signals.

29. The processor of claim 28 wherein said predetermined type of microinstruction is an input/output type microinstruction including a plurality of fields, one of said plurality corresponding to a sequence field coded to establish which ones of said plurality of bistable devices are to be switched to their binary ONE states for execution of the operation specified by said command code.

30. The processor of claim 29 wherein said sequence control means further includes;

cycle control means coupled to different ones of said bistable devices, said cycle control means including a plurality of bistable means, said plurality of bistable means of said cycle control means being conditioned by said bistable devices to switch state in a predetermined sequence in response to signals indicating the occurrence of certain hardware events for generating signals defining different sequences of operations for said processor during said transfer.

31. The processor of claim 30 wherein said branch control means couples to said sequence control means, said branch control means including input means which in the absence of a predetermined signal from said sequence control means being operative to condition said storage means to repeat execution of a predetermined microinstruction sequence, said input means of said branch control means being operative upon receipt of said predetermined signal from said control sequencing means indicating completion of said data transfer to inhibit said microprogram control means from repeating execution of said predetermined microinstruction sequence.

32. The processor of claim 31 wherein one of said plurality of bistable means of said cycle control means is connected to receive said predetermined signal indicating an end of said data transfer, said one bistable means being operative to switch from a first state to a second state, said branch control means upon executing a microinstruction in said sequence coded to test the state of said one bistable means to inhibit said microprogram control means from repeating execution of said sequence when said one bistable means is in said second state.

33. The processor of claim 32 wherein said processor further includes:

a peripheral interface portion coupled to said first interface and said data transfer input and output paths, said interface portion including;

a first plurality of bistable storage elements coupled to said microprogram control means, said first plurality of storage elements being conditioned to control the transfer of signals througsaid portion; and, interface sequence control means including a second plurality of bistable storage elements coupled to said microprogram control means, said control signals being operative to switch said second plurality of bistable storage elements to predetermined states to condition said subsystem interface portion for execution of said one command.

* * * * *